US005867166A

United States Patent [19]
Myhrvold et al.

[11] Patent Number: 5,867,166
[45] Date of Patent: Feb. 2, 1999

[54] METHOD AND SYSTEM FOR GENERATING IMAGES USING GSPRITES

[75] Inventors: Nathan P. Myhrvold, Bellevue; James T. Kajiya, Duvall; Jerome E. Lengyel, Seattle, all of Wash.; Russell Schick, Vancouver, Canada

[73] Assignee: Microsoft Corporation, Redmond, Wash.

[21] Appl. No.: 671,412

[22] Filed: Jun. 27, 1996

Related U.S. Application Data

[63] Continuation-in-part of Ser. No. 560,114, Nov. 17, 1995, abandoned, which is a continuation of Ser. No. 511,553, Aug. 4, 1995, abandoned.

[51] Int. Cl.$^6$ .................................................. G06T 15/00
[52] U.S. Cl. .......................... 345/419; 345/433; 345/436; 345/473
[58] Field of Search .................... 345/418–20, 433–7, 345/501–5, 473–75, 960

[56] References Cited

U.S. PATENT DOCUMENTS

| | | | |
|---|---|---|---|
| 4,631,690 | 12/1986 | Corthout et al. | 364/518 |
| 4,645,459 | 2/1987 | Graf et al. | 434/43 |
| 5,363,475 | 11/1994 | Baker et al. | 345/422 |
| 5,522,018 | 5/1996 | Takeda et al. | 345/422 |
| 5,563,989 | 10/1996 | Billyard | 345/426 |
| 5,581,665 | 12/1996 | Surgiura et al. | 345/86 |
| 5,596,686 | 1/1997 | Duluk, Jr. | 345/122 |
| 5,684,935 | 11/1997 | Demesa, III et al. | 345/419 |
| 5,778,098 | 7/1998 | Lee et al. | 382/236 |

OTHER PUBLICATIONS

Foley, James D., et al, "Computer Graphics: Principles and Practices", *Addison–Wesley Publishing Co.,* 2nd ed. pp. 806–813, 855–921, 1990.

Collaborative work, "Pixel–Planes", *Pixel Planes Home Page,* url—http://www.cs.unc.edu/~pxpl/, University of North Carolina, pp. 1–25, update, Sep. 26, 1995.

Oak Technology WARP5 Press Releases, "Oak Technology Sets New Standard for 3D Realism with Breakthrough WARP 5 Chip Architecture", Atlanta, GA, Jun. 19, 1997.

Bergman, et al "Image Rendering by Adaptive Refinement", *ACM Siggraph '86,* vol. 20, No. 4, pp. 29–37, Aug. 18–22, 1986.

Chen, Chein–Liang, et al, "A Raster Engine for Computer Graphics and Image Compositing", *Abstract, APCCAS '94, IEEE,* pp. 103–108, Dec. 5–8, 1994.

Yoo, Terry S., et al, "Direct Visualization of Volume Data", *IEEE Computer Graphics and Applications Magazine,* vol. 12, No. 4, pp. 63–71, Jul. 1992.

Bove, Jr., V. Michael, et al, "Real–Time Decoding and Display of Structured Video", *IEEE Multimedia, 1994 international Conference,* pp. 456–462, 1994.

Heb, Andreas, et al, "Three Dimensional Reconstruction of Brains from 2–Deoxyglucose Serial Section Autoradiographs", *Image Processing, 1994 International Conference,* vol. 3, pp. 290–294, 1994.

(List continued on next page.)

*Primary Examiner*—Rudolph J. Buchel, Jr.
*Attorney, Agent, or Firm*—Klarquist Sparkman Campbell Leigh & Whinston, LLP

[57] ABSTRACT

In an image processing system, a method for generating a images includes rendering graphical models comprising a scene to separate image layers called "gsprites," and then compositing these image layers to generate an image. An image processor can retrieve gsprites from memory, transform them, and composite them for display at video rates. Gsprites can be re-rendered or updated at different rates. Reducing the rendering overhead of the system, the image processor can perform an affine transformation on the gsprite to approximate motion of the graphical object that it represents, rather than re-render the object. Objects in a scene can be queued for re-rendering based on a predefined update rate, or based on the accuracy of representing the object with a transformed gsprite, rendered for a previously displayed image.

38 Claims, 42 Drawing Sheets

OTHER PUBLICATIONS

Hu, Lincoln, "Computer Graphics in Visual Effects", *Compcon Spring '92, IEEE Computer Society International Conference*, pp. 472–474, 1992.

Runyon, Kenneth R., "Advanced Graphics Processor", *Digital Avionics Systems, 1993 Conference*, pp. 394–399, 1993.

Crawfis, Roger A., et al, "A Scientific Visualization Synthesizer", *Visualization, 1991 Conference*, pp. 262–267, 1991.

Haeberli, Paul, et al, "The Accumulation Buffer: Hardware Support for High–Quality Rendering", *ACM Computer Graphics*, vol. 24, No. 4, pp. 309–318, Aug. 1990.

Regan, Matthew and Ronald Pose, "Priority Rendering with a Virtual Reality Address Recalculation Pipeline", *ACM Siggraph, '94, Computer Graphics Proceedings, Annual Conference Series*, pp. 155–162, 1994.

Regan, Matthew and Ronald Pose, "Low Latency Virtual Reality Display System", *Technical report No. 92/166*, Monash University, Victoria, Australia, pp. 1–13, Sep. 1992.

Regan, Matthew and Ronald Pose, "A Interactive Graphics Display Architecture", *IEEE Virtual Reality*, 1993 International Symposium, pp. 293–299, 1993.

Torborg, Jay, et al, "Talisman: Commodity Realtime 3D Graphics for the PC", *ACM Siggraph, Conference Proceedings*, pp. 353–363, Aug. 4–9, 1996.

Deering, Michael, et al, "Leo: A System for Cost Effective 3D Shaded Graphics", *ACM Siggraph, Conference Proceedings*, pp. 101–108, Aug. 1–6, 1993.

Akerly, Kurt, "RealityEngine Graphics", *ACM Siggraph, Conference Proceedings*, pp. 109–116, Aug. 106, 1993.

Mcmillan, Leonard, et al, "Plenoptic Modeling: An Image–Based Rendering System", *ACM Siggraph, Conference Proceedings*, pp. 39–46, Aug. 6–11, 1995.

Tan, Wee–Chiew, et al, "Low–Power polygon Renderer for Computer Graphics", *Application Specific Array Processors, 1993 International Conference*, pp. 200–213, 1993.

Bae, Seong–Ok, et al, "Patch Rendering: A New Parallel Hardware Architecture for Fast Polygon Rendering", *Circuits and Systems, 1991 IEEE International Symposium*, pp. 3070–3073, 1991.

Slater, Mel, "An Algorithm to support 3D Interaction on Relatively Low Performance Graphics Systems", *Comput. & Graphics*, vol. 16, No. 3, pp. 311–315, 1992.

Slater, Mel, "Segments on Bit–mapped Graphics Displays", *Software—Practice and Experience*, vol. 16(II), pp. 965–980, Nov. 1986.

Chrysanthou, Y and Slater, M, "Computing Dynamic Changes to BSP Trees", *Computer graphics Forum*, vol. II, No. 3, Conference Issue, pp. C–321 to C–342, Sep. 7–11, 1992.

Slater, Mel, et al, "Liberation from Rectangle: A Tiling Method for Dynamic Modification of Objects on Raster Displays", *Eurographics '88*, Conference date, Sep. 12–16, 1988, pp. 381–392, 1988.

Slater, Mel, et al, "Liberation from Flatland: 3D Interaction Based on the Desktop Bat", *Eurographics '91*, pp. 209–221, 1991.

Deering, "Explorations of Display Interfaces for Virtual Reality", *IEEE Virtual Reality, 1993 International Symposium*, pp. 141–147, 1993.

Reichlen, "Sparcchair: A One Hundred Million Pixel Display", *IEEE Virtuality Reality, 1993 International Symposium*, pp. 300–307, May 28, 1993.

"A Characterization of Ten Rasterization Techniques", by N. Gharachorloo, S. Gupta, R.F. Sproull and I.E. Sutherland, *Computer Graphics*, vol. 23, No. 3, Jul. 1989, pp. 355–368.

"Pixel–Planes 5: A Heterogeneous Multiprocessor Graphics System Using Processor–Enhanced Memories", by H. Fuchs, J. Poulton, J. Eyles, T. Greer, J. Goldfeather, D. Ellsworth, S. Molnar, G. Turk, B. Tebbs and L. Israel, *Computer Graphics*, vol. 23, No. 3, Jul. 1989, pp. 79–88.

Chapter 18: "Advanced Raster Graphics Architecture", by S. Molnar and H. Fuchs, *Computer Graphics: Principles and Practices*, Second Edition, Foley, vanDam, Feiner and Hughes, pp. 855–923.

"The Calculus of the Non–Exact Perspective Projection, Scene–Shifting for Computer Animation", by G.R. Hofmann, Tutorial Notes for Computer Animation, Eurographics '89.

"System and Method for Composing a Display Frame of Multiple Layered Graphic Sprites", by Jon Blossom and Michael Edwards.

*Computer Graphics: Principles and Practice,* Foley, van Dam, Feiner, Hughes, Section 17.6, pp. 835–843, (Nov., 1991).

*Adding Parallelism in Object Space to the Rendering Pipe-Line,* Eurographics '89, Proceeding of the European Computer Graphics Conference and Exhibition, Hamburg, E. R. G., 4–8 Sep., 1989, Amsterdam, pp. 209–220.

*Compositing Digital Images,* Computer Graphics, vol. 18, No. 3, pp. 253–259, Jul. 1984.

*Image Warping with Scattered Data Interpolation,* IEEE Computer Graphics and Applications, pp. 342–350, 1995.

*Painterly Rendering for Animation,* Computer Graphics Proceedings, Annual Conference Series, pp. 477–484, 1996.

*Interactive Design of Complex Time–Dependent Lighting,* IEEE Computer Graphics and Applications, pp. 26–36, 1995.

*Shade Trees,* Computer Graphics, vol. 18, No. 3, pp. 223–231, Jul. 1984.

*A Language for Shading and Lighting Calculations,* Computer Graphics, vol. 24, No. 4, pp. 289–298, Aug. 1990.

548 BOUNDING BOX
546 OBJECT

552 GSPRITE
554 32 PIXEL CHUNK BOUNDARY
550 OBJECT
556 32x32 PIXEL CHUNK 568 32x32 PIXEL CHUNK
560 OBJECT
570 32 PIXEL CHUNK BOUNDARY
564 GSPRITE
572 32x32 PIXEL SCREEN BOUNDARY
562 OBJECT
566 GSPRITE
558

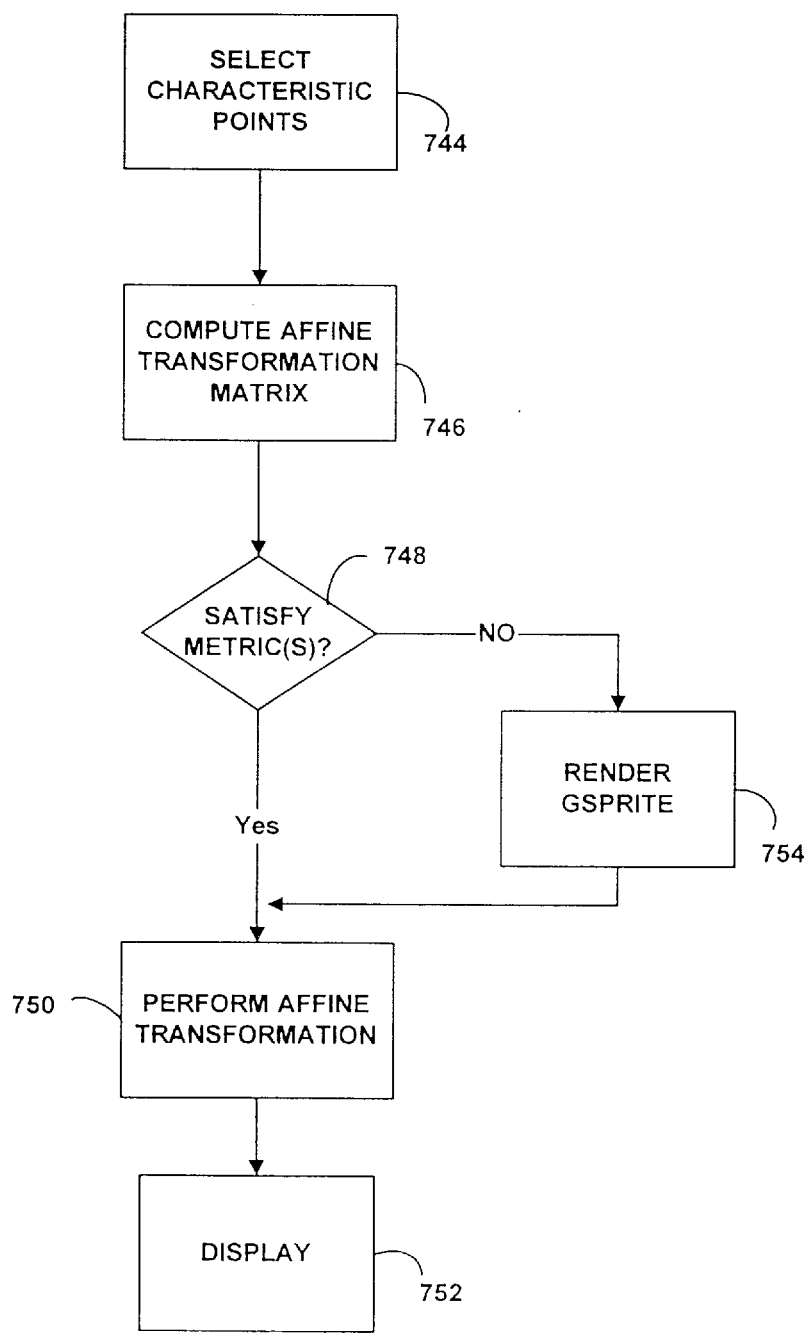

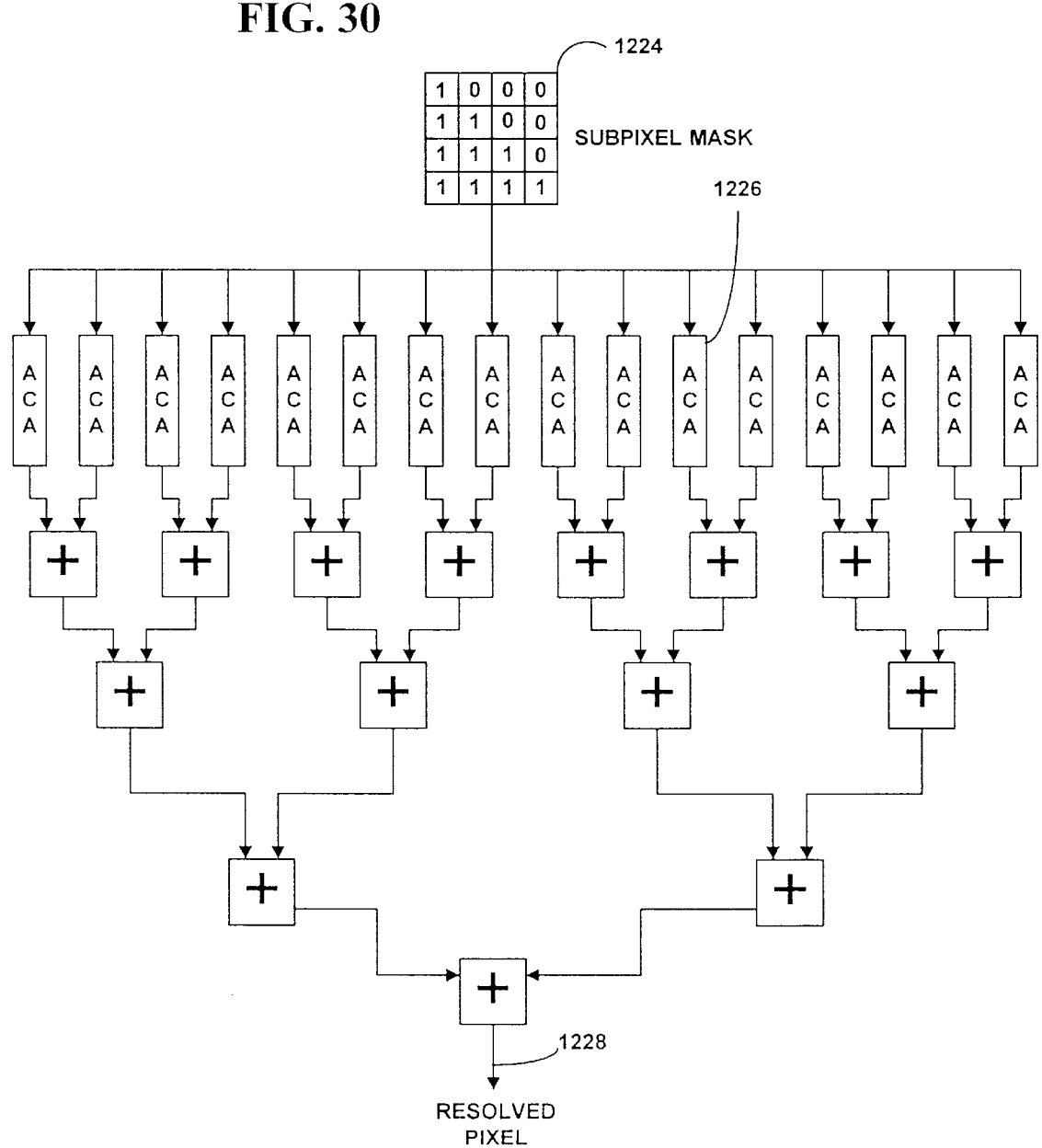

METHOD AND SYSTEM FOR GENERATING IMAGES USING GSPRITES

REFERENCE TO PRIOR APPLICATIONS

This is a continuation-in-part of application Ser. No. 08/560,114, filed Nov. 17, 1995, now abandoned. Application Ser. No. 08/560,114 is a continuation of application Ser. No. 08/511,553, filed Aug. 4, 1995, which is now abandoned.

TECHNICAL FIELD

The invention generally relates to image processing, and more specifically relates to image generation using image layers called "gsprites."

BACKGROUND

With the wide-spread use of computers in all aspects of modem life, there is an increasing demand to improve the human-machine interface through the use of visual information. Advances in graphical software and hardware have already improved the human-machine interface drastically. Interactive graphics such as windowing environments for desk-top computers, for example, have improved the ease of use and interactivity of computers drastically and are common-place today. As the price-performance ratio of hardware drops, the use of computer generated graphics and animation will become even more pervasive. Unfortunately, the cost of producing truly interactive and realistic effects has limited its application. There is a need, therefore, for new graphics processing techniques and architectures that provide more interactive and realistic effects at a lower cost.

Although there are numerous ways to categorize graphics processing, one common approach is to describe an image in terms of the dimensions of the objects that it seeks to represent. For example, a graphics system may represent objects in two dimensions (e.g., having x and y coordinates); in which case the graphics are said to be "two-dimensional", and three dimensions (e.g., having x, y, and z coordinates), in which case the graphics are said to be "three-dimensional."

Since display devices such as cathode ray tubes (CRTs) are two-dimensional (2-D), the images displayed by computer graphic systems are generally 2-D. As discussed in greater detail below, however, if the computer maintains a graphical model representing the imaged object in three-dimensional space, the computer can alter the displayed image to illustrate a different perspective of the object in 3-D space. In contrast, although a 2-D graphic image can be transformed prior to display (e.g., scaled, translated, or rotated), the computer can not readily depict the object's appearance from a different perspective in 3-D space.

The increasing ability of modern computers to efficiently handle 2-D and, particularly, 3-D graphics has resulted in a growing variety of applications for computers, as well as fundamental changes in the interface (UI) between computers and their users. The availability of 3-D graphics is becoming increasingly important to the growth of entertainment related applications including production quality film animation tools, as well as lower resolution games and multimedia products for the home. A few of the many other areas touched by 3-D graphics include education, video conferencing, video editing, interactive user interfaces, computer-aided design and computer-aided manufacturing (CAD/CAM), scientific and medical imaging, business applications, and electronic publishing.

A graphics processing system may be thought of as including an application model, application program, graphics sub-system, as well as the conventional hardware and software components of a computer and its peripherals.

The application model represents the data or objects to be displayed, assuming of course that the image processing is based upon a model. The model includes information concerning primitives such as points, lines, and polygons that define the objects' shapes, as well as the attributes of the objects (e.g., color). The application program controls inputs to, and outputs from, the application model-effectively acting as a translator between the application model and graphics sub-system. Finally, the graphics sub-system is responsible for passing user inputs to the application model and is responsible for producing the image from the detailed descriptions stored by the application model.

The typical graphics processing system includes a physical output device which is responsible for the output or display of the images. Although other forms of display devices have been developed, the predominant technology today is referred to as raster graphics. A raster display device includes an array of individual points or picture elements (i.e., pixels), arranged in rows and columns, to produce the image. In a CRT, these pixels correspond to a phosphor array provided on the glass faceplate of the CRT. The emission of light from each phosphor in the array is independently controlled by an electron beam that "scans" the array sequentially, one row at a time, in response to stored information representative of each pixel in the image. Interleaved scanning of alternate rows of the array is also a common technique in, for example, the television environment. The array of pixel values that map to the screen is often referred to as a bitmap or pixmap.

One problem associated with raster graphics devices is the memory required to store the bitmap for even a single image. For example, the system may require 3.75 megabytes (MB) of random access memory to support a display resolution of 1280×1024 (i.e., number of pixel columns and rows) and 24 bits of color information per pixel. This information, which again represents the image of a single screen, is stored in a portion of the computer's display memory known as a frame buffer.

Another problem with conventional raster graphics devices such as CRTs is the relatively quick decay of light emitted by the device. As a result, the display must typically be "refreshed" (i.e., the raster re-scanned) at a rate approaching 60 Hz or more to avoid "flickering" of the image. This places a rigorous demand on the image generation system to supply image data at a fixed rate. Some systems address this problem by employing two frame buffers, with one of the buffers being updated with pixmap information corresponding to subsequent image frame, while the other buffer is being used to refresh the screen with the pixmap for the current image frame.

The demands placed upon the system are further exacerbated by the complexity of the information that often must be processed to render an image from the object stored by the application model. For example, the modeling of a three-dimensional surface is, in itself, a complex task. Surface modeling is performed by the application model and may involve the use of polygon meshes, parametric surfaces, or quadric surfaces. While a curved surface can be represented by a mesh of planar polygons, the "smoothness" of its appearance in the rendered image will depend both upon the resolution of the display and the number of individual polygons that are used to model the surface. The computations associated with high resolution modeling of complex surfaces based upon polygon meshes can be extremely resource intensive.

As intimated above, there is a demand to produce more realistic and interactive images. The term, "real-time," is commonly used to describe interactive and realistic image processing systems. In a "real-time" system, the user should perceive a continuous motion of objects in a scene. In a video game having real-time capabilities, the active characters and view point should respond with minimal delay to a user's inputs, and should move smoothly.

To produce such real-time effects, an image rendering system has to generate a new image at a sufficiently high rate such that the user perceives continuous motion of objects in a scene. The rate at which a new image is computed for display is referred to as the "computational" rate or the "computational frame" rate. The computation rate needed to achieve realistic effects can vary depending on how quickly objects move about the scene and how rapidly the viewing perspective changes. For a typical application, a real-time graphics system recomputes a new image at least twelve times a second to generate a series of images that simulate continuous motion. For high-quality animation applications, however, the computational rate must be significantly higher.

Another critical issue for real-time systems is transport delay. Transport delay is the time required to compute and display an image in response to input from the user, i.e. motion of a joystick to move a character in a scene. To the extent transport delay time is noticeable to a user, "real-time" interactivity is impaired. Ideally, the user should not perceive any transport delay. However, in practice there is always some delay attributed to rendering objects in a scene in response to new inputs and generating a display image. Improvements in real-time interactivity are highly desirable without discarding data, which can interfere with image quality.

As introduced above, conventional graphics systems typically include a frame buffer. To generate an image, the graphic system renders all of the objects in a scene and stores the resulting image in this frame buffer. The system then transfers the rendered image data to a display. In a conventional graphics architecture, the entire frame buffer is erased and the scene is re-rendered to create a next frame's image. In this type of system, every object must be redrawn for each frame because the frame buffer is cleared between frames. Every object therefore is updated at the same rate, regardless of its actual motion in the scene or its importance to the particular application.

This conventional architecture presents several hurdles to producing highly realistic and interactive graphics. First, every object in a scene for a particular frame is rendered with the same priority at the same update rate. As such, objects in the background that have little detail and are not moving are re-rendered at the same rate as objects in the foreground that are moving more rapidly and have more surface detail. As a result, processing and memory resources are consumed in re-rendering background objects even though these background objects do not change significantly from frame to frame.

Another drawback in this conventional architecture is that every object in the scene is rendered at the same resolution. In effect, the rendering resources consumed in this type of approach are related to the size of the screen area that the object occupies rather than the importance of the object to the overall scene. An example will help illustrate this problem. In a typical video game, there are active characters in the foreground that can change every frame, and a background that rarely changes from frame to frame. The cost in terms of memory usage for generating the background is much greater than generating the active characters because the background takes up more area on the screen. Image data must be stored for each pixel location that the background objects cover. For the smaller, active characters, however, image data is generated and saved for only the pixels covered by the smaller characters. As a result, the background occupies more memory even though it has lesser importance in the scene. Moreover, in a conventional architecture the entire background has to be rerendered for every frame, consuming valuable processing resources.

One way to address some of the difficulties outlined above is to use a hardware-based animation technique called "sprites". A sprite is a small rectangular region of memory that is mixed with the rest of the frame buffer memory at the video level. The location of a sprite at any time is specified in registers in the frame buffer. To move the sprite about the screen, the system alters the values in these registers. The sprites can either hide the frame buffer values at each pixel, or can be blended with them. Sprites can be used in animation by moving or scaling the sprite or sprites on top of a background image. One of the most popular uses of sprites is in video games, where a scene is animated by moving or scaling sprites over a fixed background.

While sprites provide a method to manipulate two-dimensional images, they do not adequately address the problems associated with rendering images outlined above. Sprites are used to produce the effect of motion of a two-dimensional objects. However, sprites have not been used in the context of 3-D rendering systems.

SUMMARY OF THE INVENTION

The invention provides a system and method for generating image data using gsprites. The term "gsprite" refers generally to an image layer that can be composited with other image layers to form a display image. Objects in a scene can be assigned to separate gsprites, rendered independently, and then composited for display.

In the context of 3-D animation, the scene is comprised of objects that intersect a view volume. Objects in the view volume for a current image are assigned to gsprites and are rendered independently to their corresponding gsprites. To generate a display image in one embodiment, the gsprites are composited for display at the refresh rate of a display device. This process of compositing gsprites is repeated to generate subsequent images at the refresh rate.

In one application of gsprites, an affine transform can be used to simulate motion of an object. For instance in one embodiment, an affine transform can be computed to approximate motion of an object in a scene. Rather than re-rendering an object, an affine transform can be computed for its corresponding gsprite. An affine transformation is then performed on the gsprite. The accuracy of this approximation can be measured by comparing characteristic points from an object at a specified time with characteristic points from a previous time transformed using the affine transform. If the transformed points are not within predefined tolerances, the object is re-rerendered.

In another application of gsprites, objects can be re-rendered based on priority. In one embodiment, objects are queued for rendering based on the accuracy of approximating rendered objects with corresponding transformed gsprites. The accuracy can be measured as described above.

Objects are queued for re-rendering starting with the objects whose gsprite approximations are least accurate. As an alternative, objects can be queued for re-rendering based on predefined update rates.

In another embodiment of the invention, gsprites are used to reduce transport delay between inputs to the system and the display of a new image in response to those inputs. In one embodiment, inputs describing locations of objects in a scene are received during a first frame period, an affine transform is computed and objects are rendered to gsprites during a second frame period, and gsprites representing objects in the scene are transformed and composited for display during a third frame period. Inputs for a subsequent image, such as an input specifying a new viewpoint for the scene, are used in the second frame period to compute the affine transform.

Gsprite processing according to the invention provides a number of advantages. Objects in a scene can be assigned to separate gsprites. As such, objects can be updated independently. Moreover, objects can be re-rendered based on scene priorities. For example, an object that is moving in the distant background may not need to be updated as often, or with as much accuracy, as a foreground object. Another advantage is that the motion of an object can be approximated by performing an affine transformation on a gsprite representing the object. This reduces rendering overhead by eliminating the need to re-render object whose motion can be approximated by an affine transform.

Another advantage of the invention is that it enhances the interactivity and realism of the scene by reducing transport delay. Input data for subsequent image frames can be used to transform gsprites for a current image. In addition, objects temporally spaced from the view volume can be rendered to gsprites and then used to compute a new image quickly if the viewpoint should change rapidly.

Further advantages and features of the invention will become apparent with reference to the following detailed description and accompanying drawings.

BRIEF DESCRIPTION OF THE DRAWINGS

FIG. 22 is a flow diagram illustrating one aspect of a method for performing gsprite transforms in an embodiment.

FIG. 30 is a block diagram illustrating a pixel resolution system in an embodiment.

DETAILED DESCRIPTION

System Overview

In the following detailed description, we describe several embodiments with reference to an image processing system.

The image processing system supports real time image rendering and generation for both graphics and video processing. Due to the novel architecture and image processing techniques employed in the system, it can produce sophisticated real time 3-D animation at a significant cost savings over present graphics systems. In addition to graphics processing, the system supports video processing such as video editing applications, and can also combine video and graphics. For instance, the system can be used to apply video to graphical objects, or conversely, can be used to add graphical objects to video data.

The system supports a wide range of interactive applications. Its ability to support advanced real time animation makes it well-suited for games, educational applications, and a host of interactive applications. The system supports sophisticated user interfaces including 3-D graphics or combined graphics and video. Improving upon the limited graphics capabilities of todays windowing environments for personal computers, the system can support improved 3-D graphical user interfaces for applications ranging from office information processing on desktop computers to interactive television applications in a set-top box. The system makes very efficient use of memory and processor time and therefore can provide impressive image processing and display without unduly hindering performance of the application or responsiveness of the user interface to user actions.

Figure 1:
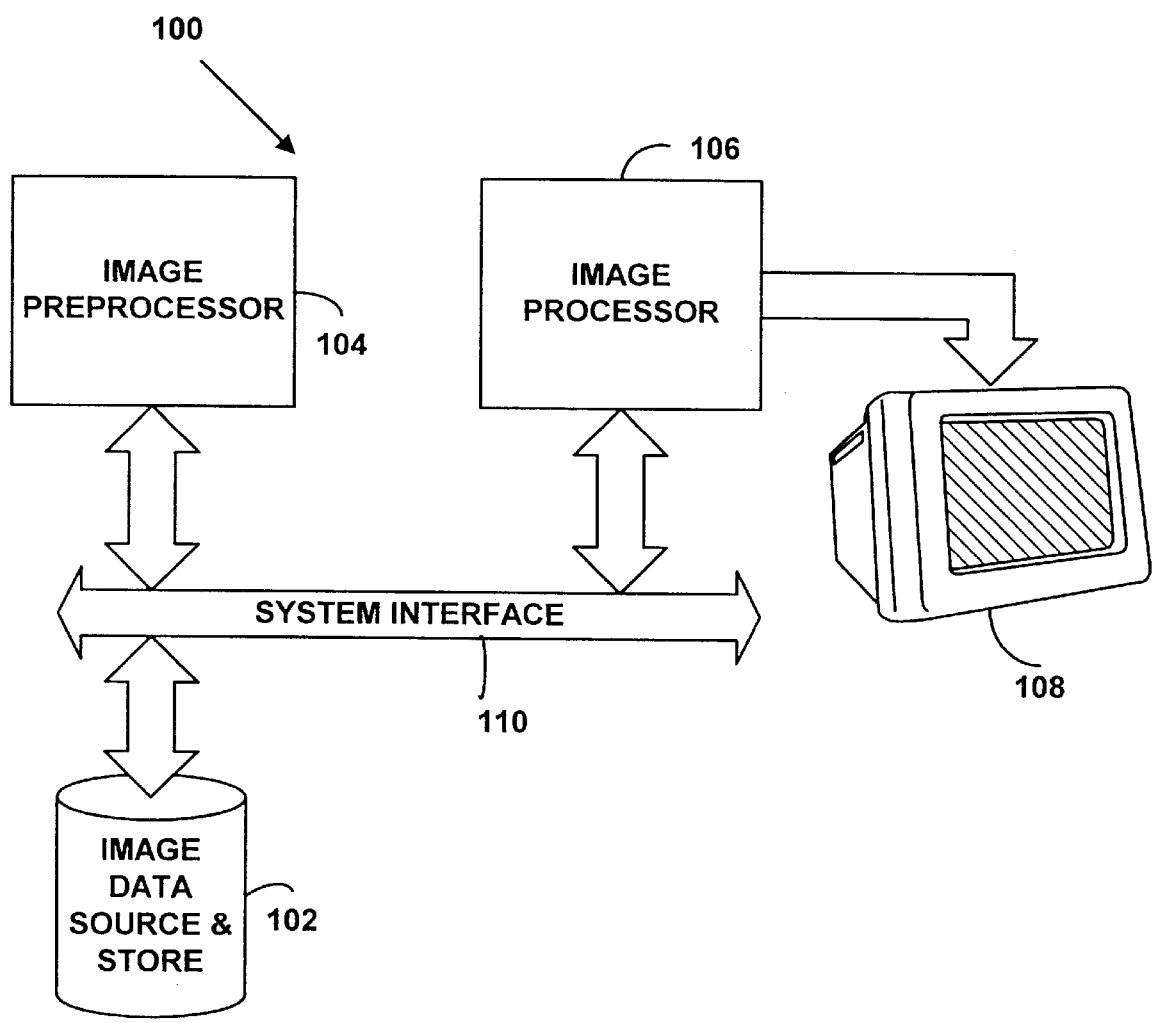
FIG. 1 is a block diagram of an image processing system.

FIG. 1 is a block diagram of the image processing system 100. The image processing system comprises an image data source and store 102, an image preprocessor 104, an image processor 106, and a display device 108, if immediate display of rendered images is desired. The elements in the system communicate through a system interface 110. The image data source and store 102 supplies image data to the system, and stores image data and commands. The image preprocessor 104 is responsible for manipulating the image data to prepare it for rendering. Examples of preprocessing functions include: defining objects in terms of geometric models, defining lighting and shadowing models, determining object locations, determining the location of a viewpoint and light sources, and geometry processing.

The image processor 106 renders the images, and generates a display image to be displayed on the display device 108. Rendering refers to the process of creating images from models and includes such functions as geometry processing (note that geometry processing can also be a preprocessing function), visible-surface determination, scan conversion, and lighting, to name a few. After rendering an image or parts of an image, the image processor 106 transfers rendered image data to the display device for display.

Below, we describe several features of the image processing system 100 in detail with reference to specific hardware and software architectures. However, it is important to note that the image processing described below can be implemented in a variety of alternative architectures.

The image processing system 100 achieves a vast price-performance improvement over existing high quality 3-D graphics systems known to the inventors. A number of advances in computer graphics contribute to this improvement. These advances include: composited image layers, image compression, chunking, and multi-pass rendering. We introduce these advances here, and describe these and other advances in more detail below.

Composited Image Layers (Gsprites)

In our system, multiple independent image layers may be composited together at video rates to create the output video signal. These image layers, which we refer to as generalized gsprites, or gsprites, can be rendered into and manipulated independently. The system will generally use an independent gsprite for each noninterpenetrating object in the scene. This allows each object to be updated independently, so that object update rate can be optimized based on scene priorities. For example, an object that is moving in the distant background may not need to be updated as often, or with as much accuracy, as a foreground object.

Gsprites can be of arbitrary size and shape. In one implementation, we use rectangular gsprites. Pixels in the gsprite have color and alpha (opacity) information associated with them, so that multiple gsprites can be composited together to create the overall scene.

Several different operations may be performed on gsprites at video rates, including scaling, rotation, subpixel positioning, and transformations to mimic motion, such as affine warps. So, while gsprite update rates are variable, gsprite transformations (motion, etc.) may occur at full video rates, resulting in much more fluid dynamics than could be achieved by a conventional 3-D graphics system that has no update rate guarantees.

Many 3-D transformations can be simulated by 2-D imaging operations. For example, a receding object can be simulated by scaling the size of the gsprite. By utilizing 2-D transformations on previously rendered images for intermediate frames, overall processing requirements are significantly reduced, and 3-D rendering power can be applied where it is needed to yield the highest quality results. This is a form of temporal level of detail management.

By using gsprite scaling, the level of spatial detail can also be adjusted to match scene priorities. For example, background objects, cloudy sky, etc., can be rendered into a small gsprite (low resolution) which is then scaled to the appropriate size for display. By utilizing high quality filtering, the typical low resolution artifacts are not as noticeable.

A typical 3-D graphics application (particularly an interactive game) trades off geometric level of detail to achieve higher animation rates. Gsprites allow the system to utilize two additional scene parameters—temporal level of detail and spatial level of detail—to optimize the effective performance as seen by the user. The spatial resolution at which the image of an object is rendered does not have to match the screen resolution at which it will be rendered. Further, the system can manage these trade-offs automatically without requiring application support.

Image Compression

Perhaps the most significant factor in determining system cost and performance is memory. A traditional high-end 3-D graphics system, for example, has over 30 Mbytes of memory, including frame buffers (double buffered), a depth buffer, a texture buffer, and an anti-aliasing buffer. And most of this is specialized memory which is significantly more expensive than DRAM. Memory bandwidth is always a critical bottleneck. The cost of high performance systems are often driven by the need to provide numerous banks of interleaved memory to provide adequate bandwidth for pixel and texture data accesses.

The system broadly applies image compression technology to solve these problems. Image compression has traditionally not been used in graphics systems because of the computational complexity required for high quality, and because it does not easily fit into a conventional graphics architecture. By using a concept we call chunking (described below), we are able to effectively apply compression to images and textures, achieving a significant improvement in price-performance.

In one respect, graphics systems have employed compression to frame buffer memory. High end systems utilize eight bits for each of three color components, and often also include an eight bit alpha value. Low end systems compress these 32 bits per pixel to as few as four bits by discarding information and/or using a color palette to reduce the number of simultaneously displayable colors. This compression results in very noticeable artifacts, does not achieve a significant reduction in data requirements, and forces applications and/or drivers to deal with a broad range of pixel formats.

The compression used in our system can achieve very high image quality yet still provide compression ratios of 10:1 or better. Another benefit of our approach is that a single high quality image format can be used for all applications, as distinguished from the standard PC graphics architecture which requires a trade-off between spatial resolution and color depth.

Chunking

Another significant advance in our system is referred to as chunking. A traditional 3-D graphics system (or any frame buffer for that matter), can be (and is) accessed randomly. Arbitrary pixels on the screen can be accessed in random order. Since compression algorithms rely on having access to a fairly large number of neighboring pixels (in order to take advantage of spatial coherence), compression can only be applied after all pixel updates have been made, due to the random access patterns utilized by graphics algorithms. This makes the application of compression technology to display buffers impractical.

This random access pattern also means that per-pixel hidden surface removal and anti-aliasing algorithms must maintain additional information for every pixel on the screen. This dramatically increases the memory size requirements, and adds another performance bottleneck.

Our system takes a different approach. A scene, or portions of a scene, can be divided into pixel regions (32×32 pixels in one specific implementation), called chunks. In one implementation, the system divides the geometry assigned to gsprites into chunks, but an alternative implementation could perform chunking without gsprites. The geometry is presorted into bins based on which chunk the geometry will be rendered into. This process is referred to as chunking. Geometry that overlaps a chunk boundary is preferably referenced in each chunk it is visible in. As the scene is animated, the data structure is modified to adjust for geometry that moves from one chunk to another.

Chunking provides several significant advantages. The use of chunking provides an effective form of compression. Since all the geometry in one chunk is rendered before proceeding to the next, the depth buffer need only be as large as a single chunk. By using a relatively small chunk size such as 32×32 pixels, the depth buffer can be implemented directly on the graphics rendering chip. This eliminates a considerable amount of memory, and also allows the depth buffer to be implemented using a specialized memory architecture which can be accessed with very high bandwidth and cleared during double buffer operations, eliminating the traditional frame buffer memory clearing overhead between frames.

Anti-aliasing is also considerably easier since each chunk can be dealt with independently. Most high-end Z-buffered graphics systems which implement antialiasing utilize a great deal of additional memory, and still perform relatively simplistic filtering. With chunking however, the amount of data required is considerably reduced (by a factor of 1000), allowing practical implementation of a much more sophisticated anti-aliasing algorithm.

In addition to Z-buffering and anti-aliasing, the system can also simultaneously support translucency in a correct and seamless manner. While a chunk is being built, the system can perform both anti-aliasing and translucency computations on another chunk. In other words, in the time required to build a chunk, the system can perform anti-aliasing and translucency processing on another chunk. The system can "pingpong" between chunks, and thus perform sophisticated processing without adding delay in processing an image for real time applications.

Yet another advantage is that chunking enables block oriented image compression. Once a chunk has been rendered (and anti-aliased), it can then be compressed with a block transform based compression algorithm. Therefore, in addition to the compression achieved from rendering chunks separately, chunking supports more sophisticated and adaptable compression schemes.

Multi-Pass Rendering

Another advantage of the architecture of our system is the opportunity for 3-D interactive applications to break out of the late 1970's look of CAD graphics systems: boring lambertian Gouraud-shaded polygons with Phong highlights. Texture mapping of color improves this look but imposes another characteristic appearance on applications. In the 1980's, the idea of programmable shaders and procedural texture maps opened a new versatility to the rendering process. These ideas swept the off-line rendering world to create the high-quality images that we see today in film special effects.

The rigid rendering pipelines and fixed rendering modes of today's typical high-end 3-D graphics workstations make it impossible to implement such effects without drastic reductions in real-time performance. As a result, users who require real-time display must put up with the limited rendering flexibility.

By reducing the bandwidth requirements using the techniques outlined above, the system of the present invention can use a single shared memory system for all memory requirements including compressed texture storage and compressed gsprite storage. This architecture allows data created by the rendering process to be fed back through the texture processor to use as data in the rendering of a new gsprite. Because of this support for feedback, the system can perform efficient multi-pass rendering.

By coupling efficient multi-pass rendering with a variety of compositing modes and a flexible shading language, the system can provide a variety of rendering effects in real—time that have previously been the domain of off-line software renderers. This includes support of functions such as shadows (including shadows from multiple light sources), environment mapped reflective objects, spot lights, ground fog, realistic underwater simulation, etc.

In one embodiment, the image processing system (100) includes a combination of software and hardware. In the following section, we describe the system environment below with reference to a hardware and software architecture. Where possible, we describe alternative architectures. However, the software and hardware architectures can vary, and therefore are not limited to the specific examples provided below.

The image processing system, or portions of it, can be implemented in a number of different platforms including desktop computers, set-top boxes, and game systems.

Figure 2:
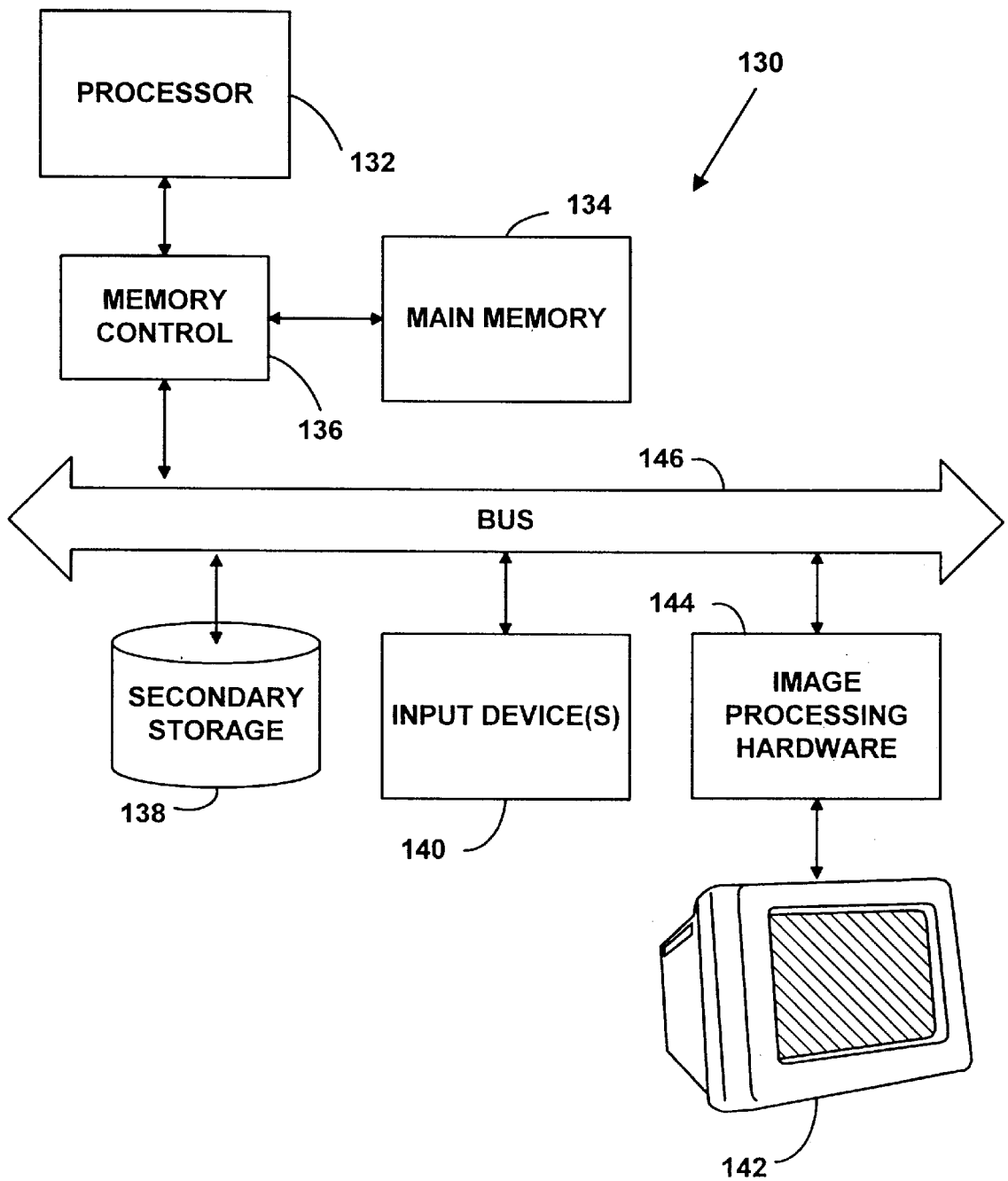
FIG. 2 is a block diagram of the system environment for an embodiment of the invention.

FIG. 2 is a block diagram of a computer system 130 in which the image processing system can be implemented. The computer system 130 includes a processor 132, main memory 134, memory control 136, secondary storage 138, input device(s) 140, display device 142, and image processing hardware 144. Memory control 136 serves as an interface between the processor 132 and main memory 134; it also acts as an interface for the processor 132 and main memory 134 to the bus 146.

A variety of computer systems have the same or similar architecture as illustrated in FIG. 2. The processor within such systems can vary. In addition, some computer systems include more than one processing unit. To name a few, the processor can be a Pentium or Pentium Pro processor from Intel Corporation, a microprocessor from the MIPS family from Silicon Graphics, Inc., or the PowerPC from Motorola.

Main memory 134 is high speed memory, and in most conventional computer systems is implemented with random access memory (RAM). Main memory can interface with the processor and bus in any of variety of known techniques. Main memory stores 134 programs such as a computer's operating system and currently running application programs. Below we describe aspects of an embodiment with reference to symbolic representations of instructions that are performed by the computer system. These instructions are sometimes referred to as being computer-executed. These aspects of the embodiment can be implemented in a program or programs, comprising a series of instructions stored on a computer-readable medium. The computer-readable medium can be any of the devices, or a combination of the devices described herein, in connection with main memory or secondary storage.

The bus 146 interconnects the memory control 136, secondary storage 138, and the image processing hardware 144. In one implementation for example, the bus is a PCI bus. The PCI standard is well-known, and several computer system boards are designed to support this standard. Computer systems having other bus architectures can also support the image processing system. Examples include an ISA bus, EISA bus, VESA local bus, and the NuBus.

The display device 142 is a color display, with continuous refresh to display an image. The display device in one embodiment is a cathode ray tube (CRT) device, but it can also be a liquid crystal display (LCD) device, or some other form of display device.

The secondary storage device 138 can include a variety of storage media. For example, the secondary storage device can include floppy disks, hard disks, tape, CD-ROM, etc. and other devices that use electrical, magnetic, optical or other recording material.

The input device(s) 140 can include a keyboard, cursor positioning device such as a mouse, joysticks, as well as a variety of other commercially available input devices.

In one implementation detailed below, the image processing hardware 144 is implemented on board that couples with the computer system through a PCI bus. In an alternative implementation, the image processing hardware can be located on a system board along with a processor or other image processing hardware and memory. For example, in a game system, image processing hardware is typically located on the mother board. Similarly, image processing hardware in a set-top box can also be located on the mother board.

While we have outlined the architecture of a computer system, we do not intend to limit our invention to the system architecture illustrated in FIG. 2. Our image processing system can be implemented in game systems, set-top boxes, video editing devices, etc. Below we describe an embodiment of an image processing system in the environment of the system architecture shown in FIG. 2. We describe alternative implementations throughout the following description, but we do not intend our description of alternatives to be a complete listing of other possible implementations. Based on our detailed description below, those having ordinary skill in the art can implement our the image processing system, or aspects of it, on alternative platforms.

Figure 3:
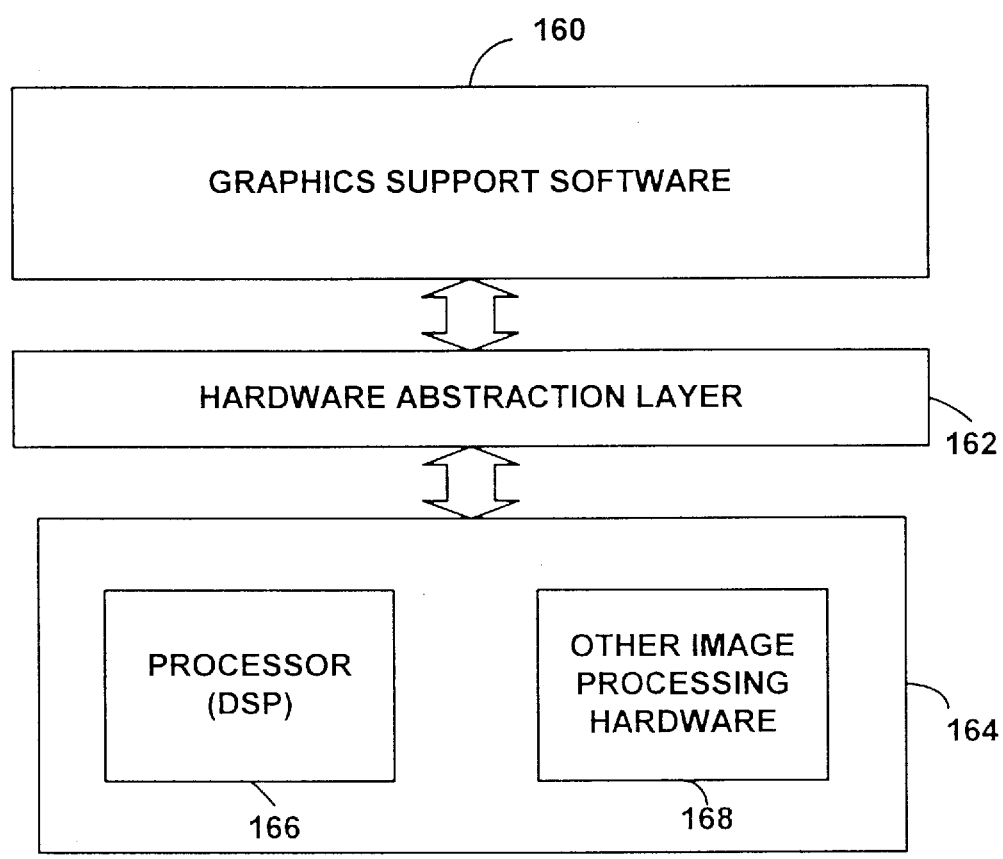
FIG. 3 is a block diagram of system architecture for an embodiment.

FIG. 3 is a block diagram illustrating the relationship between the software and hardware in one embodiment. In this embodiment, the image processing system is implemented using processing resources of the processor of the host computer and the image processing hardware 144. The image processing hardware 144 is implemented on an expansion board 164 which includes a processor (e.g. a Digital Signal Processor) 166 and image processing circuitry 168. The processors of the host computer 130 and the image processing board 164 share image processing tasks. Below we outline generally the functions performed by the host computer 130 and the image processing board 174.

Graphics support software 160 executes on the host computer system 130 and communicates with the image processing board 164 through the hardware abstraction layer (HAL) 162. The image processing board 164 includes a programmable digital signal processor called the DSP 166 and additional image processing hardware 168 detailed below.

The graphics support software 160 can include functions to support memory management, view volume culling, depth sorting, chunking, as well as gsprite allocation, transformation, and level of detail. The graphics support software can include a library of graphics functions, accessible by graphics applications, to perform the functions enumerated here.

The graphics support software 160 includes functions that support the gsprite paradigm introduced above. As indicated above, gsprites are rendered independently, and do not need to be rendered on every frame. Instead, changes in position of a gsprite can be approximated with affine or other transformations. The graphics support software 160 provides functions to help assign an object or objects to a gsprite and to track motion data describing the position and motion of the gsprite. The graphics support software also provides functions to determine when a rendered gsprite needs to be updated. The need to update a gsprite can vary depending on object movement, viewpoint movement, lighting changes, and object collisions.

We provide further detail with respect to the functions of the graphic support software below. The image processing board 164 performs low level geometry processing, including transforms, lighting and shading, texturing, anti-aliasing, translucency, etc. In one embodiment, the DSP 166 is responsible for front end geometry processing and lighting computations, but a number of these functions can be performed by the processor 132 of the host.

Overview of the Image Processing Board

Figure 4A:
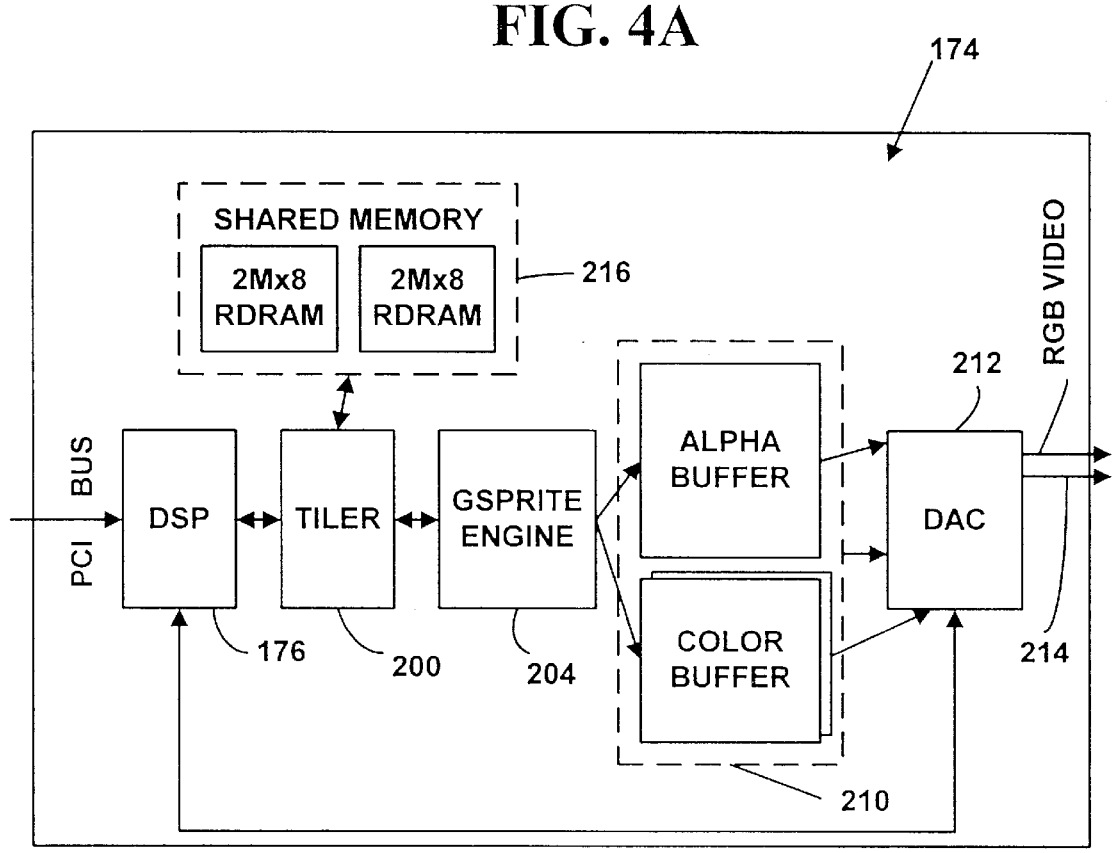
FIG. 4A is a block diagram of image processing hardware for an embodiment.

FIG. 4A is a block diagram illustrating the image processing board 174. The image processing board 174 communicates with the host computer through the bus 146. It includes a DSP 176, tiler 200, shared memory 216, the gsprite engine 204, compositing buffer 210, and a digital-to-analog converter (DAC) 212. The bus 146 (FIG. 2) transfers commands and data between the host and the DSP 176. In response to commands from the host, the image processing board 174 renders images and transfers display images to a display device 142 (FIG. 2) through the DAC 212.

In the embodiment illustrated in FIGS. 2–4A, the host processor and the DSP share the functions of the image preprocessor of FIG. 1. The image processor comprises the tiler 200, gsprite engine 204, compositing buffer 210, and DAC 212. Below, we provide more detail regarding these elements. It should be kept in mind, however, that the implementation of the image processing system can vary.

The shared memory 202 stores image data and image processing commands on the image processing board 174. In one embodiment, the shared memory is used to store gsprite and texture data in compressed form, DSP code and data, and various buffers used to transfer data between processing subsystems.

The DSP 176 is responsible for video compression/decompression and frontend graphics processing (transformations, lighting, etc.). Preferably, the DSP should support floating point and integer computations greater than 1000 MFLOPS/MOPS.

The tiler 200 is a VLSI chip which performs scan-conversion, shading, texturing, hidden-surface removal, anti-aliasing, translucency, shadowing, and blending for multi-pass rendering. The resulting rendered gsprite chunks are then compressed and stored in compressed form in the shared memory. The tiler additionally performs decompression and recompression of gsprite data in support of video and windowing operations.

The gsprite engine 204 operates at video rates to address and decompress the gsprite chunk data and perform the necessary image processing for general affine transformations (which include scaling, translation with subpixel accuracy, rotation, reflection and shearing). After filtering, the resulting pixels (with alpha) are sent to the compositing buffers where display pixel data is calculated.

Gsprite chunk data is processed a number of scan lines at a time for display. In one implementation, chunk data is processed 32 scan lines at a time. The compositing buffer (210) includes two 32 scan line color buffers which are toggled between display and compositing activities. The compositing buffer also includes a 32 scan line alpha buffer which is used to accumulate alpha for each pixel.

The DAC 212 includes a R G B video DAC and corresponding video port 214, to video editing devices. Individual components can be used to implement the functionality of the DAC.

System Operation

Figure 5A:
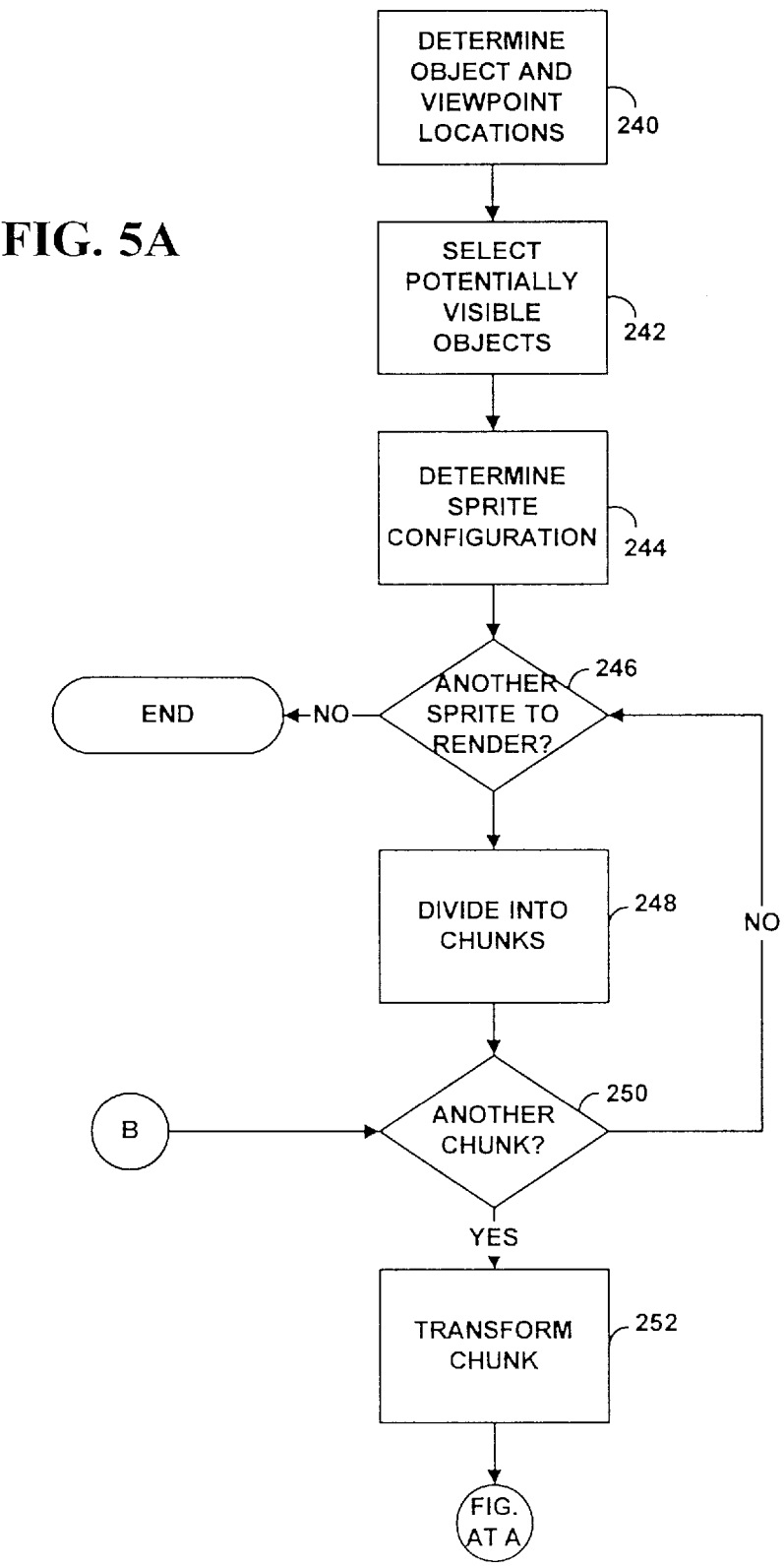
FIGS. 5A and 5B are flow diagrams illustrating an overview of the rendering process in an embodiment.
Figure 5B:
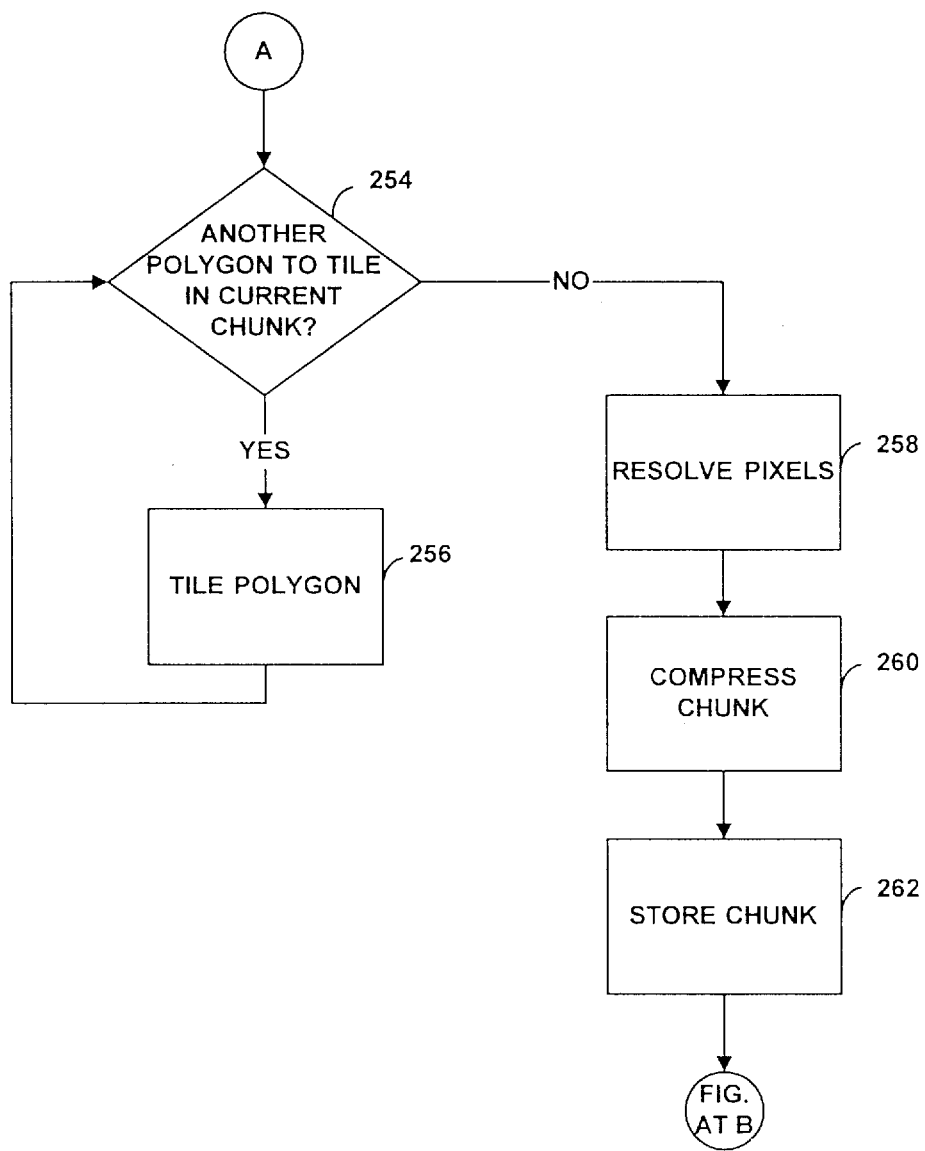

FIGS. 5A and 5B are flow diagrams illustrating steps in rendering an image in the image processing system. Before the image processor 106 begins rendering an image for the view space, the image preprocessor 104 determines object and viewpoint locations (240). In the embodiment illustrated in FIGS. 2 and 3, the graphics support software 160, running in the host computer system 132, determines the object and viewpoint locations from data provided by a graphics application. The graphics application, running on the host processor, defines models representing the relevant objects, and supplies a modeling transform, which is used to place the object with other objects in "world" coordinates.

Next, the image preprocessor 104 selects potentially visible objects (242). It determines potentially visible objects based on the view volume. The view volume is a three-dimensional space in world coordinates that provides the boundaries for a scene. The preprocessor selects potentially visible objects by traversing objects and determining whether their boundaries intersect the view volume. Objects that intersect the view volume are potentially visible in the geometric or spatial sense.

In some cases, it is useful to determine "temporally" potentially visible objects outside the current view volume, to account for future changes in the scene. This enables the system to adjust for rapid changes in the view volume. In typical 3-D graphics systems, the only way to respond to this rapid change is to completely generate a new scene based on the changed input, interposing significant transport delay. Such a long delay has negative effects on the user, creating problems such as over-control and nausea. To reduce this delay, the image preprocessor of the present invention can calculate the location of objects positioned in an extended range outside the visible range, and the image processor can render and store images within this extended range. Using the affine transform capability of the system, viewpoint input for a subsequent frame can be used to reposition the gsprites from this extended range reducing system transport delay to less than 2 computational frames. Such a short transport delay is unachievable with current 3-D graphics hardware systems known to the inventors, and will enable much higher quality simulations with much better user immersion.

The image preprocessor determines the configuration of gsprites for the image (244). This step involves finding how to map potentially visible objects to gsprites. As part of this process, the image preprocessor 104 allocates gsprites, which includes creating a gsprite data structure to store image data corresponding to one or more potentially visible objects. If processing resources allow, each non-interpenetrating object in the scene is assigned to an independent gsprite. Interpenetrating or self-occluding objects may be processed as a single gsprite.

The image preprocessor 104 can aggregate gsprites when the image processor does not have the capacity to composite the gsprites at the desired computational frame rate or there is insufficient system memory to store the gsprites. Rendering to separate gsprites will always be more computationally efficient, so if the system has the memory and compositing capacity, non-intersecting objects should be rendered into separate gsprites. If the system is incapable of storing or generating a display image based on a current assignment of gsprites, some gsprites can be aggregated to alleviate this problem.

After an object or objects are assigned to gsprites, the image processor divides the gsprites into image regions called "chunks" (248). The image preprocessor loops on gsprites and divides the gsprites into chunks (246, 248). In one embodiment, this process includes transforming bounding volumes of objects to the view space and finding rectangular image regions that enclose the transformed bounding volumes. These image regions define the dimensions of the gsprite in terms of the two-dimensional space to which the gsprite's object or objects are rendered. The gsprite is divided into chunks by dividing the rectangular image region into chunks and associating these chunks with the gsprite data structure.

As an optimization, the transformed bounding volume can be scaled and/or rotated so that the number of chunks required to render the gsprite is minimized. Because of this added transformation (scaling or rotating), the space to which the objects assigned to the gsprite are rendered is not necessarily screen space. This space is referred to as gsprite space. In the process of generating a display image, the gsprite should be transformed back to screen space.

The next step is determine how to divide the object geometry among the chunks (250). The image preprocessor determines how the geometric primitives (e.g. polygons) should be divided among the chunks by transforms the polygons to 2-D space (252) and determining which chunk or chunks the polygons project into. Due to the expense of clipping polygons, the preferred approach is to not clip the polygons lying at the edge of a chunk. Instead, a chunk includes polygons that overlap its edge. If a polygon extends over the border of two chunks, for example, in this approach the vertices of the polygon are included in each chunk.

The image preprocessor then queues the chunk data for tiling. Tiling refers to the process of determining pixel values such as color and alpha for pixel locations covered or partially covered by one or more polygons.

Decision step (254) (FIG. 5B) and the step (256) following it represents the process of tiling the polygons within the chunk. While the image processor has included polygons that overlap the boundaries of the current chunk, it only produces pixels that lie within the chunk. The produced pixels include information for antialiasing (fragment records), which are stored until all pixels have been generated.

After completing the tiling of polygons in a chunk, the image processor resolves the anti-aliasing data (such as fragment records) for the pixels (258). In one embodiment, the tiler 200 uses double buffering to resolve a previous chunk while the next is tiled. Alternatively, the tiler can use a common buffer with a free list. The free list represents free memory in the common buffer that is allocated as new fragment records are generated and added to when fragment records are resolved. A combination of double buffering and common memory can be used as well.

The image processor compresses the resolved chunk using a compression scheme described further below (260). As the image processor resolves a block of pixels, it can compress another block. The image processor stores the compressed chunk in shared memory (262).

Figure 6:
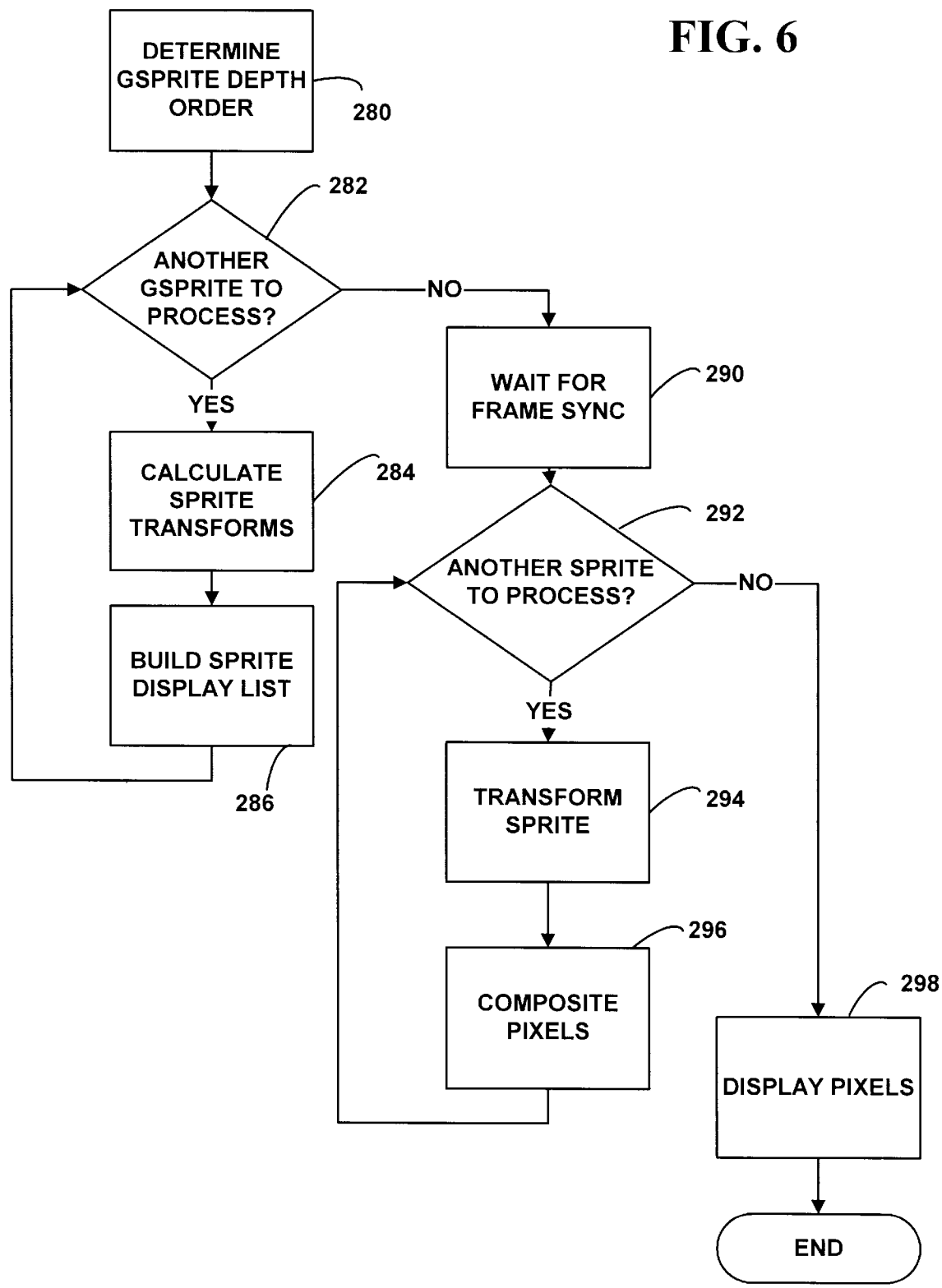
FIG. 6 is a flow diagram illustrating an overview of the display generation process of an embodiment.

FIG. 6 is a flow diagram illustrating the steps executed to display an image. On the image processing board 174 described above, images are read from shared memory 216, transformed to physical output device coordinates by the gsprite engine 204, composited in the compositing buffer 210, transferred to the DAC 212, and then transferred to an output device.

During the display process, the image processor accesses a list of gsprites to be displayed for the current frame. In the process of determining the gsprite configuration, the image preprocessor determines the depth order of gsprites (280). As noted above, one object is preferably assigned to a gsprite. However, the image preprocessor can assign more than one object to a gsprite, for example, to accommodate processing constraints of a particular image processor being used in the system. The image preprocessor sorts objects in Z-order, i.e. in distance from the viewpoint. In addition to sorting objects, it sorts gsprites in depth order as well and stores this depth data in the gsprite data structures.

The decision step (282) in FIG. 6 represents a loop on gsprites in the display process. The steps within this loop can include 1) calculating a transform for a rendered gsprite; and 2) building a gsprite display list to control how gsprites are displayed. These steps are described below.

For gsprites in the potentially visible range, the image processor calculates gsprite transforms. A gsprite transform refers to a transformation on a rendered 2-D gsprite. In one embodiment, the image processor can perform a transformation on a gsprite to reduce rendering overhead. Rather than rendering each object for every frame, the image processor reduces rendering overhead by re-using a rendered gsprite.

It is not necessary to compute a gsprite transform for every frame of image data. For instance, if a gsprite is rendered for the current frame of image data, it may not need to be transformed, unless e.g. the gsprite has been transformed to better match the bounding box for the object. In addition, some gsprites may not need to be re-rendered or transformed because the object or objects assigned to them have not changed and are not moving. As such, the step of transforming a gsprite is optional.

The gsprite may be multiplied by the unity matrix in cases where the position of the gsprite has not changed. This may apply, for example, in cases where the image processor has rendered the gsprite for the current frame, or where the gsprite position has not changed since it was originally rendered.

To specify how gsprites are to be displayed, the image processor creates a gsprite display list. The display list refers to a list or lists that define which gsprites are to be displayed on the display screen. This concept of display list can also apply to other output devices for presenting a frame of image data. The image processor uses the display list in mapping and compositing rendered gsprites to the physical device coordinates. While the step of building the display list is illustrated as part of a loop on gsprites, it is not necessary that the list or lists be generated specifically within this loop.

The display list can refer to a list of gsprites or a list of gsprites per band. A "band" is a horizontal scanline region of a display screen. For instance, in one embodiment a band is 32 scanlines high by 1344 pixels wide. The display list can include a separate list of gsprites for each band, in which case the band lists describe the gsprites impinging on the respective bands. Alternatively, the display list can be comprised of a single list implemented by tagging gsprites to identify which bands the gsprites impinge upon.

The display list in the illustrated embodiment is double-buffered. Double buffering enables the system to generate one display list while it reads another. As the system calculates the gsprite transforms and build the display list for one frame, it reads the display list for another frame and displays the image data in this list.

Because of the double buffering, the steps shown in FIG. 6 are over-lapped: the image preprocessor performs steps (280–286) for one frame while the image processor performs steps (290–298) for another frame.

Figure 7:
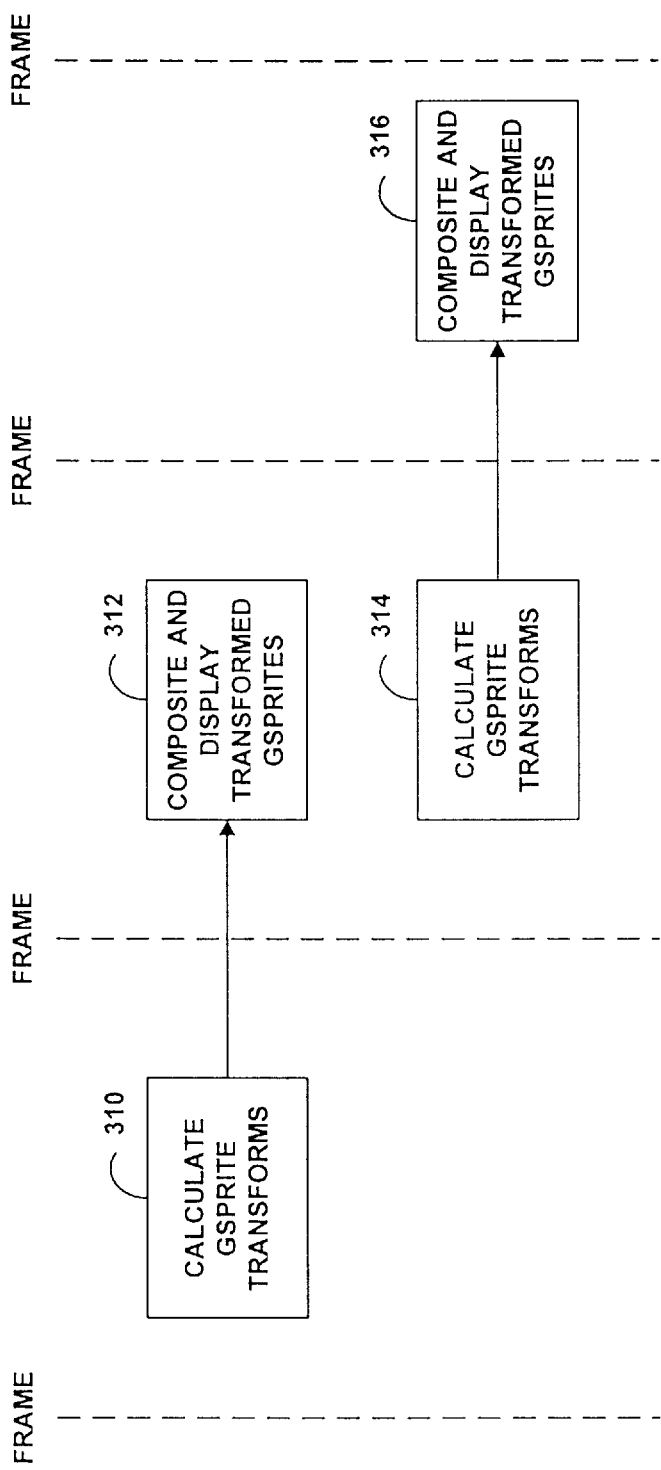
FIG. 7 is a diagram illustrating one aspect of display generation in terms of frame periods in an embodiment.

FIG. 7 is a block diagram illustrating the timing of these steps. After the system completes steps (280–286) (FIG. 6) for a frame 310, it waits for a frame sync signal (vertical retrace) and then performs the buffer swap. The display list it has just created is then used to determine the gsprites to be displayed in the current frame 312. While that display list is processed 312, gsprite transforms are computed and a display list is constructed for a next frame 314. In the next frame, the gsprite transforms and display list that were generated in the previous frame 314 are then used to generate the display image 316.

The image processor converts gsprites to output device coordinates based on the list of gsprites in the display list. The image processor reads gsprite data from shared memory, including color, alpha, and data identifying the gsprite's position. Based on this data, the image processor determines the color and alpha for pixels covered by the gsprite.

In one embodiment, the image processor loops on each band, transforming gsprites that impinge upon that band according to the gsprite display list. We will describe this display process in more detail below.

After transforming gsprite data, the image processor composites the resulting pixel data. This includes computing the color and alpha for pixels in output device coordinates based on the gsprite transforms. The image processor transforms the pixel data for gsprites in the display list and then composites the transformed pixel data. The process involves determining the color and alpha at a pixel location based on the contribution of one or more pixel values from gsprites that cover that pixel location.

In one embodiment, the image processor loops on bands and composites pixel data for each band. The image processor double buffers pixel data: it transforms and composites gsprite data for a band in one buffer while it displays composited pixel data for another band.

After compositing pixel data, the image processor then transfers composited pixel data to an output device. The most typical output device used in connection with this system is, of course, a display. To display the pixel data, it is converted to a format compatible with the display.

Having described system operation of an embodiment, we now provide more detail regarding the image processing board.

The Image Processing Board

In the one embodiment, the shared memory 216 comprises 4 Mbytes of RAM. It is implemented using two 8-bit Ram bus channels. The amount and type of memory can vary, however.

Figure 8:
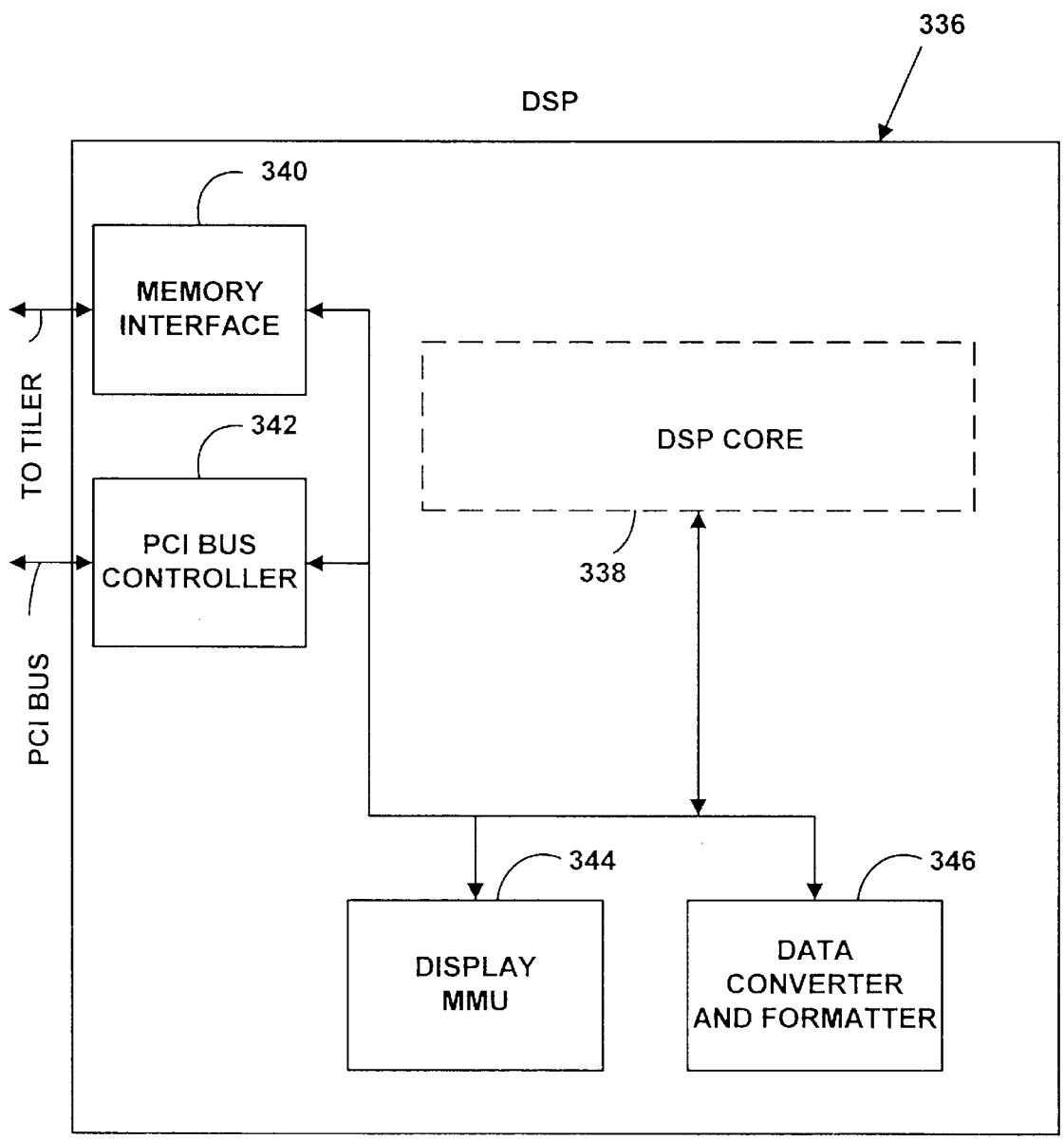
FIG. 8 is a block diagram of a digital signal processor (DSP) in an embodiment.

FIG. 8 is a block diagram illustrating the DSP 336 on the image processing board 174. The DSP 336 is responsible for parsing the command stream from the host processor and performing some video processing, and front end geometry processing. The DSP performs front end geometry and lighting calculations used for 3-D graphics. This includes model and viewing transformations, clipping, and lighting. Portions of the gsprite animation management are also handled in the DSP such as gsprite motion extrapolation.

Rendering commands are stored in main memory buffers and DMAed to the image processing board 174 over the PCI bus and through the PCI bus controller 342. These commands are then buffered in the shared memory 216 on the board until needed by the DSP 336 (FIG. 8).

The DSP core 338 includes a processor for performing the image processing computations described above. In addition the DSP core performs scheduling, and resource management.

The Memory interface 340 supports high speed data transfers, e.g. 64 bits at 80 MHz. It is designed to interface with conventional DRAM and SDRAM devices. The tiler 200 is designed to directly connect to this bus, simulating the memory timing required by the DSP.

The data formatter and converter 346 in the DSP formats rendering instructions for the tiler. This block converts floating point color components into integer and packs them into the tiler specific data structures. It also buffers up a complete command and DMAs it directly to a memory buffer in shared memory. These rendering instructions are later read by the tiler when it is ready to perform the operations.

Among its formatting tasks, the data formatter and converter 346 formats triangle command data for the tiler. R G B α (alpha) data which is calculated by the DSP (336) in floating point is converted to 8 bit integer. Coordinate information is converted from floating point to 12.4 fixed point. The data is packed into 64 bit words and transferred in a contiguous block to the shared memory to optimize bandwidth.

The display memory management unit (NMU) 344 is used for desktop display memory. It traps PCI accesses within a linear address range that is allocated as the desktop display memory. It then maps these accesses to image blocks stored in shared memory.

The architecture of the image processing board (FIG. 4A, 174) is relatively independent of the specific DSP. However, the DSP should preferably have significant floating point performance. Suitable DSPs include the MSP-1 from Samsung Semiconductor and TriMedia from Phillips Semiconductor. These specific DSPs are two examples of DSPs that provide sufficient floating point performance.

Figure 9A:
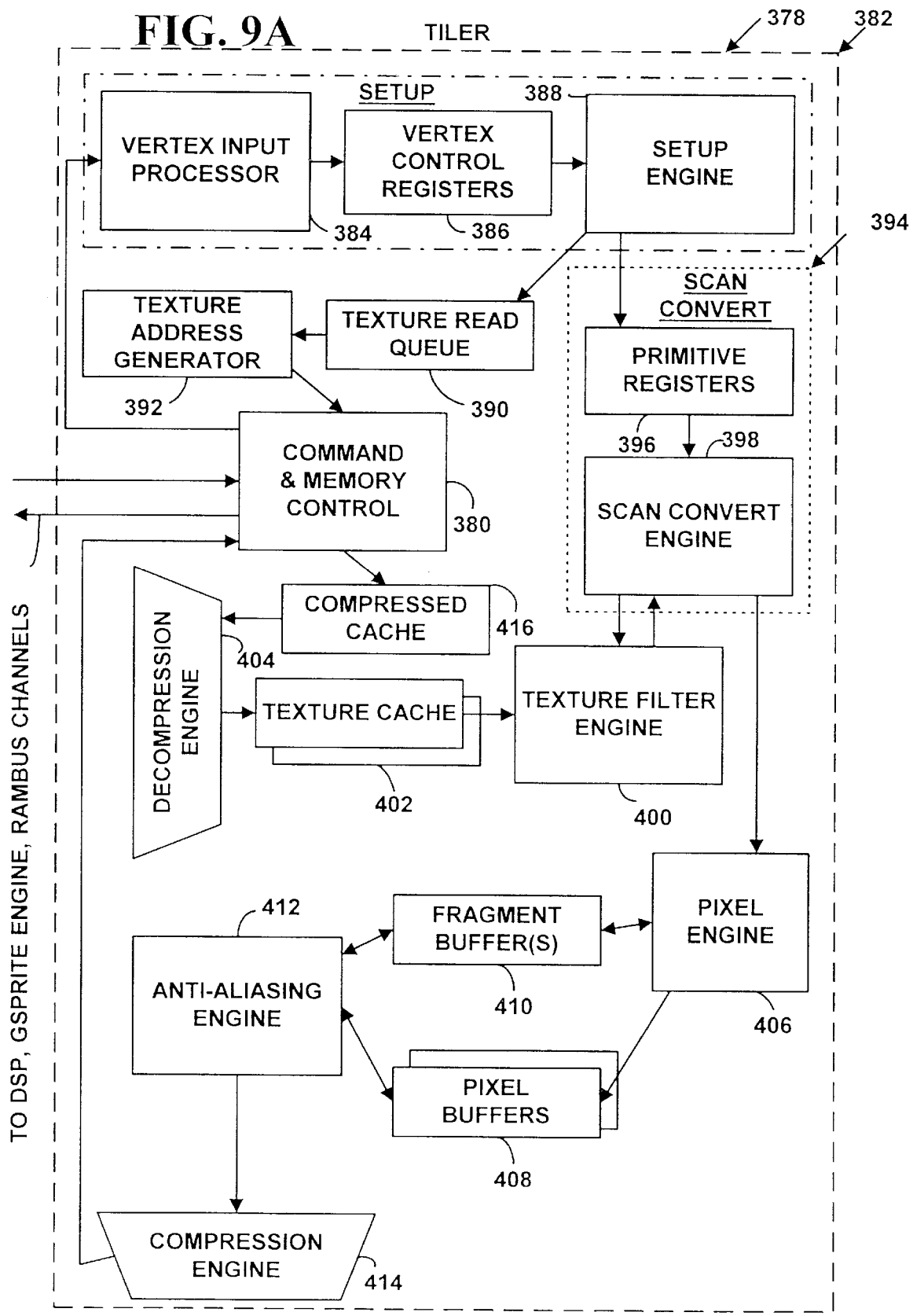
FIGS. 9A–C are block diagrams illustrating alternative embodiments of a tiler.

FIG. 9A is a block diagram of the tiler 200 on the image processing board 174. The tiler is responsible for 2-D and 3-D graphics acceleration, and for shared memory control. As shown in the block diagram of the image procession board, the tiler connects directly to the DSP (176, FIG. 4), the gsprite engine 204, and the shared memory system 216.

The functional blocks shown in the block diagram above are described in this section.

The tiler 378 includes a number of components for primitive rendering. The command and memory control 380 includes an interface to shared memory 216, the gsprite engine 204, and the DSP 176. Accesses to memory from the tiler, DSP, and gsprite engine are arbitrated by this block. A queue is provided to buffer read accesses.

The setup block 382 calculates the linear equations which determine the edge, color, and texture coordinate interpolation across the surface of the triangle. These equations are also used to determine which texture blocks will be required to render the triangle. The edge equations are also passed to the scan conversion block 394 and are stored in the primitive registers 396 until required by the scan convert engine 398.

The setup block 382 includes three components: the vertex input processor 384, vertex and control registers 386, and the setup engine 388. The vertex input processor 384 parses the command stream from the DSP. The vertex and control registers 386 store the information necessary for processing polygons or other geometric primitives. Triangle processing is used in this specific embodiment, and the tiler 200 includes registers for six vertices (three for each triangle) to allow double buffering of triangle processing. The setup engine 388 calculates the differentials for color, depth, edges, and texture coordinate interpolation across the surface of the triangle. These equations are also used to determine which texture blocks are used to render the triangle. The setup engine also pre-fetches texture chunks so that they are available when needed by the scan convert engine 398.

The setup engine 388 also communicates with the texture read queue 390, and a texture address generator 392. The texture read queue 390 buffers read requests for texture blocks from shared memory. While we use the term "texture" in referring to the portions of the tiler used to retrieve image data blocks from memory, it should be understood that this term can refer to texture maps, shadow maps, and other image data used in multi-pass rendering operations. The texture address generator 392 determines the address in memory of the requested chunks and sends texture read requests to the command and memory control 380. The texture address generator 392 includes a memory management unit that controls the writing of image data to the texture cache.

The scan convert block 394 receives differentials and other vertex data from the setup block and generates pixel data. The scan convert block 394 includes primitive registers 396, and the scan convert engine 398. The primitive registers 396 store the equation parameters for each triangle parameter. The primitive registers include registers to store multiple sets of equations so that the scan convert engine does not stall waiting for texture data.

The scan convert engine 398 scan converts polygons, which in this case are triangles. The scan convert block 394 includes the interpolators for walking edges and evaluating colors, depths, etc. The pixel address along with color and depth, and anti-aliasing coverage information is passed to the pixel engine for processing.

The scan convert engine 398 passes texture addresses to the texture filter engine 400, which calculates the texture data. The texture filter engine 400 calculates pixel color and alpha data for polygons that are being rendered. The illustrated texture filter engine computes a filter kernel based on the Z-slope and orientation of the triangle being rendered, and on the center of the texture request (the S and T coordinates of a point mapped into the texture). Filtering is performed in two passes in a pipelined fashion so that a new pixel is generated every cycle. The filter kernel can be an anisotropic filter or an isotropic filter. Where anisotropy is not required, the filter kernel can use negative lobes allowing much sharper textures than is possible with tri-linear interpolation. The texture filter engine 400 also handles Z-comparison operations for computing effects on shadows.

The texture cache 402 stores blocks of decompressed image data. In one implementation, the texture cache 402 stores texture data for sixteen 8×8 pixel blocks. The data is organized so that 16 texture elements can be accessed every clock cycle.

The decompression engine 404 decompresses texture data and transfers it to the texture cache 402. In this embodiment, the decompression engine includes two decompressors, one which implements a discrete cosine transformation (DCT) based algorithm for continuous tone images such as textures, and the other which implements a lossless algorithm for desktop pixel data. The DCT based algorithm is implemented by two parallel decompression blocks, each of which can generate eight pixel elements (i.e. two pixels) per clock cycle.

The compressed cache 416 can be used to buffer compressed data before the decompression engine 404 decompresses and transfers it to the texture cache 402.

The scan convert engine 398 transfers pixel data to the pixel engine 406. The pixel engine 406 performs pixel level calculations including blending, and depth buffering. The pixel engine also handles Z-comparison operations required for shadows. To achieve optimal performance, the pixel engine should preferably operate at one pixel per clock cycle.

The pixel engine 406 controls transfers of pixel data to a rasterization buffer. The rasterization buffer includes pixel buffers 408, and fragment buffers 410 in the illustrated embodiment. The pixel buffers 408 include two buffers to support double buffering. In this implementation of the pixel buffers, each pixel entry stores eight bits per color component (R G B), eight bits for the alpha component, 24 bits for the Z-buffer, 8 bits for the stencil buffer, and a nine bit pointer into the fragment buffer. This is a total of 73 bits per pixel. One pixel buffer is used by the pixel engine 406 while the other is used by the anti-aliasing engine 412. The buffers are then swapped.

The fragment buffers 410 store fragments for partially covered pixels called pixel fragments, which result from pixels of polygons whose edges cross a given pixel, or are translucent. The fragment buffer is single buffered in the implementation shown in FIG. 9A. A free list of fragments is maintained, such that as fragments are resolved, they are added to the free list, and as fragments are generated, they use entries from the free list. Alternatively, the fragment buffer could be double buffered, so that one fragment buffer could be resolved by the anti-aliasing engine while the other was filled by the pixel engine in parallel.

In one embodiment, a fragment record includes the same data as in the pixel buffer entries plus a 4×4 mask. The nine bit pointer is used to form a linked list of entries, with a reserved value indicating the end of the list. In this embodiment, the fragment buffers 410 includes a total of 512 entries, but the size can vary.

The anti-aliasing engine 412 calculates the color and alpha component for pixels which are affected by more than one polygon, which occurs when polygons only partially cover the pixel area (i.e. the polygon edges cross the pixel) or when polygons have translucency. The anti-aliasing engine 412 transfers resolved pixel data to the compression engine 414. In this embodiment, the compression engine 414 includes two compressors, one DCT based for continuous tone images, and one lossless for desktop pixel data. The DCT based algorithm is implemented using a compressor capable of compressing eight pixel elements per clock cycle. The compression engine 414 compresses the resulting rendered gsprites and sends the compressed data to the command memory and control 380 for storage in shared memory 216 (FIG. 4). The tiler also has a compressed cache 416 for caching compressed data.

Figure 10:
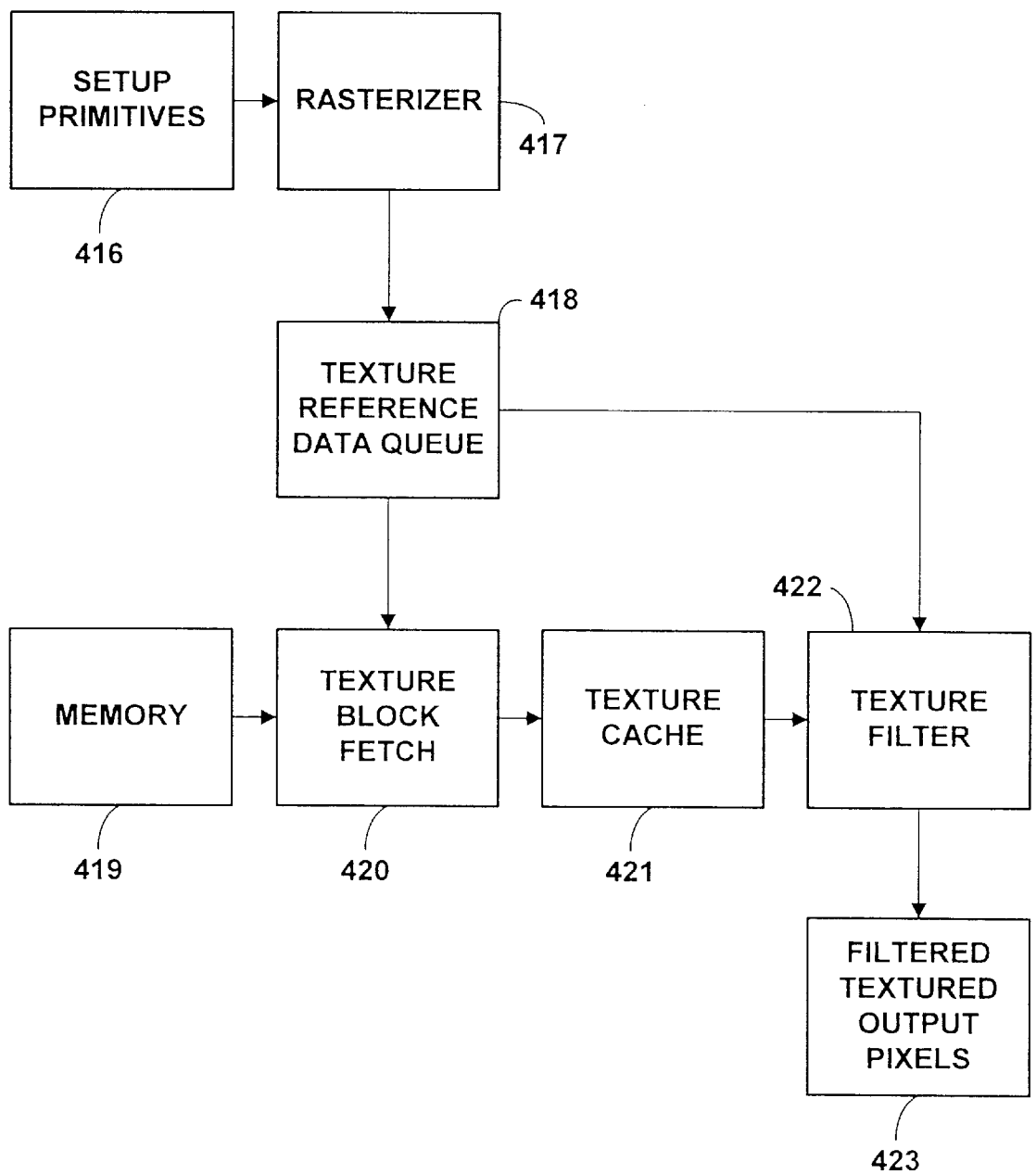
FIG. 10 is a block diagram illustrating a system for accessing texture data from memory.
Figure 11:
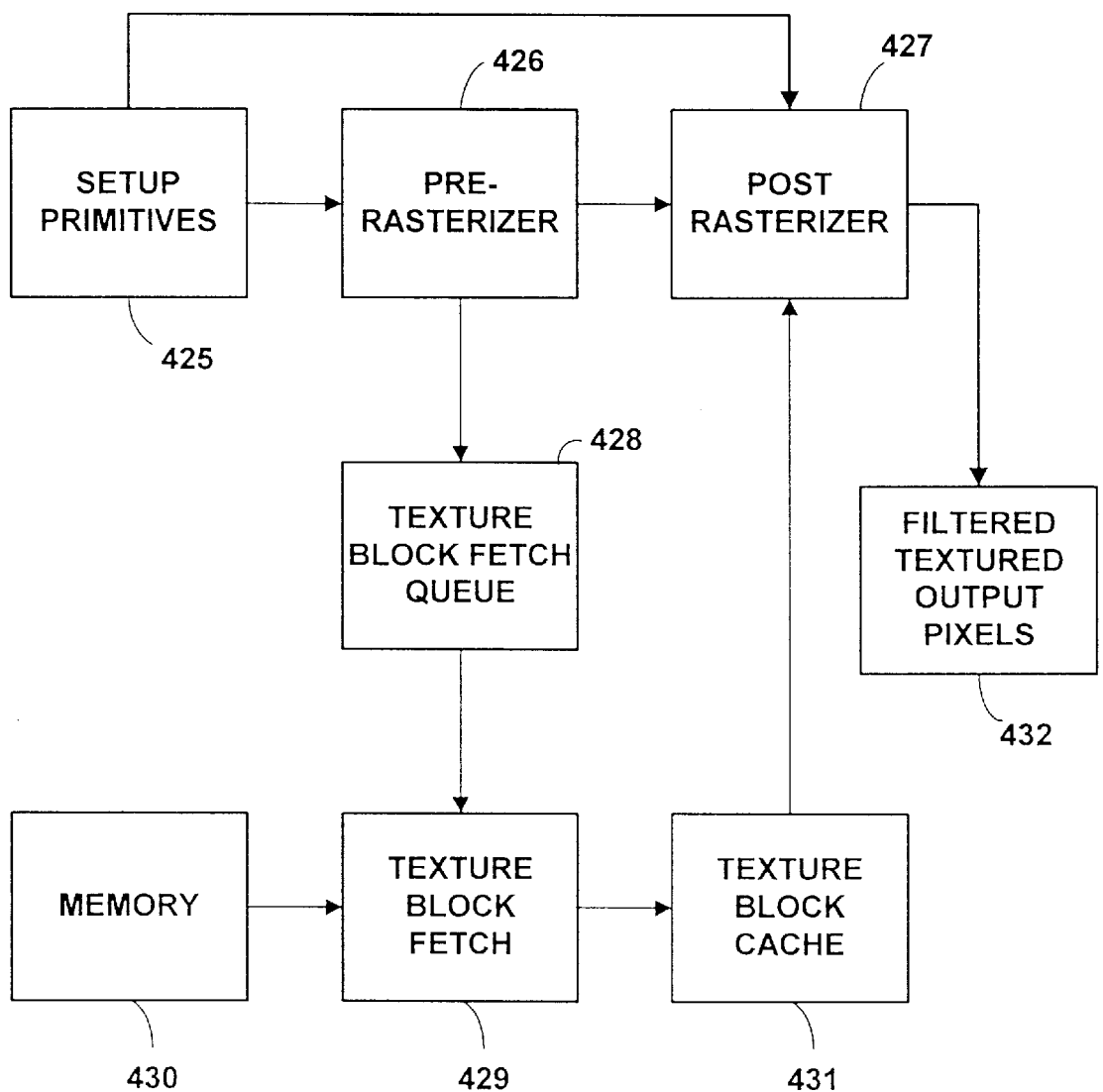
FIG. 11 is a block diagram illustrating a system for accessing texture data from memory.

FIGS. 10 and 11 illustrate two alternative implementations for accessing image data from memory during the pixel generation process. There are a number of instances when image data has to be accessed from memory during pixel generation. These include for example, accessing a texture map during a texture mapping operation, accessing a shadow map during a shadowing operation, and accessing color and/or alpha data during multi-pass blending operations. For simplicity, we refer to the image data in memory as "textures" or "texture data". However, it should be understood that the methods and systems described here can also be applied to other types of image data accessed from memory during pixel generation.

The implementations illustrated in FIGS. 10 and 11 provide alternative approaches to efficiently load and utilize a texture cache on the tiler. A significant advantage of these approaches is that texture data can be stored in memories with high latency and even in a compressed format without unduly hampering performance. As a result, less specialized and lower cost memory can be used to implement high performance rendering hardware.

Texture data from the memory is accessed and cached in units called "blocks" which are typically a small rectangular region appropriate for efficient fetching and catching. A typical block size is about 8×8 samples in size. For instance, for texture maps, a typical block is 8×8 texels.

FIG. 10 is a functional block diagram illustrating one embodiment for accessing these blocks of texture data. This embodiment solves the latency problem by buffering pixel data from the rasterizer 417, including texture data requests, in a texture reference data queue 418. The queue includes enough entries to absorb the latency which would otherwise be incurred in accessing (and possibly decompressing) a texture block so that the rendering process can run at full speed. For example, if it takes 100 cycles to fetch a texture block, and the tiler is capable of producing one pixel per clock cycle, then the texture reference data queue includes at least 100 entries.

Data flow in the system illustrated in FIG. 10 proceeds as follows. First, geometric primitives are set-up for rasterization as shown in block 416. Set-up processing includes, for example, reading vertices for a geometric primitive such as a triangle, and calculating the differentials for color, depth, and edges across the surface of the triangle. The parameters resulting from these computations are then fed to the rasterizer 417.

The rasterizer 417 reads the equation parameter data for each primitive and generates pixel data. The rasterizer generates pixel data, including texture coordinates and filter data, and buffers this data in the texture reference data queue 418. The texture fetch block 420 reads texture reference data stored in the queue 418 and fetches the appropriate texture blocks from memory 419.

The pixel data stored in the texture reference data queue 418 in this implementation includes: an address of destination for the pixel (X, Y) being computed; depth data (Z); a coverage mask; color and translucency data; the coordinates of the center for the texture request (S, T); and texture filter data. The depth and coverage data is only needed in the texture reference data queue if high-quality anti-aliasing of pixels is desired. Alternatively, hidden surface removal and antialiasing can be performed in the rasterizer 417. If hidden surface removal and antialiasing are performed in the rasterizer, depth data and coverage data does not need to be stored in the data queue 418. The texture filter data may include a level of detail parameter for MIP-mapping, for example, or may include anisotropic filter data for higher quality texture filtering.

The texture block fetch 420 reads the texture reference data buffered in the data queue and retrieves the corresponding texture data from memory 419. In the case of texture map accesses, the texture block fetch unit converts the (S, T) center of the texture request and the texture filter data into the addresses of the blocks required to satisfy the texture filtering operation. The blocks identified in this process are then fetched into the cache, replacing other blocks as needed. Image data blocks can be fetched using a least recently used (LRU) or other suitable cache replacement algorithm. To reduce memory accesses, the texture block fetch unit keeps track of the texture blocks already stored in the texture cache 421 and avoids requesting the same block more than once. This capability significantly reduces the memory bandwidth required to perform high quality texture filtering because the latency in retrieving a texture block is incurred only once in computing an image.

The texture block fetch unit includes a hold-off mechanism to prevent from overwriting texture blocks still needed in the texture filter unit in the tiler. One way to implement such a hold-off mechanism is to associate a reference count with each texture block to keep track of whether the texture filter has used a particular texture block. This reference count is incremented on receipt of a texture request to a block by the texture fetch unit, and decremented in response to its use by the texture filter unit. The texture block fetch unit then only replaces blocks that have a corresponding reference count of zero.

An alternative way to implement the hold-off mechanism is to allocate a buffer for temporary storage of texture blocks output by the texture fetch unit. In this approach, the image block is first written to temporary storage buffer. After the texture fetch unit has completed writing the image block to the temporary storage buffer, it can then be transferred to the texture cache. Image blocks are swapped to the texture cache when first needed by the texture filter unit 422.

In the case of texture mapping operations, the texture filter block 422 reads texture samples from the texture cache 421 and the pixel data stored in the texture reference data queue 418, and computes pixel color and possibly alpha values from the texture sample data.

In addition to texture mapping operations, this approach can also be applied to shadowing and multi-pass blending operations as well. For instance, texture reference data queue can be used to retrieve a shadow depth map residing in memory. Alternatively, the texture reference data queue can be used to retrieve color and/or alpha data used in multi-pass lighting and shading operations. More detail regarding texture mapping, shadowing, and multi-pass operations is provided below.

There are a number of advantages to buffering pixel data in the manner described above. One significant advantage is that the image data can be stored in less specialized memory (with higher access time), which reduces the cost of the overall system. In addition, image data including textures can be stored in compressed format and can still be accessed at fast enough rates to perform sophisticated pixel operation such as texture filtering. As a result, the system is able to achieve improved performance at a lower cost relative to known methods for accessing texture data.

Another advantage to this approach is that the texture reference data queue is able to predict accurately which image blocks need to be accessed from memory. As a result, the system incurs latency for memory accesses no more than necessary. Once the image data blocks are in the texture cache, the texture filter unit can run at the full speed of the rasterizer, as long as there is sufficient memory bandwidth and texture fetch throughput to write the requested image blocks to the texture cache.

Queuing texture references with the texture request center and filtering the data allows the queue to be much smaller than if texels with their corresponding texture filter weights were queued.

FIG. 11 is a functional block diagram illustrating an alternative embodiment for accessing image data from memory. In this approach, geometric primitives are queued and then processed in a pre-rasterizer to hide the latency of the texture block fetch during the pixel generation process. An example will help illustrate the concept. If an average primitive takes 25 cycles to rasterize, and it requires 100 clock cycles to fetch a texture block from memory, the primitive queue should be at least four primitives long. A simplified version of the post-rasterizer, the pre-rasterizer includes circuitry to determine the image data blocks that need to be accessed from memory. Once the texture data is fetched, the post-rasterizer can generate pixel data using texture data without being exposed to the delay involved in fetching blocks from memory.

The data flow through this implementation occurs as follows. As in the implementation described above, geometric primitives are processed in a set-up block 425 for rasterization. In this particular implementation, however, the set-up block 425 includes a larger primitive queue to buffer more primitives. The pre-rasterizer 426 quickly converts the primitives into a list of texture blocks needed to satisfy the texture filtering needs for all of the pixels covered by the primitive in the order that the blocks will be needed by the post-rasterizer 427. The pre-rasterizer is a simplified version of the post-rasterizer 427, or the rasterizer 417 in the alternative implementation. In this approach, the pre-rasterizer only needs to compute texture data addresses and determine texture requests.

The pre-rasterizer also keeps a model of the texture block cache and performs the cache replacement algorithm, such as least recently used (LRU) to keep from exceeding the size of the texture block cache. As part of the cache replacement algorithm, the pre-rasterizer compresses repetitive requests to a single texture block to only one request to the texture block fetch unit 429.

The texture block fetch queue 428 includes entries for storing texture block requests. The texture block fetch unit 429 reads texture requests from the texture block fetch queue and retrieves the appropriate blocks from memory 430.

The post-rasterizer rasterizes primitives queued in the set-up block 425 to generate pixel data for a pixel location. If image data needs to be accessed from memory during the pixel generation process, the post-rasterizer rasterizes the primitives as quickly as the necessary texture blocks can be transferred to the texture block cache 431. When the post-rasterizer completes rasterizing a primitive queued in the set-up block, the primitive is removed and replaced with another primitive from the input data stream. The set-up block is responsible for keeping the queue filled with primitives so that the pre-rasterizer and post-rasterizer are not stalled in the pixel generation process.

Like the alternative embodiment described above, the texture block fetch should preferably include a hold-off mechanism to prevent it from overriding the texture blocks that are still needed by the post-rasterizer. The two hold-off mechanisms described above can also be used in this implementation. Specifically, a reference count can be used to keep track of when an image block has been requested and then used. In this case, the reference account would be incremented on receipt of a texture request for a block by the pre-rasterizer, and decremented upon use by the post-rasterizer. The texture block fetch unit then only replaces blocks in the texture cache when their corresponding reference count is zero.

Alternatively, a buffer can be allocated for temporary storage of texture blocks output by the texture fetch block. When the texture fetch block has completed writing a block to this temporary buffer, it can then be transferred to the texture block cache 431 when requested by the post-rasterizer 427. When the post-rasterizer 427 first request data in a texture block in the temporary buffer, the block is then transferred to the texture block cache 431.

There are a number of advantages to this approach. First, texture data can be stored in less specialized memory and can still be accessed at rates required to support sophisticated texture filtering. An important related advantage is that texture data can be stored in a compressed format and then decompressed for use in the pixel generation process.

Another advantage of this approach is that requests to memory can be predicted so that the latency for memory access is incurred only once for each texture block to render a scene. Once the initial texture blocks are in the texture cache, the post-rasterizer can run at full speed, as long as there is memory bandwidth and texture fetch throughput to keep the cache current.

Figure 9B:
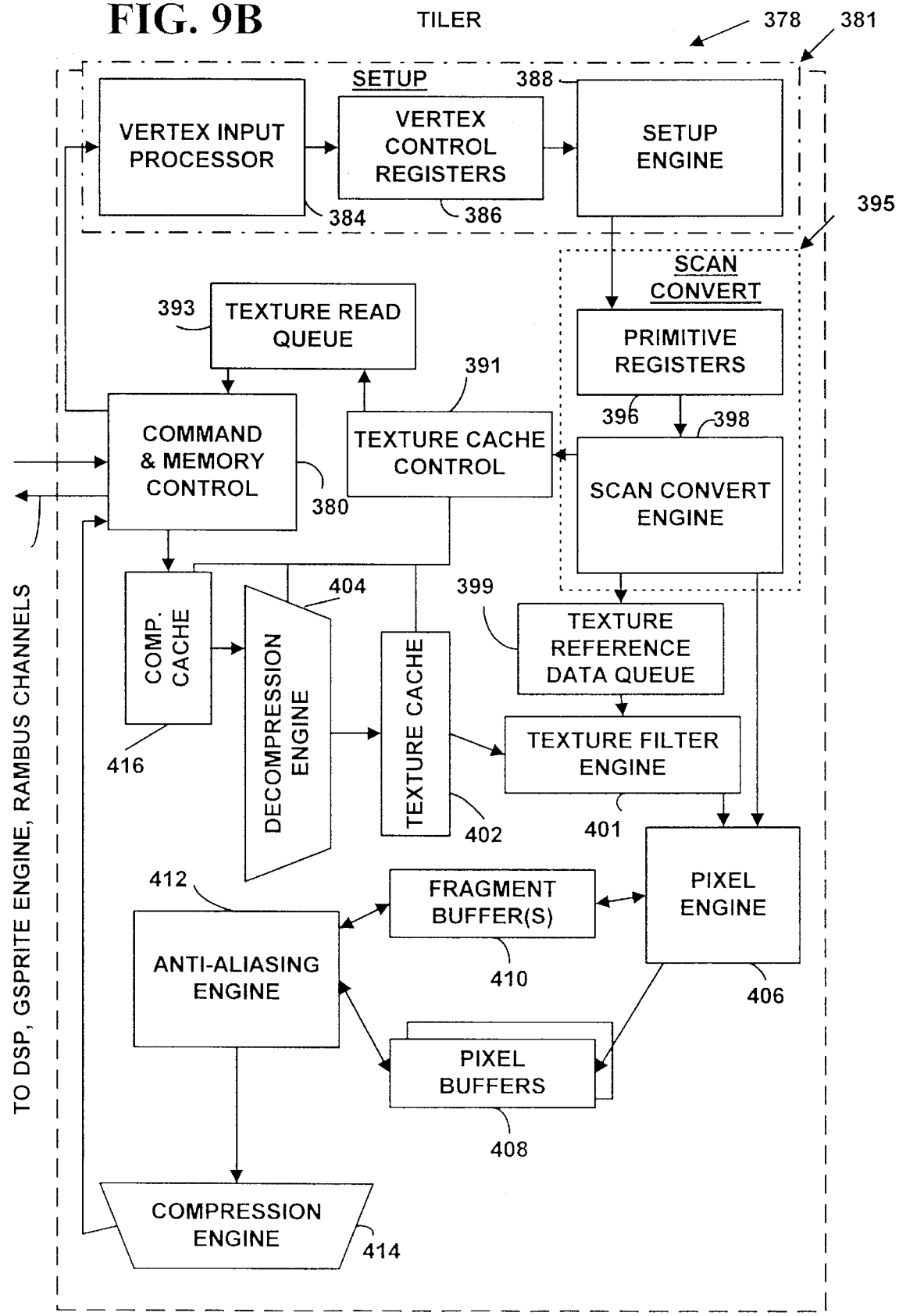

FIG. 9B illustrates a more detailed implementation of the system illustrated in FIG. 10. The set-up block 381 in FIG. 9B corresponds to the set-up block 416 in FIG. 10. Unlike the set-up block 382 of FIG. 9A, the set-up block 381 in this alternative implementation does not generate texture read requests. Instead, the scan convert block 395 generates pixel data, including texture reference data, which is buffered in the texture reference data queue 399.

The scan convert block 395 of FIG. 9B is a specific implementation of the rasterizer 417 in FIG. 10. It computes a Z-value, a coverage mask, color and translucency data, and the center of the texture request in texture coordinates. For some texture mapping operations, it also computes level detail data or anisotropic filter data. The texture filter engine 401 reads the texture request and possibly texture filter data buffered in the texture reference data queue 399 and accesses the appropriate texture samples in the texture cache. From this texture data, the texture filter engine computes the contribution of the texture to the pixel color and alpha values. The texture filter engine combines the color and alpha in the texture reference data queue 399 with the contribution from the texture to generate pixel values sent to the pixel engine 406.

The texture cache control 391, texture read queue 393, command and memory control 380 are specific implementations of the texture block fetch 420 in FIG. 10. In addition, for compressed texture blocks, the compressed cache 416 and the decompression engine 404 are also part of the texture block fetch 420.

Figure 9C:
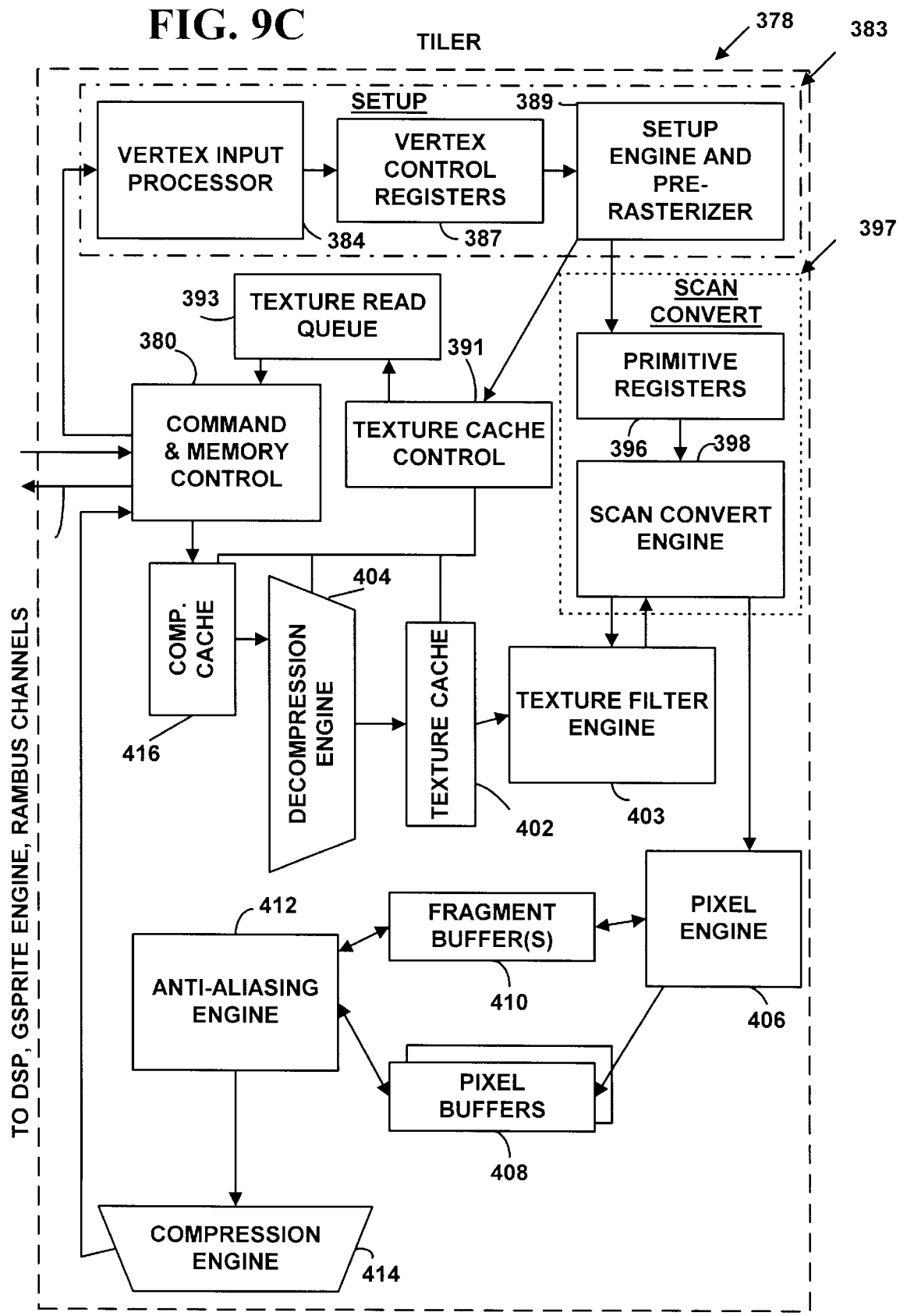

FIG. 9C illustrates a more detailed implementation of the system illustrated in FIG. 11. In this implementation, the functionality described in connection with blocks 425 and 426 of FIG. 11 is implemented within the set-up block 383. Specifically, the set-up block 383 includes the pre-rasterizer 426. The set-up block 383 also includes additional vertex control registers 387 to buffer additional primitives so that the prerasterizer can quickly convert the primitives to initiate texture data requests. The setup engine and pre-rasterizer 383 sends requests for texture blocks to the texture cache control 391 shown in FIG. 9C.

The texture cache control 391 ensures that the required texture blocks will be in the texture cache 402 when needed. The texture read queue buffers read requests for texture data blocks to the shared memory system. The command and memory control 380 arbitrates access to the shared memory system, and it includes a buffer for buffering data from memory. The texture cache control 391, texture read queue 393, and the command and memory control 380 are specific implementations of the texture block fetch 429 in FIG. 11. For compressed texture blocks, the compressed cache 416 and the decompression engine 404 are also part of the texture block fetch 429. The texture cache control 391 manages the flow of texture blocks from the compressed cache 416, through the decompression engine 404, into the texture cache 402.

The scan convert block 397 and the texture filter engine 403 are a specific implementation of the post-rasterizer 427 in FIG. 11. The scan-convert block 397 and the texture filter engine 403 operate similarly to their counterparts illustrated in FIG. 9A and described above.

Texture Cache Control

Above, we described two approaches for rasterizing in environments with high latency for texture fetch operations. We now describe aspects of the texture cache control in more detail.

The texture cache control scheme allows a rasterizer to function at full speed during texture mapping in spite of a high latency for texture map fetch operations. In the tiler, this latency is the result of the time required to read uncompressed texture data from shared memory (e.g., RAMBUS) plus the time required to decompress blocks of the texture map. The scheme also applies to the gsprite engine, which fetches gsprite blocks from shared memory, possibly decompresses them, and converts pixel data in gsprite space to view space (or more specifically, to screen coordinates).

The basic premise of the texture cache control scheme is to produce two identical streams of texel (or gsprite pixel) requests which are offset in time. The first (earlier) stream is a pre-fetch request for which no texture data is returned, while the second (later) stream is an actual request which does return texel data. The time difference between these two streams is used to hide the latency of reading and decompressing texture data.

Two approaches for generating these time-separated requests described above are: (1) duplicate rasterizers which both read from a single primitive FIFO (FIG. 11 and 9C); and (2) a single rasterizer followed by a pixel FIFO (FIG. 10 and 9B).

In approach (1), the first rasterizer peeks at primitives from positions at or near the input side of the primitive FIFO and rasterizes the primitives, making texture requests but not receiving any texels back and not producing any pixels. The second rasterizer removes primitives from the FIFO output and makes the identical requests at a later time, receives the texels from the texture cache controller, and produces the pixels. The depth of the primitive queue combined with the number of pixels per primitive determines the potential time difference between the two request streams.

In approach (2), the single rasterizer processes primitives and makes texture requests and outputs partially complete pixel data into a pixel FIFO. This partial pixel data includes all data that is necessary to finish computing the pixel once the texture requests are honored. At the output side of the pixel FIFO, the partial pixel is completed, which produces the identical stream of texture requests, receives the texels, and produces completed pixels. The depth of the pixel queue determines the potential time difference between the two request streams.

The Texture Cache Control

The texture cache control has two conceptual caches: the virtual cache, and the physical cache. The virtual cache is associated with the first (pre-fetch) request stream, and has no data directly accompanying the cache entries (requests to this cache do not return any data). The physical cache is associated with the second (actual) request stream, and has real texture data accompanying each cache entry (and thus returns data to the requester). These caches have the same number of entries.

The virtual cache controls and tracks the future contents of the physical cache, thus at any position in its request stream it has a set of cache key and entry associations which the physical cache will have at the same relative position in its request stream (at a future time).

Upon receiving a request (a new 'key'), the virtual cache performs the comparison against its current set of keys. If the requested key is not in the virtual cache, then a cache replacement operation is performed. The virtual cache replacement includes 1) selecting an entry for replacement (via LRU or some other algorithm), 2) replacing the key for that entry, and 3) invoking the (memory and) decompression subsystem to begin the process of fetching and decompressing the data associated with that key. The particular implementations shown in FIGS. 9B and 9C, the decompression subsystem includes the command and memory control 380, compressed cache 416, and decompression engine 404.

The output of the decompression subsystem is a block of texture data which is then placed into an entry in the physical cache (the texture cache 402, for example). In the tiler shown in FIGS. 9B and C, processing performed by the decompression subsystem is performed in a multi-entry pipeline in which serial order is maintained.

Note that if the requested key was already in the virtual cache, then no action is required because the associated data will be in the physical cache at the time it is requested from the second request stream.

Requests to the physical cache result in a similar key comparison to see if the requested data is already in the cache. If a matching key is found, then the associated data is returned. If a match is not found, then the next data output by the decompression subsystem is guaranteed to be the desired data. Note that the physical cache does not perform any replacement entry selection processing—the entry in the physical cache replaced by this new data is dictated by the virtual cache via a cache entry 'target' index computed by the virtual cache controller and passed through the decompression subsystem with the requested data.

Correct functioning of the scheme requires that flow control be applied to the interface between the decompression subsystem and the physical cache. If decompressed data is allowed to overwrite its targeted entry in the physical cache immediately upon being available, it is possible that all of the references to the previous contents of that cache entry may not have been completed. (Note that the physical cache controller also may have to wait for data to be output by the decompression subsystem.)

This flow control is accomplished by waiting until the new entry is requested before overwriting the previous entry's contents. Placing new data into the texture cache is thus always deferred until the last moment until it is needed.

Since this replacement is deferred until it is needed, any time required to place the data into the physical cache can introduce latency into the process driving the second request stream. Two schemes for alleviating this latency are as follows.

The first scheme is to double buffer data in the physical cache. This allows the decompression subsystem to immediately write each entry's data into its side of the double buffer, and the physical cache controller can do a (presumably fast) buffer swap to map the data into its side of the cache. The decompression subsystem only has to wait if the entry to be filled is already full and has not been swapped yet. Note that the cache replacement algorithm used by the virtual cache controller will tend to not repeatedly overwrite the same entry, thus 'spreading out' the writes to the cache entries.

The second scheme is for the physical cache to have one or more 'extra' entries in addition to the number of 'keyed' entries. The number of keyed entries is the number for which cache keys exist, and matches the number of entries in the virtual cache. The number of extra entries represents the number of entries which are unmapped (i.e. not currently keyed). The sum of these is the total number of data entries in the physical cache.

In the second scheme, all cache entries can transition between unmapped to mapped (associated with a key). The set of unmapped entries forms a FIFO of entries into which the decompression subsystem writes completed blocks of data. A separate FIFO structure is maintained for the target indices associated with these unmapped entries. When a request to the physical cache is made for which a matching key is not present, the first entry in the queue of unmapped of entries is mapped in to the targeted index and associated with that key. The replaced entry is unmapped and placed (empty) at the end of the unmapped queue.

Cache Key Generation

The basic premise of the scheme is that two identical streams of requests are generated. It is not a requirement, however, that the specific keys which are associated with these requests be identical.

The cache keys which form the first (early) stream of requests are used to control the reading and subsequent decompression of texture data. These keys must have some direct relevance to the requested data (such as a memory address).

The cache keys which form the second (later) stream of requests do not need to precisely match the content of the first stream—it is only a requirement that there be a unique one-to-one mapping between the two. This is due to the fact that the keys for the second stream are used only for matching existing cache entries, not for any data fetching operation. The critical fact here is that the association between the physical cache's key and a cache entry is made when the new data is mapped in to the physical cache, and the index of the associated entry is computed by the virtual cache and passed through the decompression subsystem.

This fact can be exploited to simplify the controls for the process which is generating the keys for the second request stream, since the keys for the stream need only be unique and not precisely 'correct'.

Figure 12A:
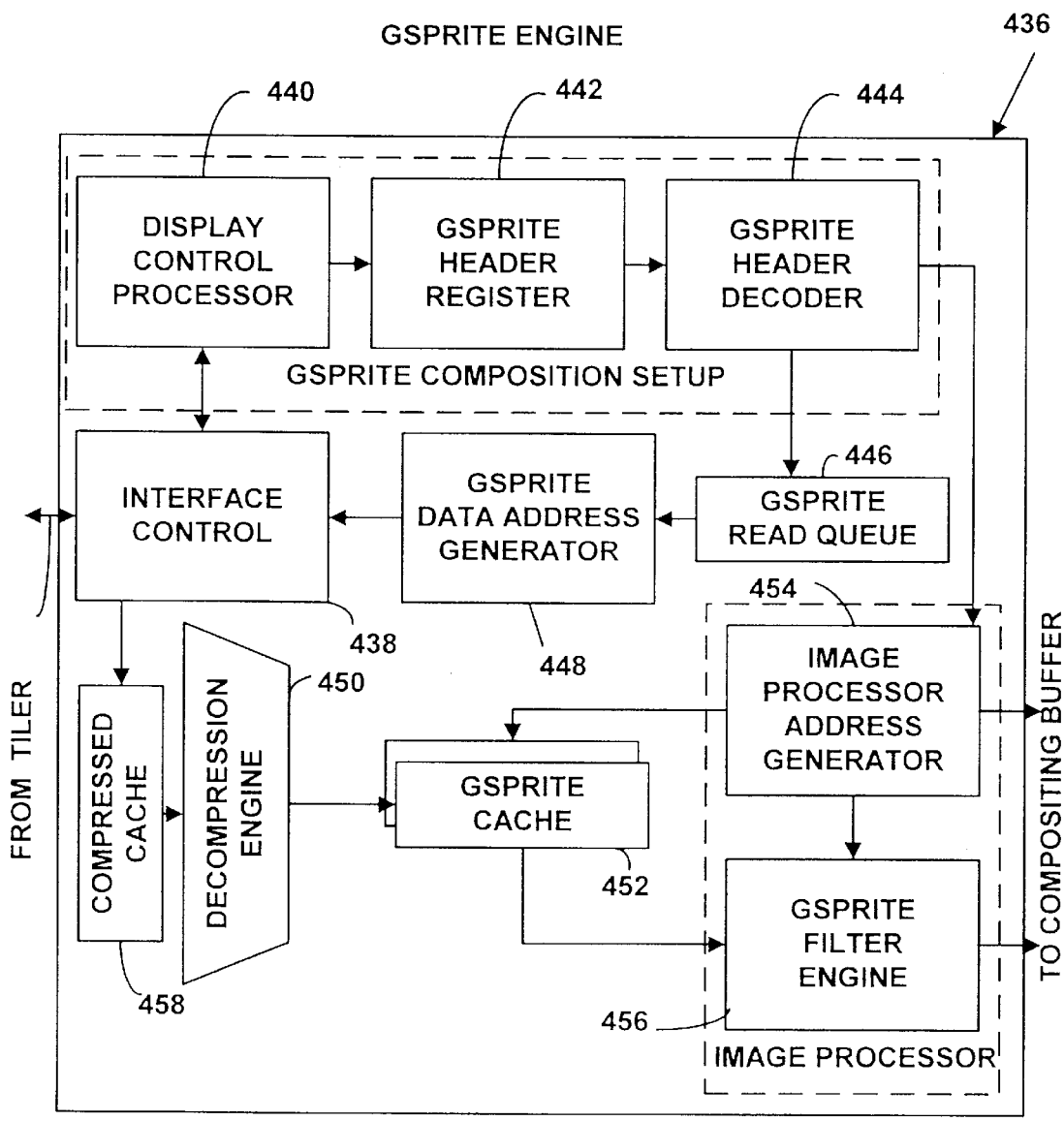
FIGS. 12A–B are block diagrams of alternative implementations of a gsprite engine.

FIG. 12A is a block diagram illustrating the gsprite engine 436 on the image processing board 174. The gsprite engine 436 is responsible for generating the graphics output from a collection of gsprites. It interfaces with the tiler memory interface unit to access the gsprite data structures in shared memory. Gsprites are transformed (rotated, scaled, etc.) by the gsprite engine and passed to the compositing buffer where they are composited with pixels covered by other gsprites.

Interface control 438 is used to interface the gsprite engine with the shared memory system via the tiler. This block includes a FIFO to buffer accesses from the memory before they are distributed through the gsprite engine.

The display control 440 processor is used to control the video display updates. It includes a video timing generator which controls video display refresh, and generates the timing signals necessary to control gsprite accesses. This block also traverses the gsprite display data structures to determine which gsprites need to be read for any given 32-scanline band.

The gsprite header 442 registers store gsprite header data which is used by the image processor address generator 454 and gsprite filter engine 456 to determine the transformations on each gsprite. It is also used by the gsprite header decoder 444 to determine the blocks (in this case, the 8×8 compression blocks) required to render the gsprite in each band.

The gsprite header decoder 444 determines which blocks from each gsprite are visible in the 32-scanline band and generates block read requests which are transferred The gsprite read queue 446. This block also clips the gsprite to the current band using the gsprite edge equation parameters. This process is described in more detail below.

The gsprite read queue 446 buffers read requests for gsprite blocks. This queue stores requests for sixteen blocks, in this embodiment.

The gsprite data address generator determines the address in memory of the requested gsprite blocks and sends gsprite read requests to the interface control block. The gsprite data address generator 448 includes a memory management unit.

Compressed data retrieved from shared memory 216 (FIG. 4A) can be temporarily stored in the compressed cache 458.

The decompression engine 450 includes two decompressors, one which implements a DCT based algorithm for continuous tone images such as 3-D gsprites and images, and the other which implements a lossless algorithm for desktop pixel data. The DCT based algorithm is implemented by two parallel decompression blocks, each of which can generate eight pixel elements (i.e. 2 pixels) per clock cycle.

The gsprite cache 452 stores decompressed, gsprite data (R G Bα) for sixteen 8×8 blocks. The data is organized so that 16 gsprite pixels can be accessed every clock cycle.

The image processor address generator 454 is used to scan across each gsprite based on the specified affine transformation and calculate the filter parameters for each pixel. Gsprite cache addresses are generated to access gsprite data in the gsprite cache 452 and feed it to the gsprite filter engine 456. The image processor address generator 454 also controls the compositing buffer.

The gsprite filter engine 456 calculates the pixel color and alpha for pixel locations based on the filter parameters. This data is transferred to the compositing buffers for compositing. This block 456 computes a 4 or 16 pixel filter kernel based on the gsprite s and t coordinates at a pixel location. The filter may, for example, either be bilinear or a more sophisticated sum-of-cosines function. The 16 pixel filter kernel can have negative lobes allowing much sharper filtering than is possible with bi-linear interpolation. The gsprite filter engine 456 generates four new pixels to be composited every clock cycle. These pixels are aligned in a two by two pattern.

The gsprite engine 436 interfaces to the tiler 200 and the compositing buffer 210. Control signals control video timing and data transfer to the DAC 212.

Figure 12B:
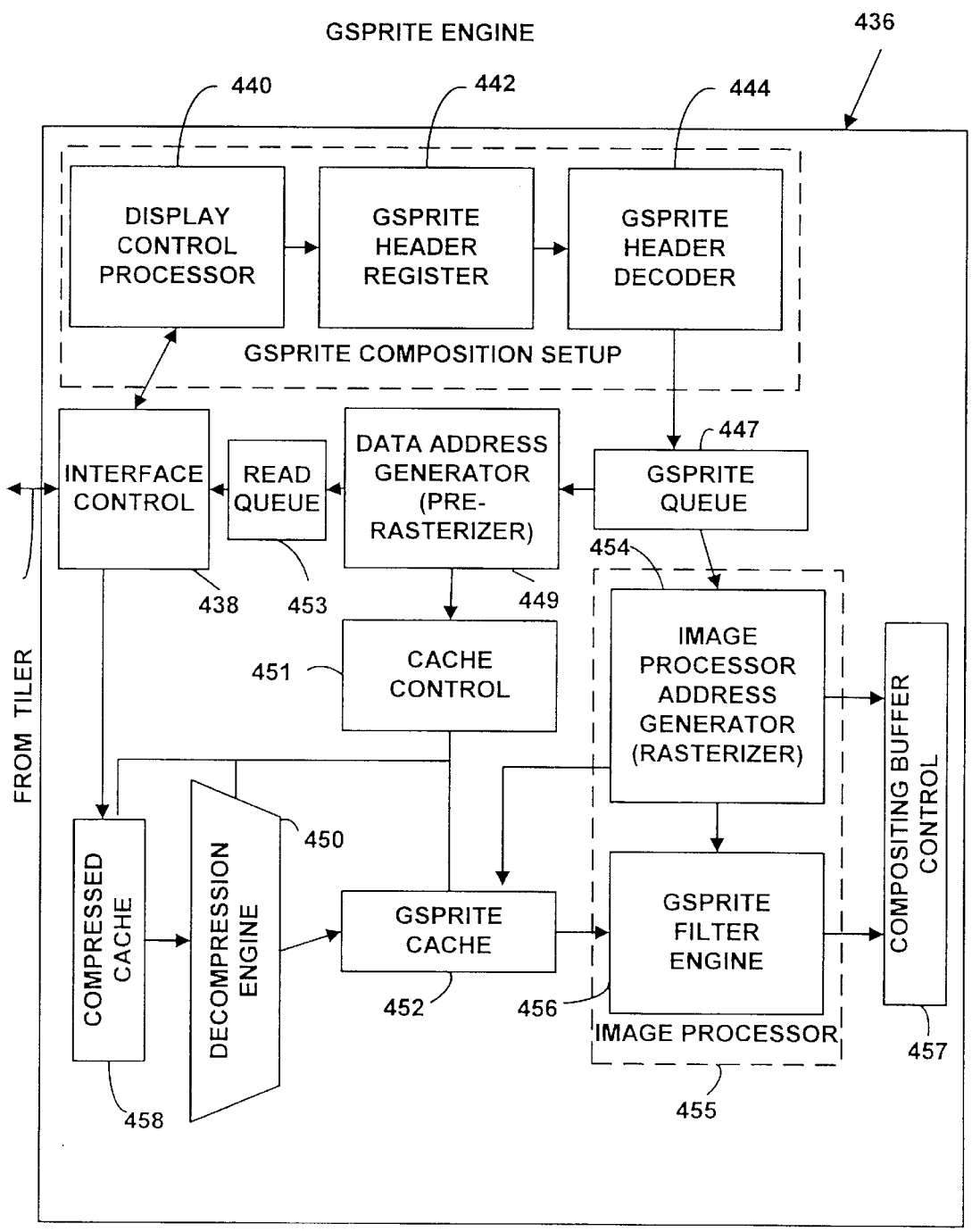

FIG. 12B is a block diagram of an alternative implementation of the gsprite engine 437. This particular implementation includes both a pre-rasterizer 449 and rasterizer 454 so that the gsprite engine can convert gsprite pixel data from gsprite space to screen space without incurring the latency in retrieving and decompressing blocks of gsprite pixel data. The dual rasterizer approach used in this implementation is described above in connection with FIG. 11 and 9C.

The operation of the blocks in the gsprite engine 437 is generally the same as described above for FIG. 12A except that this implementation uses the dual rasterizer method for fetching blocks of texture data. In this implementation (FIG. 12B), the gsprite header decoder 444 reads the gsprite header register 442, clips the gsprite to the current display band, and places the gsprite in the gsprite queue 447 for rasterization. The data address generator or "pre-rasterizer" 449 scans each gsprite based on the specified affine transform in the gsprite header and generates read requests to the gsprite cache control 451. Using a method described above in connection with the texture cache control, the sprite cache control 451 ensures that the required gsprite data blocks are in the gsprite engine 437 and specifically in the gsprite cache 452 when the image processor block 455 needs them. It manages the flow of gsprite data blocks from the compressed cache 458, through the decompression engine 450, and into the gsprite cache 452. The read queue 453 buffers requests for gsprite data blocks to the shared memory system, and the interface control 438 reads the requests in the read queue 453, controls accesses to shared memory, and places blocks of gsprite data in the compressed cache 458.

The decompression subsystem in the gsprite engine includes the compressed cache 458 and decompression engine 450. The cache control 451 controls the flow of gsprite blocks through this decompression subsystem as described above in connection with the texture cache control.

The image processor address generator (rasterizer) 454 scans each gsprite based on the specified affine transform in the gsprite header and calculates the filter parameters for each pixel. It also generates gsprite cache addresses of gsprite data, which it sends to a cache address map in the gsprite cache for use by the gsprite filter engine 456. In one specific implementation of the cache, the cache address map selects which 14 pixel blocks are active and which two blocks are filled from the decompression engine.

The gsprite filter engine 456 maps color and alpha data at pixel locations in gsprite space to screen space. In this implementation, it applies either a 2×2 or 4 by 4 filter kernel to compute pixel values (color or both color and alpha) at pixel locations in screen space. The compositing buffer control 457 passes pixel values, in this case four pixels per clock cycle, to the compositing buffer. The compositing buffer control 457 monitors the ready line from the compositing buffer to ensure that the gsprite engine 437 does not overrun the compositing buffer. The rasterizer 454 controls the compositing buffer control 457.

Figure 13:
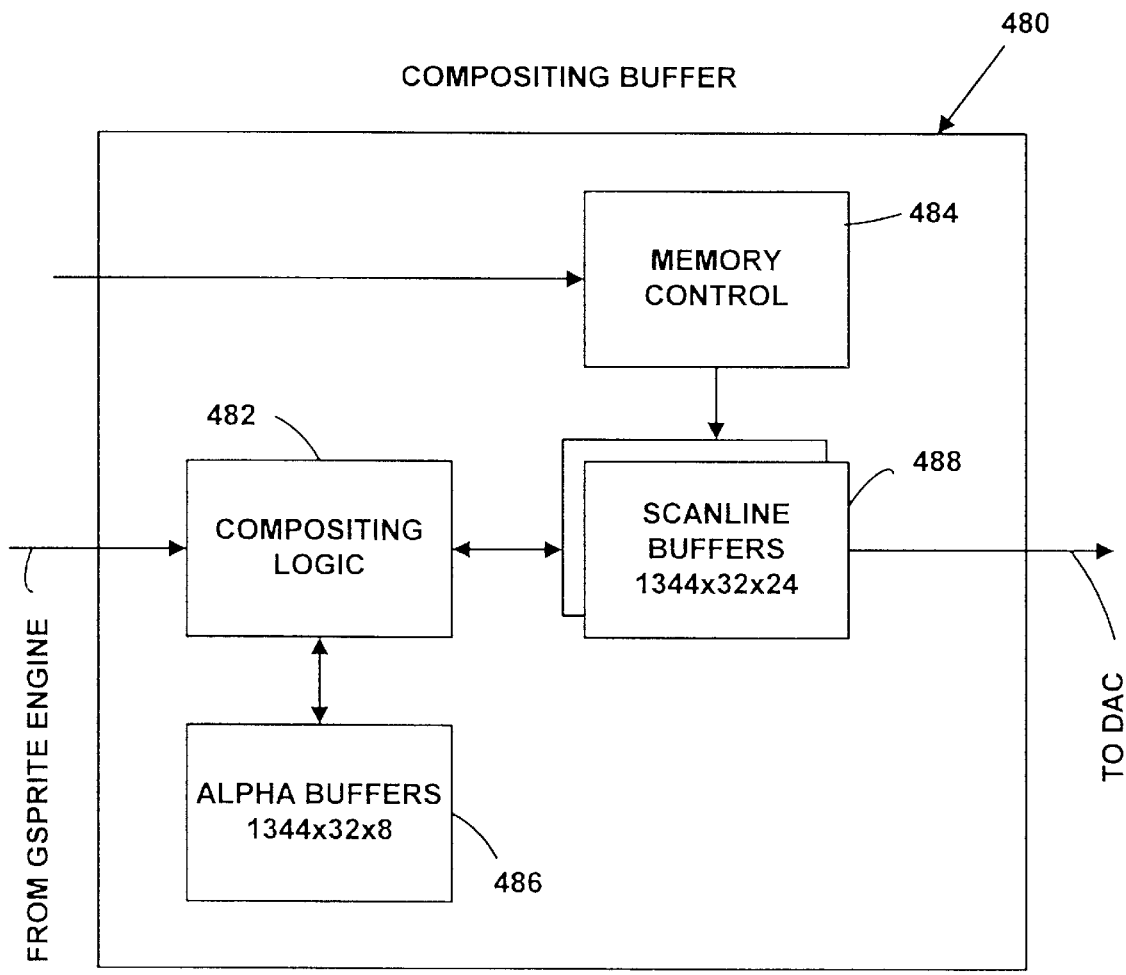
FIG. 13 is a block diagram of a compositing buffer in an embodiment.

FIG. 13 is a block diagram illustrating the compositing buffer 480 on the image processing board 174. The compositing buffer 480 is a specialized memory device that is used to composite gsprite data from the gsprite engine and generate digital video data to transfer to the DAC 212. The compositing buffer operates on 32 scanlines at a time—compositing gsprites for one 32 scanline band while the previous 32 scanlines are displayed.

The compositing logic 482 is responsible for calculating the pixel values as they are written into the scanline buffer. This is accomplished by performing a blending operation between the pixel value that is currently stored in the scanline buffer and the one that is being written to the compositing buffer. This operation is described in more detail below. In one implementation, the compositing logic performs four parallel pixel operations per clock cycle.

The memory control 484 is used to control the address and cycling of the memory banks. Address information is passed in a row column format as with normal DRAMs.

The alpha buffers 486 include an eight bit value for each of 1344×32 pixels. The memory is organized such that four contiguous pixels can be read and written each clock cycle. The alpha buffer also has a fast clear mechanism to quickly clear the buffer between 32-scanline band switching.

Two independent scanline buffers 488 are provided. The scanline buffers include three eight bit color values for each of 1344×32 pixels. The memory is organized such that four contiguous pixels can be read and written each clock cycle. One buffer is used to transfer the pixel data for a band to the DAC while the other is used to composite the pixels for the next band. Once the band has been completed, their functions swap.

A multiplexer is used to select data from one of the two scanline buffers 488 and sends the pixel display data to the DAC. The multiplexer switches between buffers every 32 scanlines.

The compositing buffer 480 interfaces to the gsprite engine 204, and transfers image data to the DAC 212.

Figure 14:
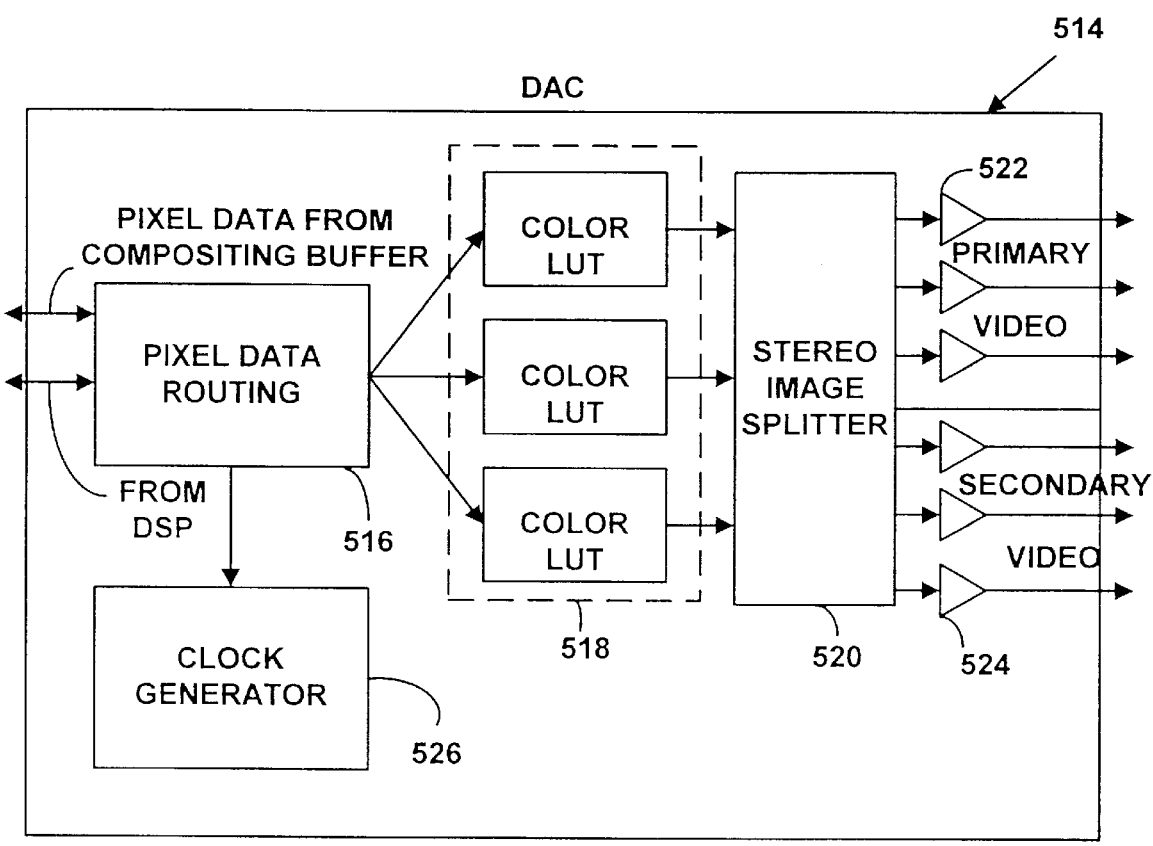
FIG. 14 is a block diagram of a digital-to-analog converter (DAC) in an embodiment.

FIG. 14 is a block diagram illustrating the DAC 514 on the image processing board 174. The DAC 514 implements the basic functions that are common to most RAMDACs on the market today. The DAC includes logic for reading and writing internal control registers, and for pipelining the video control signals. Additional functional blocks are described below.

The pixel data routing block 516 is used to control the routing of pixel data from the compositing buffers. In the normal operating mode, this data is passed at pixel rates to the Color LUTs 518 for each of the three channels. This block also allows the data to be read back to the DSP for diagnostic purposes.

The stereo image splitter 520 supports two separate video signals for stereoscopic display using a head mounted display system. In this mode, the two video channels (522, 524) are interleaved from the compositing buffer, and must be split out by the DAC 514. The stereo image splitter 520 performs this function on the DAC 514. In the normal single channel mode, the LUT data is passed directly to the Primary DACs.

Alternatively, the DAC 514 can be designed to generate a single video output. With a single video output, the DAC can generate a stereoscopic display using a line interleaved format, where one scanline for one eye is followed by the scanline for the other eye. The resulting video stream has a format such as 640×960, for example, which represents two 640×480 images.

The clock generator 526 is used to generate the video and audio clocks. These clocks are generated by two phase locked clock generators to eliminate synchronization drift. The clock generator can also be slaved to a control signal from the Media Channel, allowing the image processing board to sync to an external sync source.

Having described the structure and operation of the image processing system above, we now describe various components and features of the system in more detail. We begin with an introduction to the data structures that can be used in the system to implement concepts introduced above.

Geometry Processing

In one embodiment of the image processing system, there is a fundamental primitive type to describe all geometry, including triangle strips, triangle fans, polylines and points. Within each primitive there may be several sub-primitives of the same primitive type (e.g. a collection of triangle strips). A primitive has a header and a series of vertices. The header describes the following:

Primitive Type: triangle, line or point

Per-vertex information: Indicates what data is specified at each vertex, and may include color values, normal vectors, texture coordinates, and Z-values.

Control information: Flags to control front/back culling and automatic computation of normal vectors.

A vertex includes position information, and the following optional information. The presence of this optional information is indicated in the header word of the primitive.

Color information: R, G, B colors specified as either floating point or integer.

Normal vectors: Surface normals used for lighting calculations.

Texture coordinates: u and v indices into the current texture map.

Z-values: These will normally exist, except for 2-D primitives, or for applications that choose to pre-sort geometry by depth.

Edge normals: These are used in some anti-aliasing calculations.

In addition, a vertex has two control bits that specify:

Strip/Fan: Indicates whether this vertex is to be considered a strip vertex or a fan vertex.

Start/Continuation: Specifies whether this vertex is the start of a new sub-primitive.

The appearance of the primitive can be influenced by the graphics attributes such as transformation matrix, lighting models, and texture. These state variables are described in the following section.

The image processing board 174 maintains a limited number of state tables 16 including attributes that affect rendering. Functions are provided for loading and selecting graphics state as described below:

Load State: Defines the complete state for a given state table.

Select State: Selects one of the state tables as the currently active one.

Set State Variable: Overwrites a specific state variable in the currently selected state table.

The following graphics attributes can be included in the state table:

Matrix: 4×4 Modeling/Viewing/Projection transformation matrix, along with flags to assist in performance optimization.

Material properties: This includes emissive color, diffuse color, ambient color and specular color.

Lighting models: Ambient, directional, positional and spot lights are supported. Lighting parameters include ambient intensity, diffuse intensity, specular intensity, position, direction, attenuation factor (constant, linear and quadratic), spotlight exponent and spotlight cutoff angle.

Shading mode: Gouraud and flat shading are supported. In addition, there may be a shading language that facilitates user-definable shaders.

Texture control: This includes an on/off flag, texture gsprite (textures maps are stored as gsprites), texture mapping mode (clamp/wrap), texture application mode (blend, decal, modulate), and texture filtering mode.

Fog mode: This includes an enable flag, fog type (linear, exponential, exponential squared), and parameters for computing fog blending factor (fog density, near distance and far distance).

Chunking

Unlike conventional graphics systems which use a large frame buffer and Z-buffer in RAM to store color, depth, and other information for every pixel, our system divides objects in a scene among image regions called "chunks" and separately renders object geometries to these chunks. In one embodiment, objects are rendered to gsprites. The gsprites are sub-divided into chunks, and the chunks are rendered separately. While our description refers to several specific embodiments, it should be understood that chunking can be applied in a variety of ways without departing from the scope of the invention.

Figure 15A:
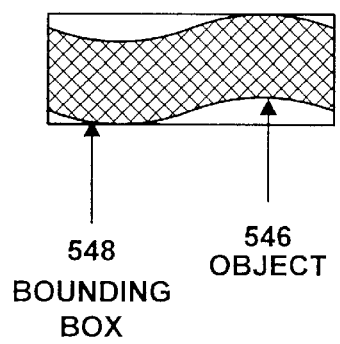
FIG. 15A–C are diagrams of an example illustrating one aspect of chunking.
Figure 15B:
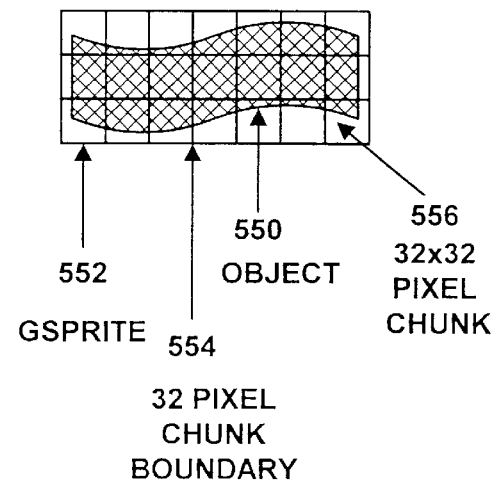

A few examples will help illustrate the concept of chunking. As shown in FIG. 15A an object 546 in a graphics scene is enclosed by a box called a bounding box 548. Turning to FIG. 15B, an object 550 in the graphics scene enclosed by a bounding box can be rendered to an image region called a gsprite 552. The bounding box may be rotated, scaled, expanded or otherwise transformed (e.g. affine transformed) to create a gsprite in screen space. Once the bounding box has been generated, if the bounding box does not fall on a 32 pixel boundary (i.e. the chunk boundary) 554, the bounding box is expanded in both the X and Y directions around the object to become an integer multiple of the 32 pixel chunk size. As can be seen from the object 550 in FIG. 15B, a bounding box drawn around the object 546 that was shown in FIG. 15A, is expanded to 32×32 pixel boundaries in FIG. 15B. The gsprite is then subdivided into 32×32 pixel "chunks" 556 before rendering. However, other smaller or larger chunk sizes and alternatively shaped chunks could also be used. However, rectangular and most preferably square shaped chunks are illustrated.

Figure 15C:
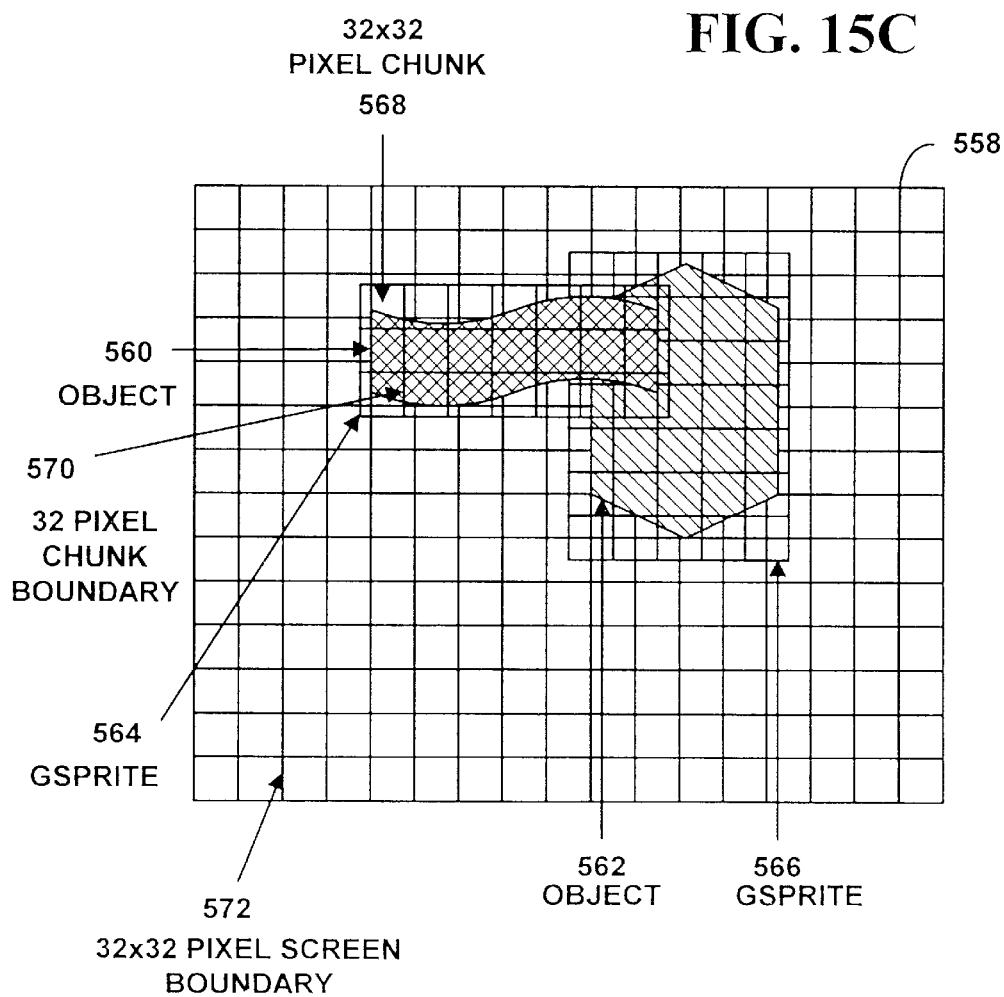

As is shown in FIG. 15C, a graphics scene 558 will contain a number of overlapping objects (560, 562). These objects are enclosed in bounding boxes and are assigned to gsprites (564, 566). The bounding boxes shown in FIG. 15C have already been expanded (and rotated, scaled, and otherwise transformed) to 32 pixel multiples to allow 32×32 chunks 568 to be generated. However, as can also be seen from FIG. 15C, the gsprites and their corresponding 32×32 pixel chunks boundaries 570 typically will not line up exactly on 32 pixel screen boundaries 572 so additional gsprite manipulation is required during chunking so the gsprite can be translated into screen space.

One approach to creating gsprites which will be rendered using chunking is to combine a number of objects to create a larger composite gsprite instead of creating and rendering a number of smaller individual gsprites that contain the geometries of the individual objects. This combination of gsprites saves processing time during rendering and is often desirable if the objects combined do not change very often within a graphics scene. Another approach to create gsprites is to target components of an object with complex geometries, and then sub-divide these complex geometry components into a number of gsprites. This sub-division may require extra processing time, but is used to improve the output resolution of a particular complex object that changes frequently. A combination of both of these techniques may also be used on some objects.

Consider for example a character in a video game whose arms are covered by a number of spikes of different sizes, and the arms move frequently. The body and head and other parts of the character may be combined to form a larger composite gsprite since these parts of the object don't change frequently. However, the characters arms, which are covered with spikes and represent complex geometries and change frequently, are sub-divided into a number of gsprites to improve the output resolution. Both the combination and the sub-division are used in this case. Since it is not easy or practical to draw such a character, for the purposes of illustration, a much simpler object, a "coffee cup" is used instead to illustrate the combination and sub-division.

Figure 16A:
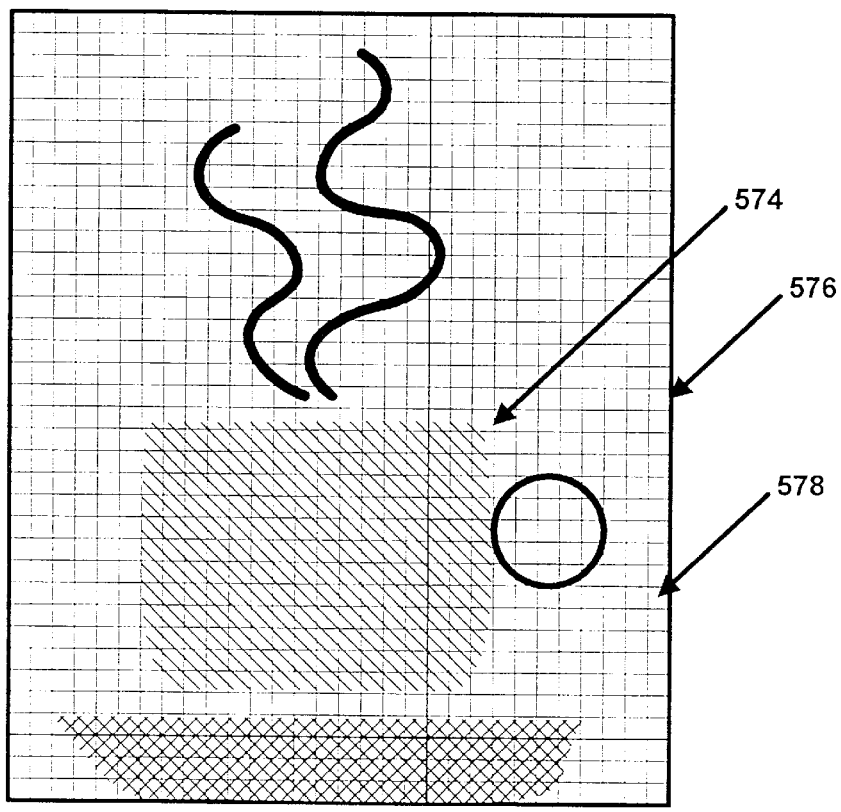
FIGS. 16A–B are diagrams illustrating aspects of chunking in an embodiment.
Figure 16B:
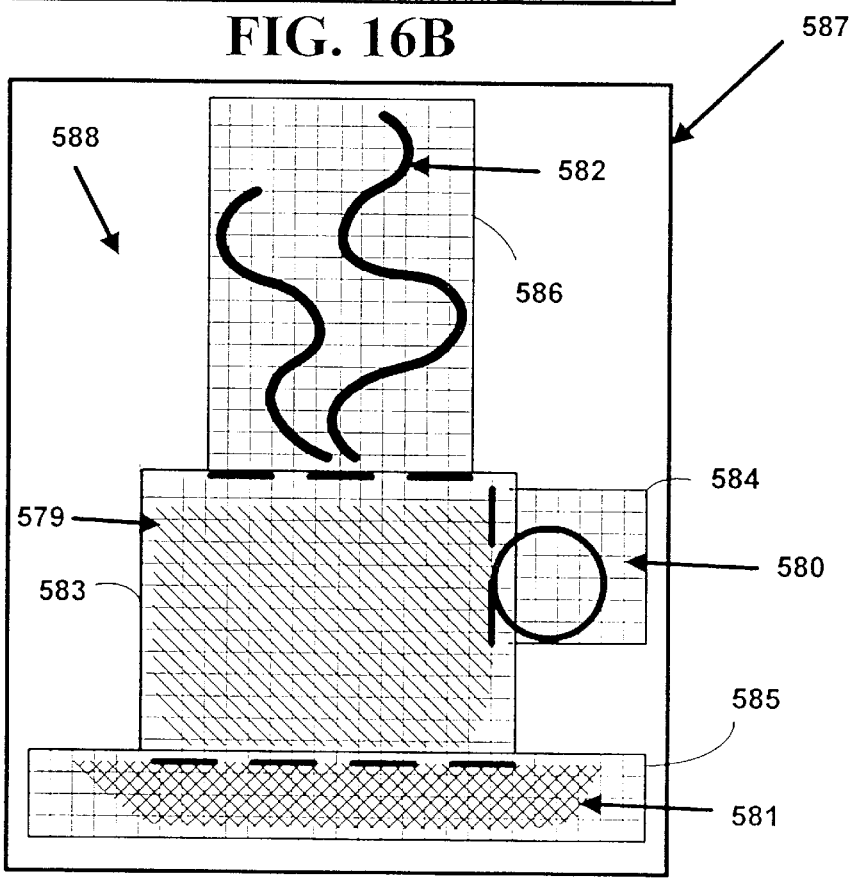

FIG. 16A shows a "coffee cup." This "coffee cup" is actually is composed of a number of separate objects. For example "coffee cup" can be look at to actually consist of a cup container, a cup handle, a saucer, and fumes coming out of the cup. One approach would be to combine this individual objects into a large gsprite (i.e. a "coffee cup") as is shown in FIG. 16A. Another approach would be to sub-divide the "coffee-cup" into a number of smaller objects (e.g. cup container, cup handle, saucer, and fumes) and create smaller individual gsprites as is shown in FIG. 16B. FIG. 16B also illustrates how an object with complex geometries might be sub-divided.

Treating the "coffee cup" 574 as one simple object as is shown in FIG. 16A, the individual components (e.g. cup container, cup handle, saucer, fumes) of the object can be combined to create one large gsprite. In this case, a bounding box 576 would be drawn around the object to transform the object to screen space and create one large gsprite. The bounding box may be rotated, scaled, expanded or otherwise manipulated to create a gsprite which falls on 32×32 pixel boundaries in screen space. The gsprite is then divided into a number of 32×32 pixels chunks 578.

One way to divide a gsprite into chunks is to loop through all the geometry contained in the objects, and place the geometries into chunks. Another approach loops through the chunks recording all geometries which touch the chunk being considered. The illustrated embodiment uses the second approach, however the first and other approaches can also be used. As can be seen from FIG. 16A, a number of chunks will be empty (i.e. not be touched by any object geometries). These chunks can be ignored during rendering as will be explained below.

Now, treating the "coffee cup" as a complex object, the object is sub-divided into smaller object components which are processed to create a number of smaller gsprites as is shown in FIG. 16B. For example, the "coffee cup" object includes the cup container without the handle 579, the cup handle 580, the saucer 581 and the fumes 582 sub-objects. Each of these sub-objects would be enclosed by bounding boxes shown by 583–586 respectively to create four individual gsprites. The "coffee cup" including the four individual gsprites would also be enclosed by a enclosing bounding box as is shown by 587. Each of these bounding boxes may be rotated, scaled, expanded or otherwise transformed (e.g. affine transformed) to create a gsprite which falls on 32×32 pixel boundaries in screen space. Each individual gsprite is then divided into a number of 32×32 pixels chunks. The enclosing bounding box 587 is also divided into chunks and contains areas of empty chunks 588 which are ignored during rendering. However, chunks of the enclosing bounding box are not illustrated in FIG. 16B.

As a result of chunking, the graphics image is not rendered as a single frame, but is rendered as a sequence of chunks that are later aggregated to a frame or view space. Only objects within a single gsprite that intersect the 32×32 pixel chunk of the image currently being drawn are rendered. Chunking permits the frame and Z-buffer to of be a small physical size in memory (i.e. occupy significantly less memory than in the traditional graphics systems described above), and achieve a high degree of utilization of the memory that is occupied, as well as increasing memory bandwidth. The small chunk size also allows more sophisticated rendering techniques to be used, techniques that could not be applied efficiently on large frame and Z-buffers.

Rendering of chunks is performed on the tiler. However, rendering could also be performed on other hardware components or using software. VLSI memory on the tiler chip is used to store the small chunks (32×32 pixel) of the frame currently being rendered. The on-chip VLSI memory is much faster and has a much larger memory bandwidth than external RAM. However, because of the chunking process, a large amount of memory to store the whole frame buffer and Z-buffer for the rendering process is no longer required. The internal memory within the tiler is used only to process the current chunk, and then it is re-used over and over for each subsequent chunk that is processed. As a result, the available internal memory is well utilized during the graphics rendering.

Using internal VLSI memory also eliminates pin driver delays that normally occur due to off chip communications as well as overhead associated with performing READ and WRITE operations to the large external memory required for conventional frame and Z-buffers. In addition, the small chunk size allows more sophisticated anti-aliasing (e.g. fragment buffers) and texturing schemes to be performed on the chunk than could be performed on a full frame and Z-buffer stored in a large amount of external memory because an entire 32×32 pixel chunk can be completely rendered in the illustrated embodiment before the next chunk is computed. The small chunk size also lends itself well to image compression techniques that will be described in more detail below.

After all intersecting polygons have been drawn into the chunk and the fragments resolved, the pixel data including color and opacity are compressed in the tiler chip and then moved to external memory.

Figure 17A:
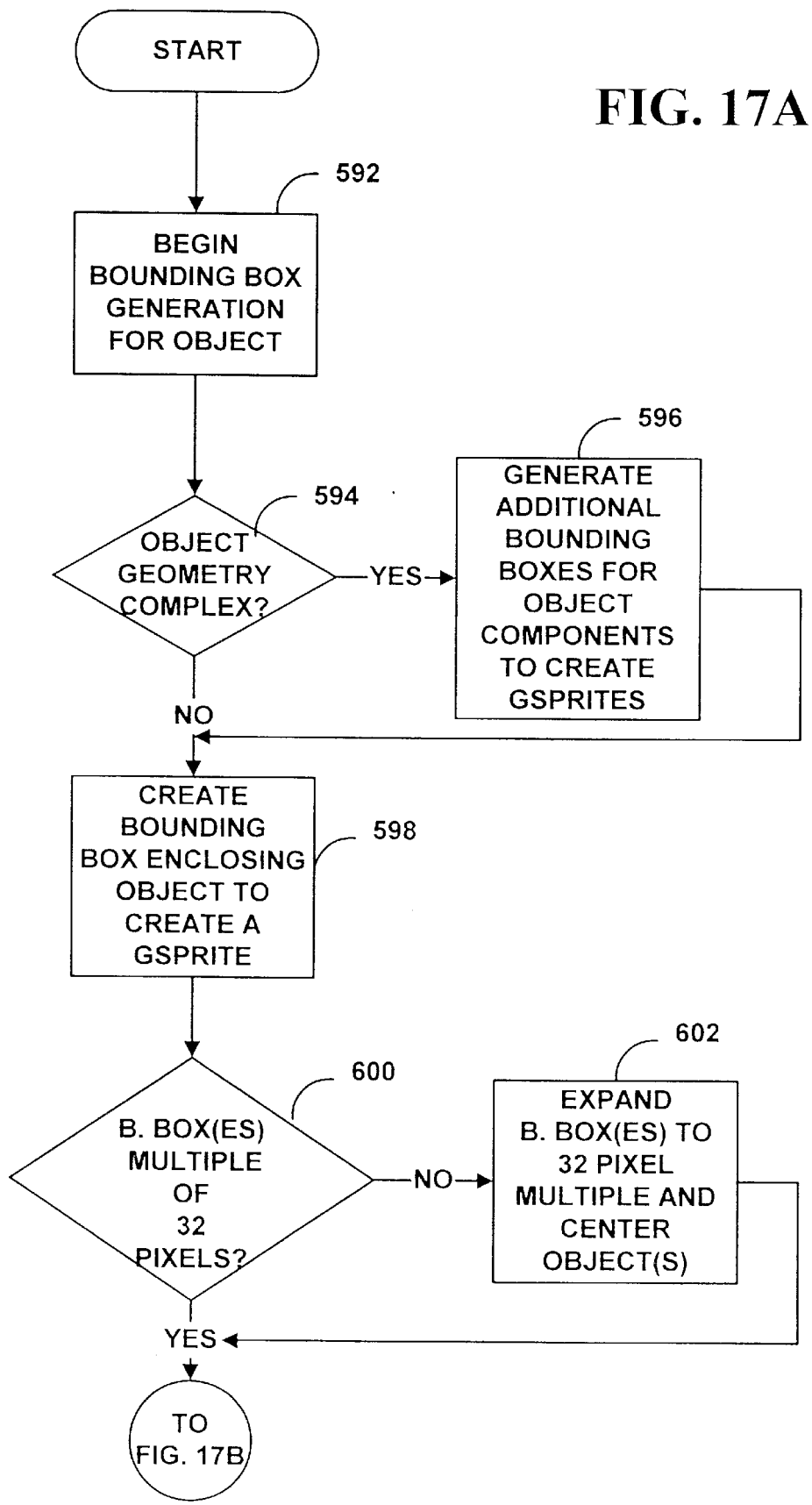
FIGS. 17A–B are flow diagrams illustrating aspects of chunking in an embodiment.
Figure 17B:
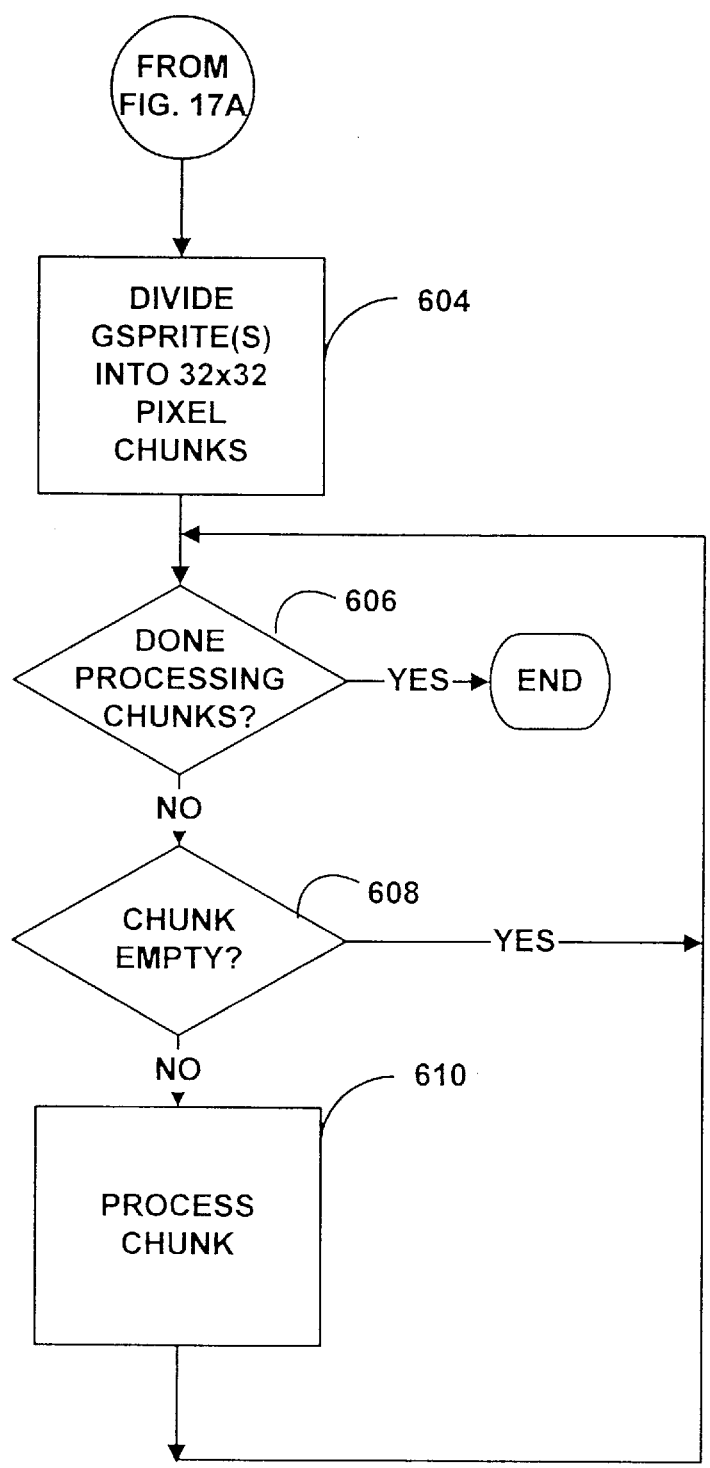

The flowchart in FIGS. 17A and 17B show a high level overview of how a graphics scene is partitioned into chunks. First, one or more bounding boxes are generated for each object. (592) (FIG. 17A). If the object has complex geometry (e.g. finely tessellated, etc.) (594), then a number of bounding boxes are generated to enclose each of the object's complex components (to create a plurality of gsprites) (596). If the object geometry is not complex, then a single bounding box can be used to enclose the object and create a gsprite (598). However, if the object is complex, then the single bounding box will also enclose the plurality of bounding boxes that were created to enclose the object's complex components. If the bounding box or boxes are not an integer multiple of 32 pixels (600), then the bounding box(es) is/are expanded symmetrically in the X or Y directions (or both directions) to become an integer multiple of 32 pixels. The object (and object components if the geometry is complex) is/are then centered in the bounding box (602). This is illustrated by the gsprites shown in FIGS. 15B and 15C. The symmetric expansion is preferable, though not required, as it provides the best balance of processing between chunks in a single gsprite.

Returning again to FIG. 17, the gsprites are then divided into 32×32 pixel chunks (604) (FIG. 17B). As is apparent, these chunks are not at fixed locations in the view space, but are at addressable and variable locations depending upon the location of the chunked object. After dividing the gsprites into chunks, the chunks are processed. If the rendering of chunks is complete (606), the process ends. If the rendering of chunks is not complete, processing of the next chunk is started, after first examining to see if it is empty (608). If the chunk is empty, then it is not processed, and the next chunk is examined. If the chunk is not empty, then rendering (610) of the chunk continues in the tiler until all objects impinging on the chunk have been processed. This process continues until all chunks in each gsprite and all gsprites have been processed.

Gsprite sizes may be expressed as a percentage of the total screen area. Background gsprites will be quite large, but other components of the scene are usually quite a bit smaller than the total screen area. The performance of any chunking scheme used is sensitive to the screen space size of the primitives in the gsprites. As a result, it is necessary to properly regulate (e.g. queue) the object data input stream that is used to create the gsprites. Proper regulation of the object data input stream allows object processing to be completed at a higher bandwidth, and increases system throughput.

Our system uses a command stream cache to cache the object data input stream. The command stream cache can be used to cache the entire contents of a gsprite, and then iterate over every chunk and its associated geometries in the gsprite stored in the cache.

The cache can be also used for selective caching. For example, defining a threshold so that geometric primitives are automatically cached if they touch a certain number of chunks. If a cache is available, then virtual chunking can be done. In virtual chunking, a chunk bucket is created which corresponds to regions of N×M chunks with each region being a virtual chunk. Virtual chunking allows for adaptive sizing of the virtual chunks appropriate to the contents and the size of the geometry being processed.

Another use for the cache is modified scene graph caching. Instead of caching and referring to static portions of the scene, caching is done and dynamic portions of the scene are referred to through indirection. For example, suppose a gsprite contained a cuckoo clock with fairly complex geometries. The clock itself is quite complex, but the only moving parts are a bird, two doors, and two clock hands. Further, each of these geometries is rigid and unchanging. Thus, the rendering of the clock involves six static trees and six transformations (i.e. one for the clock, bird, 2 doors, and 2 clock hands). If the cache is large enough, the entire scene graph is transformed into a command stream. On rendering, the current transformations are patched over the cached command stream, and the resulting command stream is launched against all of the chunks in the gsprite. The patched portions of the command stream are the same size across all renderings. A more flexible approach is to insert a call command in the cached static scene graph. On rendering, the dynamic portions are written and cached to memory of varying sizes. Addresses of these dynamic portions are then patched into the associated call command in the static command stream. This approach is more flexible since the size of the dynamic command can vary from rendering to rendering. Thus, the effect of this approach is a memory-cached callback approach. In the case of the cuckoo clock, it would mean writing six transformations, and possibly a callback for the bird geometry so that it could be empty if the doors are closed. This approach is extremely compact with respect to bus bandwidth and lends itself to quick, directed traversal of the scene graph.

Even though the cache memory is limited, some geometries or attributes may remain cached across many renderings. For example, in a car racing game, caching a car body geometry would result in a significant overall savings across renderings. Likewise, common attribute states (or substates) could be reused across many gsprites or rendering of a single gsprite. As was just described, using a cache within a chunking scheme can result in some significant time savings. However, adequate chunking performance might also achieved without the command stream cache by generating a command stream on the fly for each touched chunk in the gsprite.

In the implementation of the tiler shown in FIGS. 9A–9C, chunks are used sequentially to render an entire frame on one processor, rather than using multiple simultaneous chunks on parallel processors to share the computational load. Although less preferred, a combination of serial and parallel processing of chunks could also be used. Using a completely parallel processing implementation of chunks, an object moving across the screen would necessarily require constant chunking operations as it moved across the screen. However, in the illustrated embodiment of the invention, because of the serial processing of chunks, an object can be fixed at the chunk boundaries in a gsprite and thus NOT require chunking as the object moved across the screen. The parallel processing rendering of chunks also does not allow sophisticated anti-aliasing and texturing schemes to be applied to individual chunks as is the case for serial rendering of chunks. The chunk size and sequential rendering is very valuable for image compression techniques since an entire 32×32 pixel chunk is rendered before the next chunk is computed, and thus can be compressed immediately.

The purpose of image compression is to represent images with less data in order to save storage costs and/or transmission time and costs. The less data required to represent an image the better, provided the image can be reconstructed in an adequate manner. The most effective compression is achieved by approximating the original image rather than reproducing it exactly. The greater the compression, the more of an approximation ("lossy compression") the final image is going to be.

The process of chunking is itself a compression technique. Objects are approximated with one or more gsprites which in turn are created from number of 32×32 pixel chunks. The actual object is approximated with gsprites and reconstructed from rendered gsprites. The reconstruction of the original object depends on how effectively the object was approximated by dividing it into gsprites and then chunking it (e.g. using the complex object geometry division techniques described above).

The individual 32×32 chunks are also compressed using image compression techniques. A compressed 32×32 pixel chunk takes up less space in the small amount of internal memory available. The 32×32 pixel chunks can be broken down into sixteen 8×8 pixel chunks which is the size commonly used in image compression techniques that employ discrete cosine transformations (DCT).

In one implementation, the compression and decompression engines on the tiler and the decompression engine on the gsprite engine support both lossy and lossless forms of compression/decompression. The lossy form includes a lossless color transform from RGB to YUV, a DCT, uniform or perceptual quantization, and entropy coding (Run length and Huffinan coding). The lossless form includes a color transform from RGB to YUV, a prediction stage, and entropy coding as performed in the lossy form.

In order to dramatically reduce memory requirements to process graphics images using chunking, a small Z-buffer (e.g. about 4 kilobytes (kb) is used in the illustrated embodiment. Specifically, the z-buffer in this implementation is slightly less than 4 kb (1024×26), but the number of bits of precision can vary. However, a Z-buffer of other larger or smaller sizes could also be used. Using a small 4 kb Z-buffer allows only 1024 pixels to be Z-buffer rendered at any one time. In order to render scenes (e.g. scenes composed of gsprites) of arbitrary size using a 4 kb Z-buffer, the scene is broken up into chunks of 32×32 pixels in size (there are usually several gsprites in a scene, but each gsprite is broken into chunks). In this scheme, the image pre-processor sends the appropriate geometry to each chunk in a gsprite to be Z-buffer rendered.

Figure 18A:
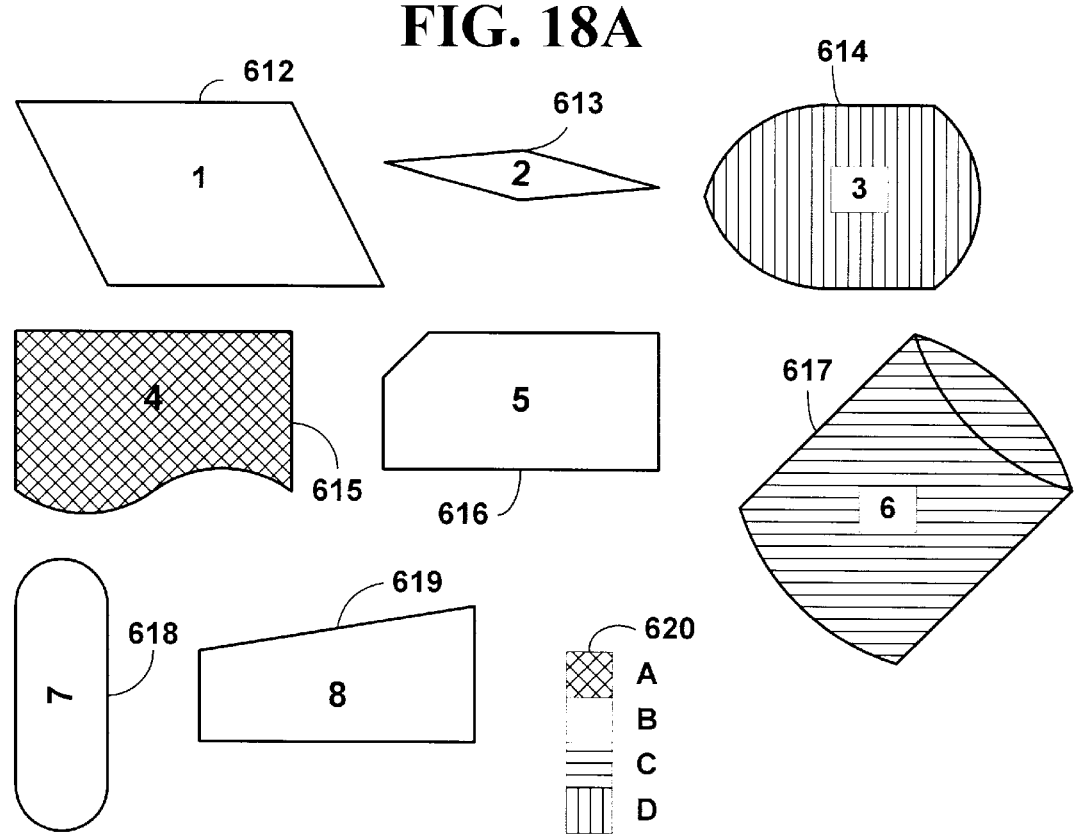
FIGS. 18A–B are diagrams illustrating aspects of chunking in an embodiment.
Figure 18B:
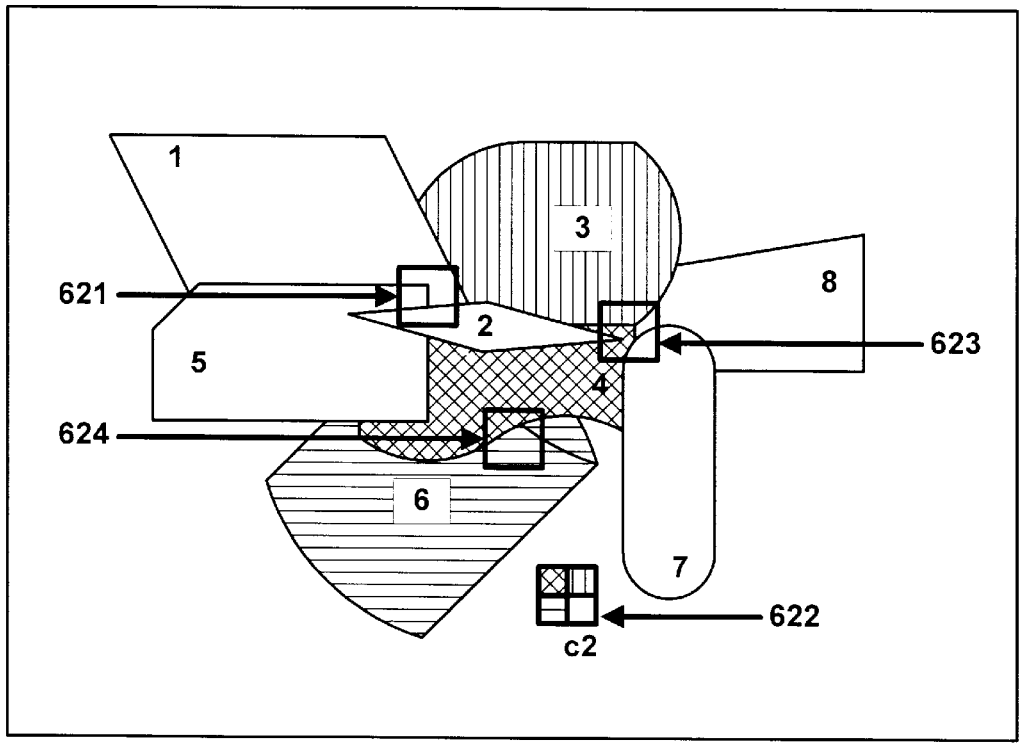
Figure 19A:
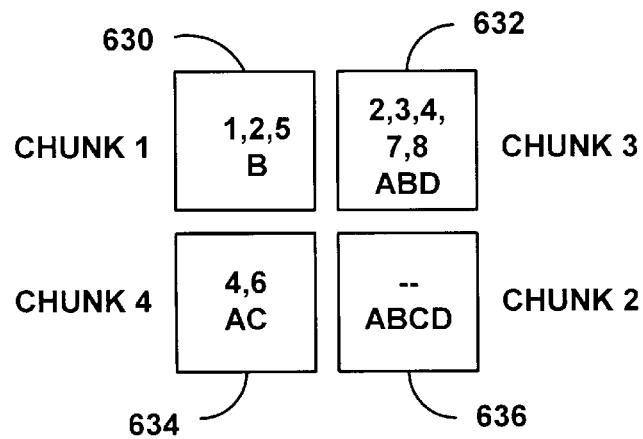
FIGS. 19A–B are diagrams illustrating aspects chunking in an embodiment.
Figure 19B:
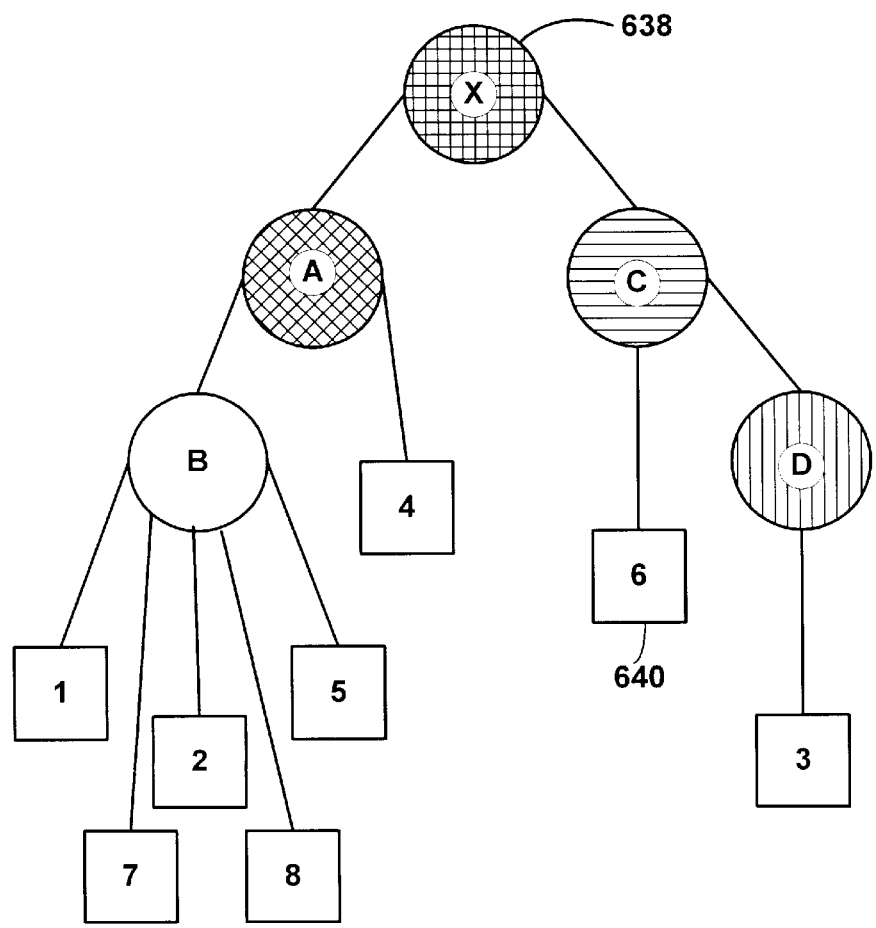

As an example of how chunking works, consider the eight objects and their associated geometries shown in FIG. 18A. For simplicity the eight objects 612–619 are defined by a single attribute 620 (e.g. color) which can have one of four values A–D. The eight objects are then overlapped in a graphics scene as is shown in FIG. 18B. Ignoring individual gsprites and their creation, but concentrating instead on four isolated chunks for the purposes of illustration, the four isolated chunks 621–624 are shown in FIG. 18B. The four isolated chunks 621–624 (FIG. 18B) are touched by geometries 1–8, and attributes A–D as is illustrated in FIG. 19A. Chunk 1 630 (FIG. 19A) is touched by geometries 1, 2, and 5 and attribute B, chunk 2 639 is touched by no geometries and attributes A–D, chunk 3 632 is touched by geometries 2, 4, 7, and 8, and attributes A, B, D, and chunk 4 634 is touched by geometries 4 and 6 and attributes A, C. An example of a partial scene graph built by image pre-processing (using the chunks shown in FIGS. 18B and 19A) is shown in FIG. 19B. The attributes (e.g. color, etc. shown by A–D, X) of each chunk are shown as circles 638, and the geometry (e.g. of the various shapes, shown by 1–8) is shown as squares 640. The letter X denotes the default value for an attribute. The intermediate nodes contain attribute operations to apply to the primitive geometry. The leaf nodes in the scene graph contain primitive geometry which are to be applied to the chunks, and may also contain bounding volumes around the geometry the chunks describe (leaf nodes with bounding volumes will be described below).

One approach for a chunking scheme is to iterate over every chunk and send the full geometry each time. Another more optimal approach is to send only geometry that is visible in the current chunk (note that the optimal case also skips geometry that is obscured or otherwise invisible). The actual method used in our system to chunk a gsprite in 32×32 pixel block falls between these two extremes and is called Bucket-Chunking. However, other schemes which fall at or between the two extremes may also be used to create chunks for a chunking scheme.

The Bucket Chunking scheme consists of two passes. The first pass traverses the scene graph while maintaining the current transform to view space with the goal of building up a descriptive command stream for each chunk in the view space. The view space is broken up into N×M chunk buckets, which in the end will each contain a list of the geometries that fall across the corresponding chunk. When a geometry-primitive node is encountered, the current transform is applied to the bounding volume to yield a 2-D "footprint" on the view space. For each chunk touched by the footprint, the geometry (and accumulated attribute state) is added to the corresponding bucket. At the completion of this first pass, each bucket will contain the necessary data to render the corresponding chunk. Note that this chunking scheme is sensitive to the quality of the calculated footprint—a loose bound on the object will yield a larger footprint, and hence will hit chunks not touched by the enclosed geometry. A tight bound on the object will yield a smaller footprint, and will hit most chunks touched by the enclosed geometry.

As an example of the first pass, consider a sub-set of four chunks which contain overlapping objects described by geometries 1–8, and attributes A–D, X shown in FIG. 19A. One approach for traversing the scene graph in pass one is to maintain the current state for each chunk, and then skip the geometry that does not fall inside a given chunk. This ensures that the attribute context for every geometry in every chunk is up to date. Using this approach on the scene graph in FIG. 19B gives the following command streams in the chunk buckets after pass one:

Chunk 1 Bucket: X, A, B, 1, 2, 5, A, X, C, D, C, X

Chunk 2 Bucket: X, A, B, A, X, C, D, C, X

Chunk 3 Bucket: X, A, B, 2, 7, 8, A, 4, X, D, 3, C, X

Chunk 4 Bucket: X, A, B, A, 4, X, C, 6, D, C, X

Another approach is to retain the current attribute state, and send the state prior to sending each accepted geometry. This results in the following command streams in the chunk buckets:

Chunk 1 Bucket: B, 1, B, 2, B, 5

Chunk 2 Bucket: <empty>

Chunk 3 Bucket: B, 2, B, 7, B, 8, A, 4, D, 3

Chunk 4 Bucket: A, 4, C, 6

The second approach is an improvement over the first approach. Note that the attribute B is specified a second and third unnecessary time before geometries 2 and 5. This behavior is also manifested in chunk 3 for B for geometries 7 and 8. In reality, the situation is worse than portrayed here, because a dump of the current attribute state means that each and every attribute will be re-specified for each geometry. In other words, even if the texture transformation matrix is invariant for the whole scene graph, it will still be sent prior to each and every geometry in every chunk.

Therefore, this particular approach addresses attribute maintenance for overriding attributes and for composing attributes instead. Diffuse color is an overriding attribute. As is defined by the image pre-processor (e.g. image preprocessing software e.g. running on the image preprocessor 24, etc.) which produces the scene graph, attributes applied to red(blue(cube)) will result in a red cube. This is in contrast to other image pre-processor graphics interfaces that bind to the closest attribute to the object. Binding the closest attribute to the object for red(blue(cube)) would result in a blue cube.

Using the outermost attribute as an overriding attribute greatly simplifies attribute maintenance for attributes. During scene graph traversal, once you hit an attribute node, you can ignore all nodes of that attribute type below it in the scene graph, since the top most attribute overrides them all.

A local transformation is a composing attribute. Thus, the current value is defined by the previous value and the new value. The composing attribute requires some sort of stack as the scene graph is traversed to store previous values.

The Bucket Chunking scheme uses the following structures:

The attribute node, which contains the current value.

The traversal context. This is a structure that contains, for every overriding attribute, a pointer to the current attribute value.

A grid of buckets, each of which contains a command-stream buffer and a bucket context structure of the same type as the global traversal context.

A list of default attribute values, each of which can be referred to by the traversal context.

For initialization, the context is placed in the default state, so that all attributes refer to the default context. Default values are loaded lazily, rather than dumped en masse prior to sending the rendering commands for each chunk.

```
Initialize Attribute Maintenance:
for each attribute: attr
    for each bucket: bucket
        bucket.context(attr) ⇐ nil // Clear context for each bucket
    end
    context[attr] ⇐ default[attr]  //Initialize to default values
end
```

The following dictates how to process a given attribute node:

```
Process Attribute:
if context[attr] ≠ default[attr]
    ProcessGeom()      //Attr already set, ignore subsequent value.
else
    context[attr] ⇐ SetAttr (attr,value)  // Set to new value.
    ProcessGeom()
    context[attr] ⇐ SetAttr (attr,default[attr])
endif
```

The process for handling geometry nodes synchronizes the current traversal state with the attribute states of each bucket:

```
Process Geometry:
geomCommand ⇐ ConvertGeometry (geom)  // Convert to Command Stream.
for each touched bucket: bucket
    for each attribute: attr
        if (bucket.context(attr) ≠ context(attr)
            bucket.context(attr) ⇐ context(attr)
            append (bucket, context(attr))
        endif
    end
    append (bucket, geomCommand)
end
```

Composing attributes work in a similar manner to the overriding ones, with the exception that a stack is maintained during traversal. This is accomplished by using the nodes for the storage of the stack values. This method requires the following structures:

The current attribute node, which contains the composition of the previous values with the new value.

The traversal context. This is a structure that contains, for every composing attribute, a pointer to the current attribute node.

A list of default attribute values, each of which can be referred to by the traversal context.

A grid of buckets, each of which contains a command-stream buffer and a bucket context structure of the same type as the global traversal context.

The initialization for composing attributes looks the same as for overriding attributes:

```
Initialize Attribute Maintenance:
for each attribute: attr
    for each bucket: bucket
        bucket.context(attr) ⇐ nil  // Clear context for each bucket
    end
    context[attr] ⇐ default[attr]  //Initialize to default values
end
```

Processing a composing attribute node involves the composition of the new value with all values prior to the current node in the traversal. Note that in order to implement a stack of values, the prior value must be saved and restored.

Process Attribute:

node.ComposedValue←Compose (context node.Value)

SavePtr←context[attr]//Save previous composed value.

context[attr]←node

ProcessGeomo context[attr]←: SavePtr//Restore the previous composed value.

The geometry-handler is identical to the overriding attribute case:

```
Process Geometry:
geomCommand ⇐ ConvertGeometry (geom)  // Convert to Command Stream.
for each touched bucket: bucket
    for each attribute: attr
        if (bucket.context(attr) ≠ context(attr)
            bucket.context(attr) ⇐ context(attr)
            append (bucket, context(attr))
        endif
    end
    append (bucket, geomCommand)
end
```

The second pass of the Bucket Chunking scheme iterates over the grid of buckets and spits out the corresponding command stream. For every non-empty bucket, the corresponding chunk is rendered from the information stored in that bucket. Note that there may be empty buckets in the scene, which means that not every chunk in the gsprite must be rendered. For most active gsprites, which will consist of an opaque object on a transparent background, a good number of chunks should be empty.

The approach to maintaining attribute state described above is particularly well suited for rendering geometry in a chunked fashion. Chunking causes sets of geometry to be rendered in a different order than was originally specified. For instance, in rendering a chunk, the rendering system skips geometric sets that do not intersect with the chunk. Therefore, at the lower level of chunked geometric rendering, at most two levels of state should be maintained: 1) a global state in a format compatible with the tiler or alternative rendering hardware to allow rendering of the geometry; and 2) small state overlays within a set of geometry that apply only to that set of geometry. With this approach, each set of geometry can be rendered independently of any other, and rendering a set of geometry can be considered side-effect free.

An alternative approach to chunking uses hierarchical bounding volumes in the scene graph. If a footprint for a hierarchical bounding volume falls entirely within a chunk, then there is no need to descend any deeper into the scene graph from that point; all geometry under that node can be placed in the chunk bucket. Another variation on this bounding volume approach is to stop descent when the footprint falls over no more than N chunks, where N is some arbitrary number of minimum chunks. This approach effectively loosens the bounding volumes in exchange for more abbreviated first pass times.

A number of other chunking schemes can also be used instead of Bucket Chunking. For example, an accelerated front end loading scheme and/or an image space recursive scheme could also be used as a chunking scheme. These two alternative chunking schemes are described below.

In another embodiment for chunking using accelerated front end loading, overhead associated with breaking a gsprite into chunks can be eliminated if it is exactly known which chunks fall into which part of the scene graph. A set of active bounding boxes and primitives that are relevant to the chunk are maintained, and only this set is sent for testing.

There are three structures used in the display scheme as well as a bitmap used to construct these structures. The three structures are an active set, insert vector, and a delete vector. Every bounding box and geometry primitive has a unique index in the hierarchical bounding volume (HBV) tree, and the chunks being rendered are ordered in the tree. Although this scheme is actually independent of chunk ordering, a scan is done from left-to-right, top-to-bottom (LRTB). Since the choices made interact with ordering of the gsprite chunks, space filling curves other than LRTB can also be used.

The active set is a set of bounding boxes and primitives to send the current chunk. This set contains every bounding box touching a chunk and every primitive touching the current chunk not enclosed by a bounding box in the set. The data structure used for this set allows fast insertion, deletion, as well as fast enumeration. Given the fact that there will be only so many top level bounding boxes of interest to a gsprite, the data structure is implemented as a simple bit-mask. The incidence bitmap is a single 32×32 table of bits that corresponds to a gsprite size of 1024×1024 pixels.

The insert vector and delete vector are vectors each containing a list of bounding boxes and primitives to be inserted or deleted from the active set. Each of these vectors is indexed by the chunk ordinal. The incidence bitmap is a N×M bitmap that represents a gsprite, each pixel of the incidence bitmap represents one chunk of the gsprite. If max(N, M) is greater than 32, then the bitmap must be broken up into 32×32 pixel chunks.

To construct the insert and delete vectors, the top of the HBV tree is then traversed. For each object encountered, an incidence bitmap is constructed. The incidence bitmap is then scanned to determine where it should be included in the insert and delete vectors. Once a bounding box lies totally inside one chunk, its contents do not have to be opened or its contents tested for incidence. Since a bounding box may straddle a chunk boundary (or a chunk corner), bounding boxes are no longer opened when they are smaller then 2×2 pixels on the incidence map.

To compute the incidence map for a single bounding box or primitive, the view is set so that each pixel corresponds to a gsprite chunk. The bounding box is then rendered, and the incidence mask is retrieved through the feedback channel as well as the level-of-detail which describes how many pixels are covered by the bounding box.

The incidence bitmap is then scanned to determine what entries belong in the insert and delete vectors. One method is to scan the incidence bitmap in chunk order and insert or delete whenever an edge transition occurs. This is not a very practical method if the gap between insert and delete is small. Another method is to insert on the first pixel touched and delete on the last pixel touched. A third method is to look at a sliding window and delete if the primitive falls out of the sliding window. Pseudocode for constructing the insert and delete vectors is shown below.

```
Push(TOPBOX, &BoxStack)
DO
    pop(Bbox, &BoxStack)
    // pop a bounding box off the box stack
    renderBbox(Bbox, &IncidenceMap, &pixelCoverage)
    // render the bounding box using the incidence map and pixel
    coverage
map
    IF pixelCoverage > 4 and not primitive THEN
        push(children_of_Bbox, &Boxstack)
    ELSE
        scanIncidenceMap(IncidenceMap, &InsertVector,
&DeleteVector)   // add entries to the insert and delete
vectors
    FI
    IF empty(BoxStack) THEN BREAK FI
OD
```

To display a gsprite, the display scheme steps through the gsprite chunks in order. At each transition the insert and delete vectors are used to determine which bounding boxes and primitives are to be updated in the active set. The active set is then sent down to the hardware in the manner of the hierarchical occlusion scheme. The pseudocode for the display scheme is shown below.

```
Initialize ActiveSet to EMPTY
DO {i = each chunk }
    insertListIntoSet(InsertVec[i], ActiveSet)
    deleteListFromSet(DeleteVec[i], ActiveSet)
    occlusionTestRender(ActiveSet)
OD
```

In yet another embodiment for chunking using image space recursion, the chunking scheme used is based on the observation that off-chunk culling can avoid a lot of redundant tests by carefully choosing a traversal order, and culling geometry progressively during traversal. For example, projected sub-geometry culled away for being entirely to the right of a chunk C should not be considered by chunks to the left of C. This is an image-space recursive subdivision scheme which makes improvements on the recursive HSR (Height-Space Recursive) scheme know in the art.

A chunk is progressively subdivided into N×M chunk subregions. At each step, sub-geometry not overlapping the subregion is culled away. If the region is in a single chunk, Z-buffered rendering with occlusion tests is invoked. Otherwise, if the region is not a single chunk, divide the region along X or Y (whichever is larger) into two regions and recursively process them. Pseudocode to accomplish this chunking scheme is shown below.

```
Render(geoset,reg) =
    let geoset' = subset(geoset, reg) in
        if single_chunk(reg)
            then Z-buffer_render(geoset', reg)
        else
            let reg1, reg2, = split(reg) in
                render(geoset', reg1)
                render(geoset', reg2)
```

Since each subregion has only one edge that its parent did not have, the subset function should only test against one edge instead of four. If the entire gsprite region is culled before invoking the scheme recursively, this property can be utilized. The rendering scheme shown above can be improved by: (a) replacing the abstract region type by four integers specifying minimum and maximum chunk coordinates; (b) making the region split operation explicit; and (c) doing the geometry subsetting just before making the recursive calls. The improved rendering scheme is shown below.

```
render = (geoset, xmin, xmax, ymin, ymax) =
    if xmin == xmax && ymin == ymax
        then Z-buffer_render(geoset, xmin, ymin)
    else if xmax - xmin > ymax-ymin
        then
            let xmid = xmin + floor((xmax-xmin)/2),
            gs1, gs2 = xsplit(geoset, xmid) in
                render(gs1, xmin, xmid, ymin, ymax);
                render(gs2, xmid+1, xmax, ymin, ymax)
    else
        let ymid = ymin + floor ((ymax-ymin)/2),
        gs1, gs2 = ysplit(geoset,ymid) in
            render(gs1, xmin, xmax, ymin, ymid);
            render(gs2, xmin, xmax, ymid+1, ymax);
```

To partition objects for chunking, the representation of the geometry (geoset) shown above is important. The geoset is represented by a collection of triples of the form <geometry, transform, bzim>, where bzim is a gsprite coordinate 3-D bounding region. The partitioning functions are implemented by testing each bzim against the new edge. If fully inside one or the other, the triple is placed in geometry set 1 (gs 1) or geometry set 2 (gs2) accordingly. If overlapping, decompose the geometry into new triples, composing transforms, and applying the region edge test recursively, until the geometry or bzim falls within a defined stopping criteria, at which point the triple is placed into both gs1 and gs2.

```
Pseudocode to accomplish this partitioning geometry is shown below
xsplit(empty, xmid, gs1, gs2) = gs1, gs2
xsplit(insert(<g, xf, bzim>, rest), xmid, gs1, gs2) =
    if xmax(bzim) < (xmid + 1) * CHUNK_WIDTH
        then xsplit(rest, xmid, insert (<g, xf, bzim>, gs1), gs2)
    else if xmin(bzim) >= (xmid + 1)* CHUNK_WIDTH
        then xsplit(rest, xmid, gs1, insert(<g, xf; bzim>, gs2))
    else if stop_splitting(<g, xf, bzim>)
        then xsplit(rest, xmid, insert(<g, xf; bzim>, gs1),
                insert(<g, xf, bzim, gs2))
    else
        let gs1', gs2' = xsplit(decompose(<g, xf, bzim>), xmid,
            gs1,
gs2) in
            xsplit(rest, xmid, gs1', gs2')
```

The geosets are sorted by minz(bizm) at each stage to avoid redundant sorting in Z-buffer_render.

As has been shown above, a number of different schemes can be used for the chunking process. In one preferred embodiment, the DSP is programmed to perform the chunking scheme. The chunking scheme can also be performed by the host processor. Any of the chunking schemes described above could also be implemented in software, or a combination of hardware and software.

Image Compression

As was described above, the chunk size and sequential rendering is very valuable for image compression techniques since an entire 32×32 pixel chunk is completely rendered before the next chunk is computed, and thus can be compressed immediately. The tiler supports a lossy and lossless form of compression to compress chunks. Both the lossy and lossless form of compression compress chunks in independent blocks of 8×8 pixels, so each compressed 32×32 pixel chunk would consist of 16 such compressed blocks.

Figure 20:
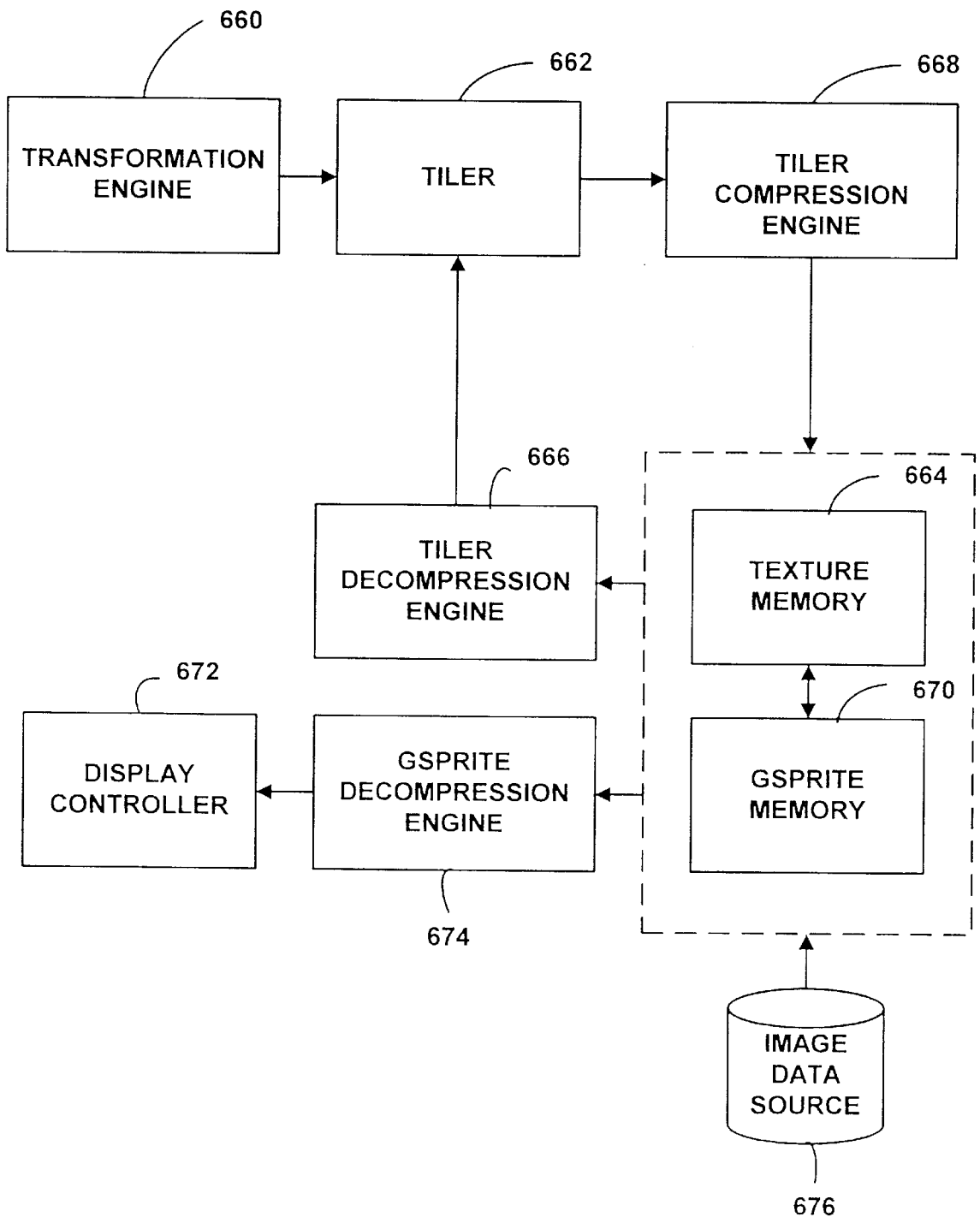
FIG. 20 is a block diagram illustrating image compression in an embodiment.

Compression of images allows much smaller memory size requirements and vastly reduced memory bandwidth requirements. The design uses a combination of caching, pre-fetch strategies, as well as chunking to reduce the latencies and overhead due to compression and block access. Since the entire image is computed in a 32×32 pixel buffer, gsprite image compression is achieved with minimal overhead. The overall conceptual design of the compression architecture is shown in FIG. 20.

The transformation engine 660 (FIG. 20) calculates model and viewing transformations, clipping, lighting, etc. and passes this information to the tiler 662. As the tiler processes transformation information, it reads texture data from texture memory 664. The texture data is stored in a compressed format, so as the texture blocks are needed, they are decompressed by the tiler decompression engine 666 and cached in an on-chip texture cache on the tiler. As the tiler resolves pixel data it transfers the resolved data to the tiler compression engine 668 which compresses the resolved data and stores the compressed data in gsprite memory 670. When the gsprite engine 672 needs the compressed gsprite data, it uses the gsprite decompression engine 674 to decompress the gsprite data from gsprite memory 664 and cache the data on an on-chip gsprite cache. In the actual hardware, the texture memory 664 and gsprite memory 670 are identical (i.e. the compressed data is stored in one memory shared by the various engines). Common shared memory is not required as long as the compression and decompression methods used are compatible. The gsprite data can also be taken from a data base or some other image source 676 and saved in the texture memory 664 and the gsprite memory 670.

One implementation of the invention supports both lossy and lossless compression and decompression of pixel blocks.

The lossy form of image compression has two stages: a lossy first stage, and a lossless second stage. The lossy form of compression begins with an optional color space conversion from red, green, blue (R, G, B) intensity values to luminance (Y) and chrominance (U and V, also referred to as Cr and Cb) values. The lossy stage includes a direct cosine transform (DCT) and a quantization that reduces the accuracy of certain frequency components.

The second stage is a lossless form of compression comprising Huffman coding and run length encoding (RLE). Alternative coding methods such as arithmetic coding can be used in place of Huffman coding.

Decompression for the lossy method includes a decoding stage, a dequantization of the compressed data, an inverse DCT, and an optional color space conversion from YUV to RGB.

The lossless form of compression includes an optional lossless color space conversion from RGB to YUV, a prediction stage, and a lossless encoding stage. This encoding stage can be identical to the entropy coding stage in the lossy form of compression. Decompression for this lossless method comprises a decoding stage, an inverse prediction step on each color component, and an optional color space conversion from YUV to RGB.

Lossy Compression/Decompression

One specific implementation of the lossy compression method in the compression engine 414 (FIGS. 9A–C) of the tiler occurs in four or five steps:

1. Convert the RGB data input to a YUV-like luminance-chrominance system (optional).
2. Perform a forward, two-dimensional discrete cosine transform (DCT) individually on each color component.
3. Order the two-dimensional DCT coefficients in approximately a monotonically increasing frequency order.
4. Quantize the DCT coefficients: Divide by either a uniform divisor or a frequency-dependent divisor.
5. Encode the resulting coefficients using Huffman encoding with fixed code tables.

Lossy decompression occurs in four or five steps:

1. Decode the compressed data input using Huffman decoding with fixed code tables.
2. Dequantize the compressed data: Multiply by the uniform multiplier or the frequency-dependent multiplier used in the quantization step of compression.
3. Reorder the linear array of data into the proper two-dimensional order for DCT coefficients.
4. Perform an inverse, two-dimensional DCT individually on each color component.
5. Convert the colors in the YUV-like luminance-chrominance system to RGB colors, if the compression process included the corresponding optional step.

Color Space Conversion

The color space conversion transforms the ROB colors to a brightness-color system with brightness coordinate Y and color coordinates U and V. This luminance-chrominance system is not a standard color space. Using this system improves the degree of compression because the color coordinates require only a small fraction of the bits needed to compress the brightness. The lossless, reversible conversion applies to each pixel independently and does not change the value of alpha.

RGB to YUV (for compression)

The conversion from integer RGB values to integer YUV values uses this transformation:

$Y=(4R+4G+4B)/3-512$
$U=R-G$
$V=(4B-2R-2G)/3$

YUV to RGB (for decompression)

The conversion from integer YUV values to integer RGB values uses this transformation:

$R=(((Y+512)-V)/2+U+1)/2$
$G=(((Y+512)-V)/2-U+1)/2$
$B=((Y+512)/2+V+1)/2$

Discrete Cosine Transform

Images and textures are pixels that contain the amplitudes for three colors and the amplitude for opacity. The pixel positions correspond to a spatial location in an image or texture map. An image or texture in this form is in the spatial domain. For images or textures, the discrete cosine transform (DCT) calculates coefficients that multiply the basis functions of the DCT. Applying the DCT to an image or texture yields a set of coefficients that equivalently represent the image or texture. An image or texture in this form is in the frequency domain.

The DCT maps the amplitude of the colors and opacity of an 8 by 8 pixel block between the spatial domain and the frequency domain. In the frequency domain, adjacent coefficients are less correlated, and the compression process can treat each coefficient independently without reducing the compression efficiency.

The forward DCT maps the spatial domain to the frequency domain, and conversely, the inverse DCT maps the frequency domain to the spatial domain. One suitable approach for the forward and inverse DCT is the approach described in FIGS. A.1.1 and A.1.2 in *Discrete Cosine Transform*. Rao, K. R., and P. Yip. San Diego: Academic Press, Inc., 1990.

The two-dimensional DCT produces a two-dimensional array of coefficients for the frequency domain representation of each color component. Zigzag ordering rearranges the coefficients so that low DCT frequencies tend to occur at low positions of a linear array. In this order, the probability of a coefficient being zero is approximately a monotonically increasing function of the position in the linear array (as given by the linear index). This ordering simplifies perceptual quantization and LOD filtering and also significantly improves the performance of the run-length encoding (RLE).

Quantization

Quantization reduces the number of different values that the zigzag-ordered DCT coefficients can have by dividing the coefficients by an integer. Depending on the value of the compression type parameter, quantization can be either uniform or perceptual. Neither case modifies the DC frequency coefficient (index 0), but instead passes it along unaltered.

The quantization process begins with the specification of the quantization factor for an image or portion of an image. In this implementation, a quantization factor is specified for a 32×32 pixel chunk. A quantization index (QIndex) specifies a corresponding quantization factor (QFactor) to use for the chunk. The following table shows the relationship between QIndex and Qfactor.

| Quantization Factor | | | |
|---|---|---|---|
| QIndex | QFactor | QIndex | QFactor |
| 0 | 2 | 8 | 32 |
| 1 | 3 | 9 | 48 |
| 2 | 4 | 10 | 64 |
| 3 | 6 | 11 | 96 |
| 4 | 8 | 12 | 128 |
| 5 | 12 | 13 | 192 |
| 6 | 16 | 14 | 256 |
| 7 | 24 | 15 | 4096 |

Each color plane has a different value for the chunk QIndex. A QIndex of 15 selects a QFactor of 4096, which produces zeros during quantization and inverse quantization. The quantization process divides each coefficient in a block by a QFactor and rounds it back to an integer. The inverse quantization process multiplies each coefficient by a QFactor. Quantization and inverse quantization do not change the DC frequency component.

Block Quantization Factor

The QIndex, and thus the QFactor, can vary from block to block (8×8 pixels). The QIndex for a block results from incrementing the QIndex for the chunk with a value embedded in the block compression type:

Block QIndex=Chunk QIndex+(Block Compression Type−3)

This increments the chunk QIndex by one, two, three, or four. Because the largest possible QIndex value is 15, any incremented value greater than 15 is set to 15.

The QIndex, and thus the QFactor, can also vary from coefficient to coefficient (from array index to array index) if the quantization type is perceptual.

For uniform quantization, the coefficient QIndex is equal to the block QIndex, so the corresponding QFactor either multiplies (inverse quantization) or divides (quantization) each coefficient in the block.

For perceptual quantization, the coefficient QIndex depends on the value (0. . . 63) of the index in the linear array. The following table gives the resulting coefficient QIndex as a function of the array index value.

| Coefficient QIndex | Array Index |
|---|---|
| Block QIndex | index < 12 |
| Block QIndex + 1 | 12 ≦ index < 28 |
| Block QIndex + 2 | 28 ≦ index < 52 |
| Block QIndex + 3 | 52 ≦ index |

Entropy Coding Huffman/RLE coding processes the linear array of quantized DCT coefficients by:

1. Independently encoding non-zero coefficients with the fewest possible bits (because the DCT coefficients are uncorrelated).
2. Optimally encoding continuous "runs" of coefficients with zero values—especially at the end of the linear array (because of the zigzag ordering).

One suitable approach for the Huffman/RLE coding process is the Huffman/RLE coding process used for the AC coefficients in the well known JPEG still image compression standard.

To enable random access of blocks, this particular approach does not encode the DC frequency coefficient (index=0), but instead passes it on unaltered. The algorithm computes a series of variable-length code words, each of which describes:

1. The length, from zero to 15, of a run of zeros that precedes the next non-zero coefficient.
2. The number of additional bits required to specify the sign and mantissa of the next non-zero coefficient.

The sign and mantissa of the non-zero coefficient follows the code word. One reserved code word signifies that the remaining coefficients in a block are all zeros.

Encoding

The encoding of all blocks uses the typical Huffman tables for AC coefficients from Annex K, section K.3.2 of ISO International Standard 10918. This includes Table K.5 for the luminance (Y) AC coefficients and Table K.6 for the chrominance (U and V) AC coefficients.

Decoding

The decoding of all blocks uses the same fixed tables as the encoding process. Therefore, it is never necessary to store or to convey the Huffman tables with the data.

Lossless Compression\Decompression

In the compression engine 414 in the tiler, lossless compression occurs in two or three steps:

1. Convert incoming RGB data to a YUV-like luminance-chrominance system (optional).
2. Perform a differential prediction calculation on each color component. Encode the resulting coefficients using Huffman encoding with fixed code tables.

Lossless decompression in the decompression engines 404, 450 in the tiler and gsprite engine occurs in two or three steps:

1. Decode the incoming compressed data using Huffman decoding with fixed code tables.
2. Perform an inverse, differential prediction (reconstruction) on each color component.
3. Convert the colors in the YUV-like luminance-chrominance system to RGB colors if the compression process included this corresponding optional step.

Color Space Conversion

The color space conversion reversibly transforms the RGB colors to a brightness-color system with brightness coordinate Y and color coordinates U and V. This is a unique color space that improves the degree of compression even more than the YUV system above because the numbers entering the Huffman/RLE encoder are smaller, and hence more compressible. The color space conversion applies to each pixel independently and does not change the value of alpha.

RGB to YUV for compression)

The conversion from integer RGB values to integer YUV values uses this transformation:

Y=G
U=R−G
V=B−G

YUV to RGB (for decompression)

The conversion from integer YUV values to integer RGB values uses this transformation:

R=Y+U
G=Y
B=Y+V

Alpha information is not altered during the color space transform.

The color space transform can be bypassed. The decompressor is notified in cases where the color transform is bypassed by a flag in a gsprite control data structure.

The prediction stage occurs after the color space transform. Prediction is a losslessly invertible step that reduces the entropy of most source images, particularly images with lots of blank space and horizontal and vertical lines.

In the prediction stage of compression and the inverse prediction stage of decompression:

1. p(x, y) are the pixel values input to the compressor and output from the decompression engine; and
2. d(x, y) are the difference values input to the coder in the next stage of the compression engine and output from the inverse of the coder in the decompression engine.

Prediction is computed as follows:

d(x, y)=p(x, y) for x=0, y=0
d(x, y)=p(x, y)−p(x, y-1) for x-0, y>0
d(x, y)=p(x, y)−p(x-1,y) for x>0

Inverse prediction in the decompression engine is computed as follows:

p(x, y)=d(x, y) for x=0, y=0
p(x, y)=p(x, y-1)+d(x, y) for x=0, y>0
p(x, y)=p(x-1,y)+d(x, y) for x>0

The Huffman/RLE coding and decoding is the same as for the lossy form of decompression/decompression in this implementation.

The compression methods described above compress images in independent blocks of 8×8 pixels. Therefore, in the chunking architecture described above, each compressed 32×32 pixel chunk consists of 16 such blocks. To facilitate compression of a 32×32 pixel chunk, the anti-aliasing engine 412 resolves pixel data into 8×8 pixel blocks. The 8×8 pixel blocks are buffered such that a first buffer is filled while a second buffer is compressed.

Controls and Parameters

As introduced above, the tiler (FIGS. 9A–9C) renders gsprites one chunk at a time. These chunks are comprised of pixel blocks (in this case, 16 8×8 pixel blocks). For texture mapping, shadowing, and some multi-pass rendering operations, the tiler fetches gsprite or texture blocks from memory. To compose a frame, the gsprite engine (FIG. 12A–B) fetches gsprite blocks, transforms pixels to screen space, and composites pixels in a compositing buffer.

There are a number of control parameters that govern processing of gsprites, chunks, and blocks. A gsprite display list stores a list of gsprites comprising a display image. This display list includes pointers to gsprites, and more specifically, gsprite header blocks. As described further below, the gsprite header block stores a number of attributes of a gsprite including gsprite width, height, and an affine transform defined in terms of a screen space parallelogram. The gsprite header block also includes a list of its member chunks. In one implementation, this list is in the form of pointers or handles to chunk control blocks.

Chunk control blocks include per chunk and per block parameters. The per chunk parameters include a YUV color converter bypass, default Q factors, a perceptual quantization flag, pixel format, and whether the pixel data resides in memory managed in Memory Allocation Units (MAU) in linear memory. An MAU is a piece of shared memory used to allocate chunk memory. MAU managed memory includes a list of MAUs (124 bytes for example), each MAU having a pointer to the next MAU. In one specific implementation for example, the chunk control blocks are stored in sequential MAUs for each gsprite.

The per block parameters include compression type, number of MAUs the block spans, and a block pointer pointing to the first byte of pixel data for the block. The specific block format is an 8×8×4 array of pixels that encode 32 bit pixels (8-bits for RGB and Alpha).

The steps for retrieving a pixel given (X,Y) coordinates in a gsprite using the above control parameters include:

1) Divide Y and X by 32 to derive the chunk row and column, respectively.
2) Form the chunk number by: (chunk row) * (width of sprite in chunks)+chunk column.
3) Form the Chunk Control Block offset by: (chunk number) * (size of chunk header block))
4) Form the Block offset within the Chunk Control Block by: (Y<4:3> * 4+X<4:3>) * 3.
5) Send the Block pointer to the Decompressed cache logic, receive a Block.
6) Form the pixel offset within the Block by (Y<2:0>* 8)+X<2:0>

Here, a chunk offset is used to select a chunk. A block offset is then used to select a block pointer. The block pointer selects a block containing the pixel, and the pixel offset selects the pixel.

To access the block for a given pixel among compressed blocks of pixel data, the cache controls on the tiler and gsprite engine perform the following steps:

1) Form the MAU address by looking up the Block pointer value in the Chunk Control Block, and dividing by the size of the MAU.
2) Look up the number of MAUs allocated in the Chunk Control Block for this block.
3) Look up the next Block pointer address in the Chunk Control Block.
4) Form the length of the compressed block by: MAUs allocated * MAU size +2's complement of ((Block pointer) mod MAU size)+(next Block pointer) mod (MAU size)
5) Send the block address and the length of the compressed block to the Compressed Cache logic.

The compressed cache will read the first MAU, and if the length of the transfer has not been satisfied, then the pointer contained in the MAU will be used to access the start of the next MAU. This process continues, until the transfer length has been met.

To support MIP map texture operations, the tiler supports another level of indexing. One method for indexing a MIP map level includes the following steps:

```
mipChunkOffset[0] = 0          \\Offset for level of detail 0
For each level of mip map:
    mipChunkOffset[level+1] = width of sprite/(2^level) * height of
sprite/(2^level)
                                    + mipChunkOffset[level]
```

2) Use the LOD parameter to get the mip chunk offset.

At this point, the mip chunk offset, width of sprite/(2^level), and height of sprite/(2^level) can be used to find any desired chunk within the chosen level of detail for the current gsprite.

Gsprites

Above, we introduced the concept of a gsprite. To recap briefly, one or more objects in the view volume can be assigned to a gsprite. Gsprites can be rendered independently, which enables them to be rendered at different resolutions and updated at varying rates. To reduce rendering overhead, the system can approximate motion of an object by performing an affine transformation on the gsprite instead of re-rendering the object. To display the gsprites comprising a scene, the system composites the gsprites representing objects in the scene. We will explain these and other features in more detail below.

As described above, the system begins by assigning geometry to a gsprite. A gsprite is a two-dimensional region measured in the coordinates of the physical output device. In the implementation detailed below, the gsprite shape is a rectangle, but it can have other shapes as well. Gsprites can be affinely transformed by the gsprite engine (i.e. it can be scaled, translated, rotated, reflected, and/or sheared—any transformation possible with a 2×2 matrix plus translation). One application of the 2-D transform is to simulate 3-D movement. Gsprites can be instanced, such that the same gsprite image can appear multiple times on the screen with different transformations. The instancing can apply to rectangular subsets of a gsprite image as well as the entire image. It can also apply on a color component basis, e.g. alpha might come from one gsprite while the color comes from another.

In general, the image preprocessor assigns one object to a gsprite, but more than one object can also be assigned to a gsprite. The image preprocessor combines interpenetrating or self-occluding objects in a single gsprite. It also aggregates objects based on memory and processing constraints. For instance, the image processor may not be able to composite several independent but overlapping gsprites in the time required by the refresh rate of the output device. In this case, the system can aggregate these overlapping objects into a single gsprite.

After assigning objects to gsprites, the image processor renders the gsprites for the frame. Rendering objects independently enables the system to reduce rendering overhead because it does not have to re-render each object in a scene in every frame. We will elaborate further on this feature below.

To display objects in a scene, the image processor composites gsprites including the objects in the scene. Compositing refers to the process of combining color data from gsprite layers. To support translucency, the image processor also takes into account the alpha values of transformed gsprite pixels as it composites them for display.

Figure 21A:
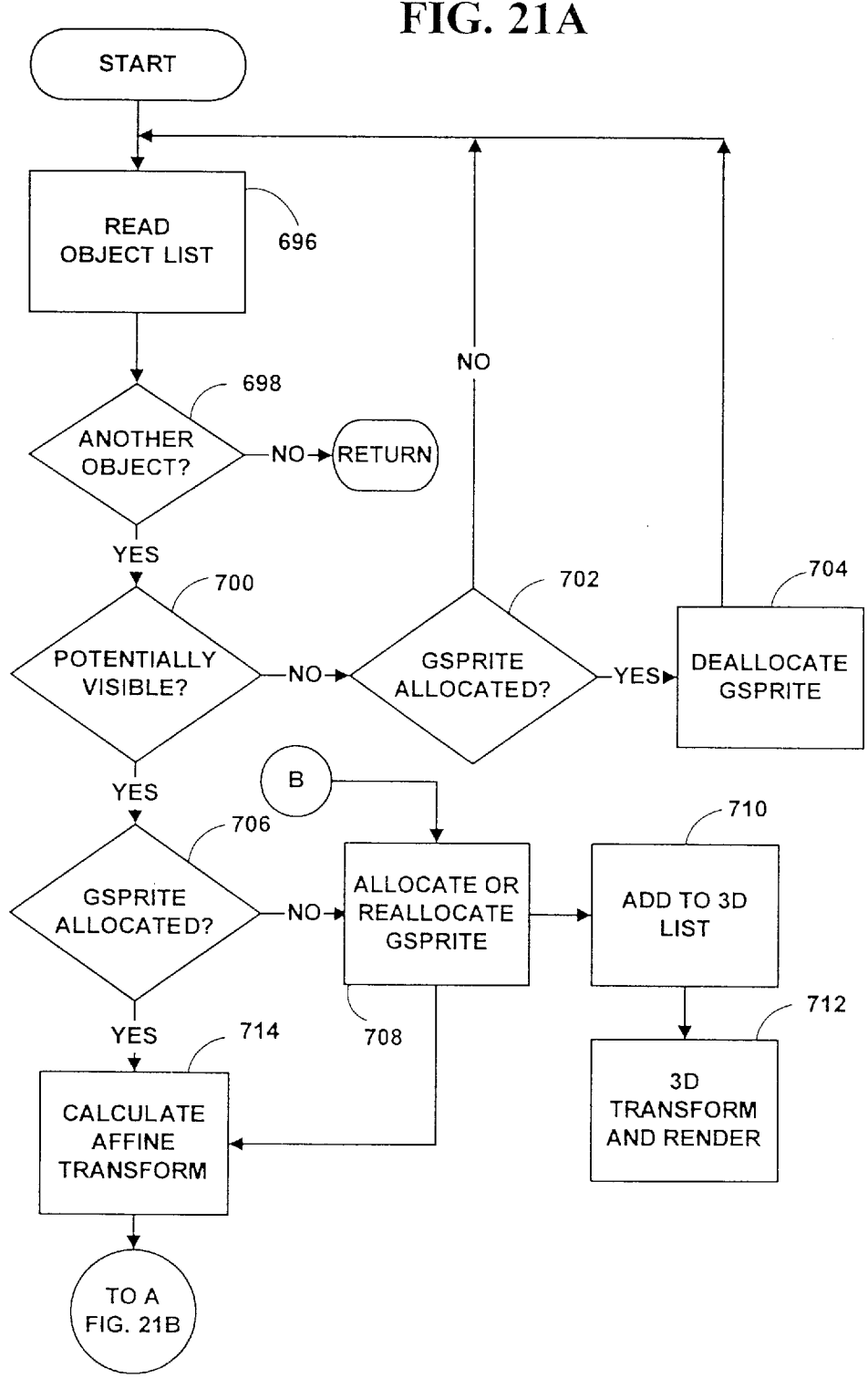
FIGS. 21A–B are flow diagrams illustrating the processing of gsprites in an embodiment.
Figure 21B:
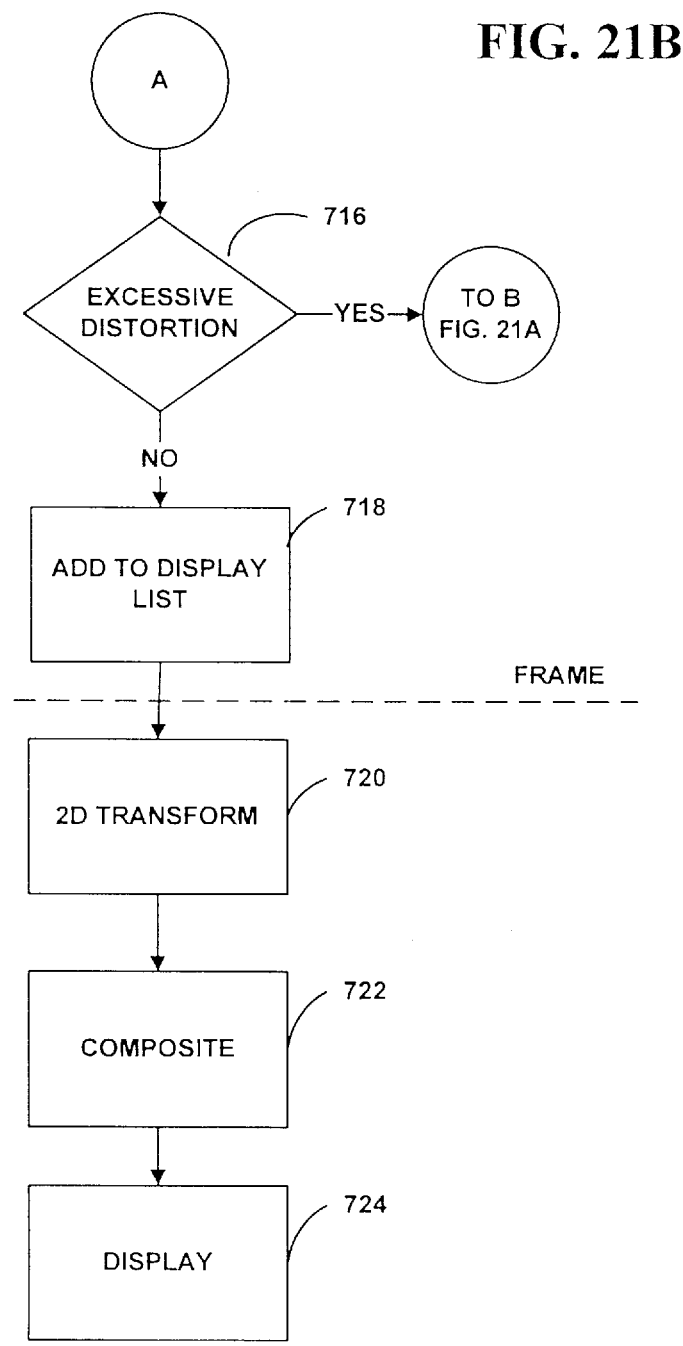

FIGS. 21A and 21B are flow diagrams illustrating how gsprites are processed in an embodiment. In the illustrated embodiment, the processing of gsprites spans two frame periods. Objects in a scene are allocated to gsprites and rendered in the first frame period, gsprites in the scene are then transformed and composited in a next frame period.

First, the image preprocessor determines potentially visible objects. In FIG. 21A, we illustrate this process as a series of steps. For a frame, the image processor determines potentially visible objects by traversing a list of objects (696, 698) and determining which objects are potentially visible in a scene, i.e. within a view space.

The image preprocessor then allocates, reallocates, or deallocates gsprites. Allocating a gsprite generally refers to creating a data structure to represent the gsprite in the system. If an object is not potentially visible (700), and the system has not allocated a gsprite for it (702), no additional processing is necessary. If an object is not potentially visible (702), and the system has already allocated a gsprite for it (702), then the image preprocessor deallocates the gsprite for that object (704).

The image preprocessor allocates a new gsprite data structure for potentially visible objects for which the system has not allocated a gsprite (706, 708). In this case, the image preprocessor creates a gsprite data structure and queues image data corresponding to the object for rendering (710). This "queuing" for rendering is represented as adding to a list of objects for 3-D rendering (710). The image preprocessor also calculates an affine transform for the gsprite (714). The affine transform serves two purposes in this embodiment. First, it can be used to approximate motion of the object that it corresponds to in the scene. Second, it can be used to transform a gsprite from gsprite space to the output device coordinates. Gsprite space refers to a coordinate system used in subdividing the object into chunks. The coordinate system used to subdivide the object into chunks can be optimized so that chunk regions most efficiently cover the object transformed to 2-D space.

If an object is potentially visible (700), and the system has allocated a gsprite for it (706), then the illustrated image preprocessor computes an affine transformation (714). As we will explain in further detail below, the affine transformation can be used to approximate the motion of the object. The image preprocessor evaluates the accuracy of this approximation, and if it produces too much distortion (716), the image preprocessor re-allocates a gsprite for the object (708). In this case, the image preprocessor then queues the geometry to be rendered into the gsprite for rendering (i.e. places in the 3-D list) (710), and also adds the gsprite to the display list (718).

If, however, the affine transformation can be used to accurately approximate the object's motion (716 distortion is within a preset tolerance), then there is no need to re-render the object, and the image preprocessor places the gsprite associated with the object in the display list (718).

In the next frame period, the image processor generates the display image. The frame period is illustrated by the dashed line separating steps (718) and (720). The image processor traverses the display list, and transforms the gsprites in the list to the physical output device coordinates (720). The transform to the output coordinates generally includes scanning pixel data from a warped, rotated or scaled gsprite to the pixel locations of output device. The image processor then composites this transformed or "scanned" gsprite data (722). Finally, the image processor converts the pixel data to analog values and displays the image (724).

FIGS. 5A and 5B are flow diagrams illustrating the process of rendering geometry in a chunking architecture. It is important to note that the gsprite concepts described above are not limited to a chunking architecture. FIG. 5A and the accompanying text above provide more description regarding how the image preprocessor determines gsprite configuration from the geometry in a scene. See steps (240–244) and accompanying text. Specifically, objects can be aggregated and rendered into a single gsprite or a small number of gsprites if necessary, due to processing limitations of the image processor. For example, if the tiler, gsprite engine, and compositing buffer cannot process the current assignment of objects to gsprites for a frame at the required frame refresh rate, then data can be passed back to the DSP or host processor to aggregate objects and render multiple objects in a gsprite.

FIG. 6 provides additional information regarding the processing of gsprites in one embodiment. As shown in FIG. 6 and described above, the image preprocessor also determines the depth order of gsprites (280).

When the image preprocessor allocates a gsprite, it creates a data structure to represent the gsprite. The gsprite data structure includes a header for storing various attributes of the gsprite and for keeping track of where related image data is stored in memory. The data structure includes fields to store the size of the gsprite, to represent the edge equations for the edges of the gsprite, to maintain 2-D transform data, and other image attributes.

After determining the gsprite configuration for the view space, the image preprocessor determines which gsprites to render. Instead of rendering all of the objects in a scene, the system can re-use gsprites rendered from another frame. The change in position of an object from frame to frame can be approximated by performing an affine transformation on a rendered gsprite. As shown in FIG. 6, the image preprocessor loops on gsprites (282–286) and computes gsprite transforms (284). In the following section, we elaborate further on gsprite updating and warping of gsprites.

The image processing system can approximate motion of a 3-D object by performing an affine transformation on a rendered, 2-D gsprite representing the object. We refer to the process of performing an affine transformation on a rendered image as "warping," and a gsprite resulting from this process as a "warped gsprite." In one implementation, the process of simulating 3-D rendering of an object includes the following steps: 1) calculating an affine transformation matrix to approximate the geometric motion of characteristic points; 2) measuring the accuracy of the approximation in step 1; and 3) if the accuracy is sufficient, then performing an affine transformation on the gsprite at time $t_0$ to approximate its position at a later time t.

FIG. 22 is a flow diagram illustrating the process of performing an affine transform to simulate 3-D motion. To be complete, FIG. 22 shows "select characteristic points" as the first step (744). As will become apparent from the discussion below, characteristic points are typically not selected during image processing, but rather are specified by the author of the geometric model.

The affine transformation used to simulate the motion of an object is computed using characteristic points. Characteristic points are points selected for an object to represent its position or other important image characteristics as they change over time. Since we will refer to characteristic points in world coordinates of a 3-D model and the screen coordinates of the model transformed to screen space, it is helpful to clarify terms that we will use to describe these points. We will refer to characteristic points in screen space as "viewing characteristic points," and we will refer to characteristic points in world coordinates as "modeling characteristic points."

By selecting a representative set of characteristic points rather than considering the entire set of object points, we simplify the calculation of the affine transformation significantly. The number of characteristic points needed to obtain an accurate approximation of an object's 3-D motion varies depending on the model. If the object is a rigid body, characteristic points can be selected from a bounding box enclosing the entire object. If the points defining the bounding box are transformed with the same transformation, then the bounding box points follow the transform of the object geometry.

For objects with more complex motion, more characteristic points may be required to obtain an accurate approximation. For example, an object can be sub-divided into a number of rigid bodies, each with a bounding box approximating its position. If the object is comprised of a hierarchy of rigid bodies with individual moving transformations, then the characteristic points can be derived from the union of the moving sub-object bounding box vertices.

As another alternative, the author of the model can specify characteristic points for the model. This enables the author of the model to specifically identify characteristic points used to approximate the object's 3-D motion. As described further below, the accuracy of the affine transform can be verified according to any of a number of metrics. By enabling the author to specify the characteristic points, the author can specify points most relevant to the metric or metrics used to evaluate the accuracy of the affine transform.

Given a set of characteristic points, an affine transformation can be computed to approximate the change in position of a gsprite from time $t_0$ time t. This step is illustrated as step (746) in FIG. 22.

The affine transformation is computed from the viewing characteristic points at time to and t. Depending on how the characteristic points are selected, the modeling characteristic points represent points on an object or on its bounding box. The position of these modeling characteristic points changes with time according to the modeling transform. To find the viewing characteristic points, the modeling characteristic points are multiplied by the viewing transform. The following discussion will help clarify the process of computing the affine transformation matrix used to transform a 2-D gsprite.

The format of the affine transformation matrix is as follows:

$$S = \begin{bmatrix} a & b & p_x \\ c & d & p_y \end{bmatrix}$$

One metric to check the accuracy of the approximation is the position metric. The position metric refers to the difference in position between the characteristic points at time t and the position of the characteristic points at $t_0$ multiplied by the affine transformation matrix. The general formula for the position metric is as follows:

$$\Sigma_i \|\bar{x}^i(t) - S(t)\bar{x}^i(t_0)\|^2$$

In the case of the position metric, the position of the characteristic points in screen space is most relevant because the difference in position on the screen indicates how accurate the transformed gsprite approximates the motion of its corresponding 3D model. For other metrics, however, the accuracy of the approximation can be computed in terms of the modeling characteristic points. For the example of the position metric, we consider the screen space points directly.

Let $$\bar{x}^i(t) = V(t)T(t)x^i(t)$$

be the screen space points, where) V(t) is the viewing transform and T(t) is the modeling transform. To compute the affine transformation matrix, a standard least-squares technique can be used. Solving the linear system:

$$[\bar{x}^i(t_0)1]S(t) = \bar{x}^i(t)$$

the standard least-squares solution techniques produce a result that minimizes the position metric.

For the case when there are three characteristic points, the affine transformation matrix can be solved directly. For example, if three points on the axes of a bounding box are used, the result is a closed form expression for the time-dependent affine transformation matrix as shown below:

$$\begin{bmatrix} x^0 & y^0 & 1 \\ x^1 & y^1 & 1 \\ x^2 & y^2 & 1 \end{bmatrix}_{t_0} \begin{bmatrix} a & c \\ b & d \\ p_x & p_y \end{bmatrix}_t = \begin{bmatrix} x^0 & y^0 \\ x^1 & y^1 \\ x^2 & y^2 \end{bmatrix}_t$$

$$S(t) = [X(t_0)1]^{-1}X(t)$$

$$[X(t_0)1]^{-1} = \frac{1}{D} \begin{bmatrix} y^1 - y^2 & y^2 - y^0 & y^0 - y^1 \\ x^2 - x^1 & x^0 - x^2 & x^1 - x^0 \\ x^1y^2 - x^2y^1 & x^2y^0 - x^0y^2 & x^0y^1 - x^1y^0 \end{bmatrix}$$

where $D = x^1y^2 - x^2y^1 + x^2y^0 - x^0y^2 + xy^1 - x^1y^0$

In the general case, a least squares technique such as normal equations or singular value decomposition can be used to solve for the affine transformation matrix. The generalized problem is illustrated below:

$$\begin{bmatrix} x_0 & y_0 \\ x_1 & y_1 \\ x_2 & y_2 \\ \cdot & \cdot \\ \cdot & \cdot \end{bmatrix} \begin{bmatrix} a & c \\ b & d \\ t_x & t_y \end{bmatrix} = \begin{bmatrix} x_0 & y_0 \\ x_1 & y_1 \\ x_2 & y_2 \\ \cdot & \cdot \\ \cdot & \cdot \end{bmatrix}$$

To solve for the affine transformation matrix, the pseudoinverse of an N by 3 matrix has to be computed. For an arbitrary number of characteristic points, we use a least squares technique to solve for the pseudoinverse. In one embodiment, the normal equations method is used.

Let $\tilde{X}$ be the transposed matrix of characteristic points at time $t_0$, and let X be the transposed matrix of characteristic points at time t.

$$[\tilde{X}1]S = X$$

$$\begin{bmatrix} \tilde{x}^0 & \tilde{y}^0 & 1 \\ \tilde{x}^1 & \tilde{y}^1 & 1 \\ \cdot & \cdot & \cdot \\ \cdot & \cdot & \cdot \\ \cdot & \cdot & \cdot \\ \tilde{x}^{n-1} & \tilde{y}^{n-1} & 1 \end{bmatrix} \begin{bmatrix} a & c \\ b & d \\ p_x & p_y \end{bmatrix} = \begin{bmatrix} x^0 & y^0 \\ x^1 & y^1 \\ \cdot & \cdot \\ \cdot & \cdot \\ \cdot & \cdot \\ x^{n-1} & y^{n-1} \end{bmatrix}$$

To solve with the method of normal equations, both sides of the equation are multiplied by the transpose of the fitting matrix, and then the resulting square matrix is inverted. The typical weakness of normal equations is that the resulting matrix is singular, or prone to instability due to round-off error. The matrix will be singular if the characteristic points are degenerate. In the particular form of the matrix, round-off error can be controlled by normalizing the terms.

$$[\tilde{X}1]^T[\tilde{X}1]^T X$$

$$[\tilde{X}1]^T [\tilde{X}1]S = [\tilde{X}1]^T X$$

$$\begin{bmatrix} \Sigma_i \tilde{x}^i\tilde{x}^i & \Sigma_i \tilde{x}^i\tilde{y}^i & \Sigma_i \tilde{x}^i \\ \Sigma_i \tilde{x}^i\tilde{y}^i & \Sigma_i \tilde{y}^i\tilde{y}^i & \Sigma_i \tilde{y}^i \\ \Sigma_i \tilde{x}^i & \Sigma_i \tilde{y}^i & 1 \end{bmatrix} \begin{bmatrix} a & c \\ b & d \\ p_x & p_y \end{bmatrix} = \begin{bmatrix} \Sigma_i \tilde{x}^ix^i & \Sigma_i \tilde{x}^iy^i \\ \Sigma_i \tilde{y}^ix^i & \Sigma_i \tilde{y}^iy^i \\ \Sigma_i x^i & \Sigma_i x^i \end{bmatrix}$$

There are just five terms in the resulting matrix. The 3×3 matrix is then inverted to obtain the affine transform. Alternately, since the sum of the x coordinates term and the sum of they coordinates term correspond to the centroid of the characteristic points, these terms can be eliminated by a change of coordinate system to translate the centroid to 0,0. The resulting matrix is 2×2 and easily inverted.

After calculating the affine transformation matrix, the accuracy of the approximation is checked using one or more metrics. Decision step (748) of FIG. 18 illustrates the step of checking one or more metrics and shows generally how the logic branches based on the metric(s). As described above, the position metric is one example of how the accuracy of the affine transformation can be checked. To measure whether the affine transformation satisfies the position metric, the viewing characteristic points at time to transformed using the computed affine transformation are compared to the viewing characteristic points at time, t.

Another approach is to use the internal rotation of the 3-D model as a metric. In this case, the modeling characteristic points at time to transformed using the computed affine transformation are compared with the modeling characteristic points at time t.

Yet another approach is to use a lighting metric. Like the metric for internal rotation, the modeling characteristic points are used to check the accuracy of the approximation.

In addition to the metrics described above, there are a variety of other alternatives. To compute these metrics, relevant characteristic data can be maintained along with the characteristic points. A single metric, or a combination of metrics can be used depending on the desired accuracy.

If the characteristic points representing the transformed gsprite are sufficiently accurate, then the transformed gsprite can be used in place of a re-rendered gsprite. To compute the 2-D transform, the gsprite for time $t_0$ is multiplied by the affine transformation matrix (750). In contrast to rendering the gsprite, this computation consumes significantly less processing time. Simulating 3-D motion with a 2-D transform, therefore, can significantly reduce the amount of processing required to render an image.

Based on the accuracy of the approximation, the system can reduce rendering overhead as needed to stay within its rendering capacity for a frame of image data. To illustrate the concept generally, FIG. 22 shows that a gsprite is re-rendered if the 2-D transform is not sufficiently accurate (754). However, as will be described in further detail below, it is not necessarily preferred to accept or reject a gsprite based on a metric. Rather, it is often useful to determine how accurate the approximation will be for a number of gsprites in a scene and then re-render as many gsprites as possible. We describe a process for "priority queuing" of gsprites below.

In the embodiment described above and illustrated in FIG. 22, an affine transform is applied to a gsprite, even if re-rendered. This is not necessary in all implementations of this concept. However, in this case the affine transform can be used to transform gsprite data where the image preprocessor has transformed the data as an optimization in chunking.

Color Warping of Gsprites

As a further optimization, the rendering system can sample the lighting changes from frame to frame and modify the color values of the gsprite to approximate these changes. This approach includes three principal steps 1) sampling the lighting change between frames; 2) determining how to modify the color values in the gsprite to approximate the lighting change (i.e., compute a color warp); and 3) if sufficiently accurate, performing a color warp on the gsprite to approximate the lighting change. If after evaluating the lighting equation the pre-processor determines that the lighting has changed more than a predefined amount, then it instructs the tiler to re-render the object.

In the first step, the rendering system samples the lighting change for an object associated with the gsprite. It samples the lighting change between a first frame in which an object is rendered to a gsprite, and a subsequent frame in which the rendering system attempts to color warp the gsprite to approximate the lighting change. One way to sample the lighting change is to sample the lighting equation at characteristic points with normals for the first frame and the subsequent frame and compare the results of sampling at each of these frames. The characteristic points should preferably be distributed on the object to provide an accurate sampling of the lighting change across the gsprite. The specific number and location of characteristic points can vary and is generally model-specific.

One example of lighting equation is:

$$I_\lambda = I_{a\lambda}k_a O_{d\lambda} + f_{alt}I_{p\lambda}[k_d O_{d\lambda}(N \bullet L) + k_s O_{s\lambda}(R \bullet V)^n]$$

where:

$I_\lambda$ is the ambient light.

$k_a$ is the ambient reflection coefficient.

$O_{d\lambda}$ is the object's diffuse color.

$f_{alt}$ is the light source attenuation factor, which describes how the light energy decreases the farther it travels from a light source.

$I_{p\lambda}$ is the light from a point source.

$k_d$ is the diffuse reflection coefficient, a constant between 0 and 1 that varies from one material to another.

$O_{s\lambda}$ is the object's specular color.

$k_a$ is the material's specular-reflection coefficient, which ranges from 0 to 1.

(N•L) is the dot product between a surface normal N and the direction of the light source L.

(R•V) is the dot product between the direction of reflection R and the direction to the viewpoint V.

the superscript n is the material's specular reflection exponent, which typically varies from 1 to several hundred.

$\lambda$ indicates that a term having this subscript is wavelength dependent. One assumption to simplify the lighting equation is to assume that the RGB color model can sufficiently model the interaction of light with objects. Using this assumption, the lighting model can be applied to each R, G, and B color component.

The lighting equation above is only an example illustrating one method for computing lighting at points on the surface of an object. The lighting equation can be simplified, for example, by disregarding the light attenuation factor or the specular reflection. In the field of 3D graphics rendering, there are a variety of other conventional lighting equations used to model lighting on the surface of a graphical object. Therefore, any of a number of different lighting equations may be used to sample the lighting at characteristic points associated with a graphical object. In general, the pre-processor computes the lighting equation and determines how the resulting lighting value I (possibly for each RGB component) changes in magnitude from frame to frame.

To evaluate the change in lighting from frame to frame, the image pre-processor computes the lighting equation for characteristic points at a first and a subsequent frame using the surface normal at the characteristic point, the direction of the light source for each frame, and possibly other data associated with the particular lighting equation.

The system can sample lighting change at characteristic points on an object represented by the gsprite or at characteristic points on a bounding volume of the object. One approach to sampling the lighting change is to sample the lighting change on the surface of a bounding volumes of the object. For instance, the system can sample lighting changes at normals on the surface of a bounding sphere of the object or parts of the object. A bounding sphere allows the pre-processor to track the significant variations that might occur due to a local light source being moved within the "space" of an object. If the image pre-processor simply used a set of vectors located at the centroid of an object, the movement of a local light source might not cause significant local illumination changes but may have a significant impact on the lighting of the object as a whole. In these circumstances, the sampling of lighting changes at the surface of a bounding sphere may more accurately capture the lighting changes for the object, which would otherwise be missed by looking selectively at characteristic points on the surface of the object.

As another alternative, a combination of normals at characteristic points on the object or at the surface of a bounding sphere can be used to sample lighting changes. This approach can more effectively track lighting changes because it tracks lighting changes at characteristic points on the object and at the surface of a bounding volume for the object.

Based on the lighting changes, the system can determine how to modify the gsprite color values to approximate these lighting changes. Similar to the geometric transform performed on a gsprite, the system computes how to warp the color values of the gsprite to approximate the lighting change. One way to compute the color warp is to use a least squares fit approach as described above. The result of this step is a constant, linear or higher order warp used to modify (e.g. multiply by a scaling factor and/or add an offset) the color values at pixel locations across the gsprite.

The color warp includes a multiplier or an array of multipliers applied across the gsprite. In the simplest case, the color warp can simply be a constant scale factor applied to all pixels in the gsprite. A more accurate approach is to use a linear or higher order warp to approximate the lighting changes. Preferably, the multiplier is vector-valued so that the color components can be scaled independently. To accurately model changes from colored light sources, each color component should be scaled independently.

In addition to the multiplier, an offset value, added to a color value in the gsprite, can also be computed based on the lighting changes at the characteristic points.

One way to compute the multiplier and offset values is to solve for a multiplier and offset that represents the change in the lighting equation at each characteristic point, whether the characteristic points are located at the surface of the object, at the surface of a bounding volume, or both. The pre-processor can compute a multiplier, an offset, or both by selecting a multiplier or offset, or a combination of a multiplier and offset that causes the same or substantially the same change of the lighting equation at each characteristic point as observed during the sampling stage. Once these multipliers and/or offsets are computed, there are a number of ways to compute the multiplier and offsets applied to color values in the gsprite. One way is to average the multipliers to derive a single scale factor for the gsprite. Another way is to average the offsets to derive a single offset for the gsprite. Still another way is to perform a least squares fit on the multiplier and offsets independently to derive expressions that represents how the multipliers and offsets change with location on the surface of the object. This expression can be implemented in hardware using interpolators to compute independent multipliers and/or offsets for pixel locations in the gsprite. For example, the gsprite engine can include a rasterizer with interpolators to interpolate multipliers and/or offsets for each pixel location before multiplying a color value by the multiplier or adding an offset to a color value or a scaled color value (i.e. scaled by the corresponding mulitplier computed for the pixel location).

Just as the system evaluates the accuracy of the geometric warp, the system can also evaluate the accuracy of the color warp by comparing color values computed by color warping with corresponding color values computed for the current frame using the normal rendering process. If the color values differ by more than a predefined tolerance, then the gsprite should be re-rendered.

Figure 23:
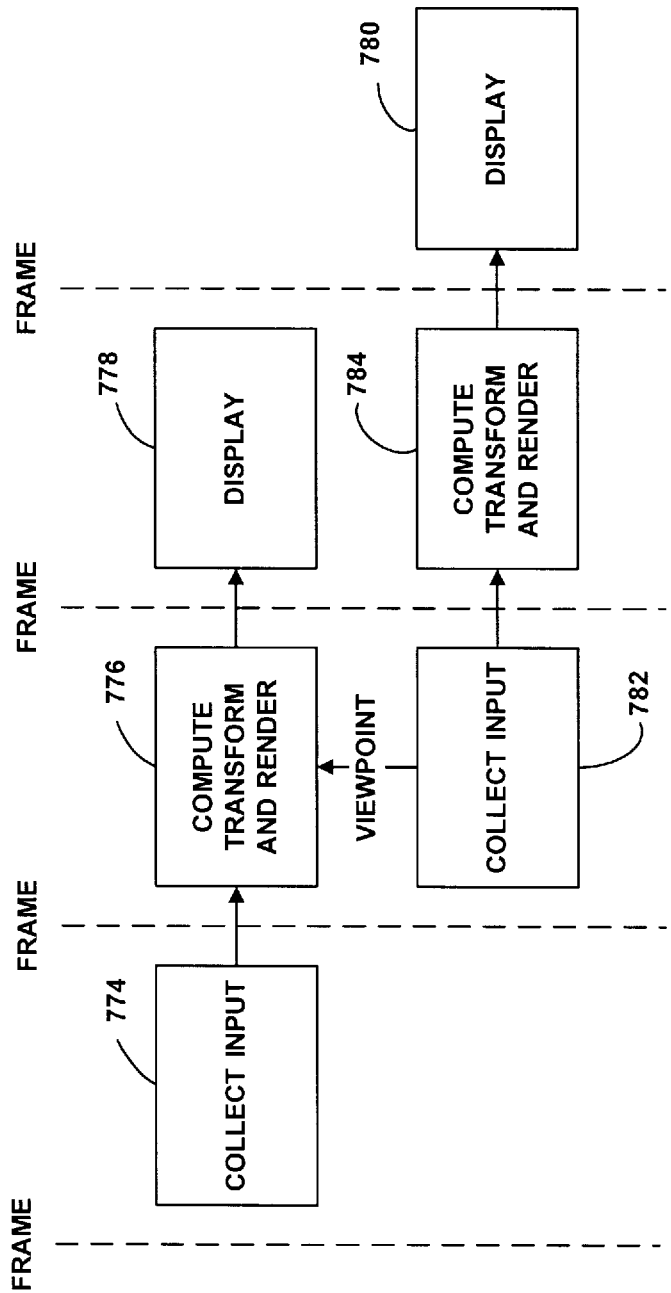
FIG. 23 is a diagram illustrating how gsprite transforms can reduce transport delay in an embodiment.

In addition to reducing rendering overhead, warping of gsprites can reduce transport delay. In applications where the viewpoint perspective changes rapidly, it is difficult to display the rapidly changing perspective because of transport delay. Transport delay refers to the delay incurred between receiving input, which causes a change in viewpoint, and the ultimate display of the appropriate image for that new viewpoint. FIG. 23 illustrates an example of how transport delay can be reduced. The sections along the horizontal axis represent time increments corresponding to frame delay.

In this example, there is a delay of three frame periods between sampling input and displaying output on a display device. First, the input is sampled in a first frame 774. Next, the system computes the affine transforms and renders objects in the gsprites 776. Finally, the rendered image data for the frame is composited and scanned out to the display device 778. While the time required to perform each of these steps is not necessarily an entire frame delay as measured by a frame period, we use the increment of a frame period to illustrate the concept. As illustrated, there are three frame periods of delay between the input and the display of the corresponding image data.

To reduce transport delay, viewpoint data from a subsequent image can be applied at the rendering phase of the current image 782. This is illustrated by the arrow from the input phase for a subsequent image 782 to the gsprite transform and rendering phase 776 of the current image. Processing steps (782, 784, 780) for the next frame of image data are shown adjacent to steps (776, 778) as shown in FIG. 23. As illustrated, processing occurs in a pipeline fashion. Inputs are sampled for a subsequent frame while gsprite transforms are computed and rendering is performed for the current frame.

The modeling transform for the current image can be used in conjunction with the viewing transform for the subsequent image to compute a gsprite transform, which is typically in the form of an affine transformation matrix. A rendered gsprite can then be warped to simulate its position relative to the viewpoint of the subsequent image. This approach decreases the effect of transport delay on the user because it enables the system to more quickly adjust for rapid changes in the viewpoint perspective.

In addition to reducing transport delay in this context, the use of subsequent image data can be used to reduce transport delay in other contexts as well.

As outlined above, there are a number of advantages to rendering gsprites independently. Gsprites can have different update rates, and therefore, the number of gsprites that are updated in a particular frame varies. Some gsprites may need to be updated every frame while other gsprites can be updated less frequently. If a number of gsprites have to be updated in a particular frame, the rendering overhead can increase dramatically and overload the system. To address this problem, the system performs priority queuing, which enables it to distribute rendering among a number of frames and process gsprites more efficiently.

Without priority queuing, the number of gsprites that are scheduled for rendering in a particular frame can vary. For example, some gsprites can have predefined update rates. The update rate for a gsprite can vary depending on whether it is in the foreground or background of a scene. With the support for affine warps described above, the system can avoid re-rendering a gsprite by simulating a change in position with an affine transformation. In the case of affine warps, the need to re-render a gsprite can vary depending on how the scene is changing.

To implement priority queuing, the system prioritizes rendering based on the amount of distortion that would result by re-using a rendered gsprite. The distortion is computed based on one or more error thresholds. To quantify distortion of a gsprite, the system measures how close, or conversely, how far a gsprite is to its error threshold. The error threshold can vary for each gsprite and can be based on one or more factors. A distortion ordered list of gsprites is maintained to represent the relative quality of the gsprites before re-rendering. Then, as many of the gsprites are re-rendered in a frame as possible in view of the system resources. Gsprites are re-rendered starting with the most distorted gsprite and continuing in descending order to lesser distorted gsprites. Processing in this manner eliminates the possibility of a frame overload from gsprite rendering, instead providing an efficient mechanism for balancing scene complexity and motion against gsprite accuracy.

In addition to the features described above, rendering to gsprites enables the system to vary the resolution of objects in a scene. This enables the system to allocate processing and memory resources to gsprites based on their importance in a scene.

The cost of a gsprite can be measured in terms of the memory it occupies and the processing required to render it. Both of these costs are strongly dependent upon the number of pixels in the gsprite image. If gsprite images are stored and rendered at a fixed resolution, the screen resolution, the cost incurred by a gsprite is determined by its screen extent.

It is important to allocate processing and memory resources based on the type and location of an object rather than merely the size it occupies on the screen. Active objects in the foreground of a scene are typically more important to the scene than the background. However, if the gsprite is allocated resources based on size, then the processing and memory cost for the background is much larger due to its greater screen extent.

The system can decouple the screen resolution from the resolution of the gsprite so that the cost of a gsprite may be set independently of its final screen coverage. The system achieves this by choosing the appropriate resolution of the gsprite and then scaling the gsprite to an appropriate size.

The magnification or scaling factor can be derived from the screen extent of the image and the gsprite resolution. Typically, a graphics application supplies the screen extent. The graphics application can also specify the resolution. Alternatively, the image preprocessor can determine gsprite resolution based on the resources available and the relative importance of the gsprite in the scene.

In operation, the image processor renders the gsprite to a smaller area in output device coordinates than it actually occupies in the view space. The size of the area to which the gsprite is rendered is derived from the resolution and the screen extent. The rendered gsprite can then be scaled to its actual size, as defined by its screen extent. Since the gsprite has a smaller area, it consumes less memory and less processing resources for rendering. Moreover, in the illustrated embodiment gsprites of varying resolutions may still be processed in a common graphics pipeline.

One way to support this approach is to store the magnification or scaling factor in the gsprite data structure. The scaling factor can then be used to scale the gsprite before it is composited with other gsprites to generate the display image. The image preprocessor can perform the scaling of the gsprite. More specifically, in the implementation described above the DSP scales the gsprite.

Just as a gsprite can be scaled to reduce resolution, it can also be rendered to one size and then scaled to a smaller display area. This technique can be applied to objects in a scene that are fading in size. Instead of rerendering the object for every frame, the system can scale the gsprite representing the object. This approach can be implemented by storing the scaling factor in the gsprite data structure as well.

Above we have described gsprite processing through an image processing system, and we have also described how a gsprite transform can be computed and applied in an image processing system. We now describe in more detail how to transform, composite and display pixel data.

In this embodiment, the DSP 176 sets up the gsprite data structures and stores them in shared memory 216 on the image processing board 174. The DSP 176 reads and writes to the gsprite engine registers through the tiler via a memory mapped interface. The registers in the gsprite engine include a pointer to the current display list. More detail regarding the gsprite engine 436 is provided above with reference to FIG. 12.

Figure 24:
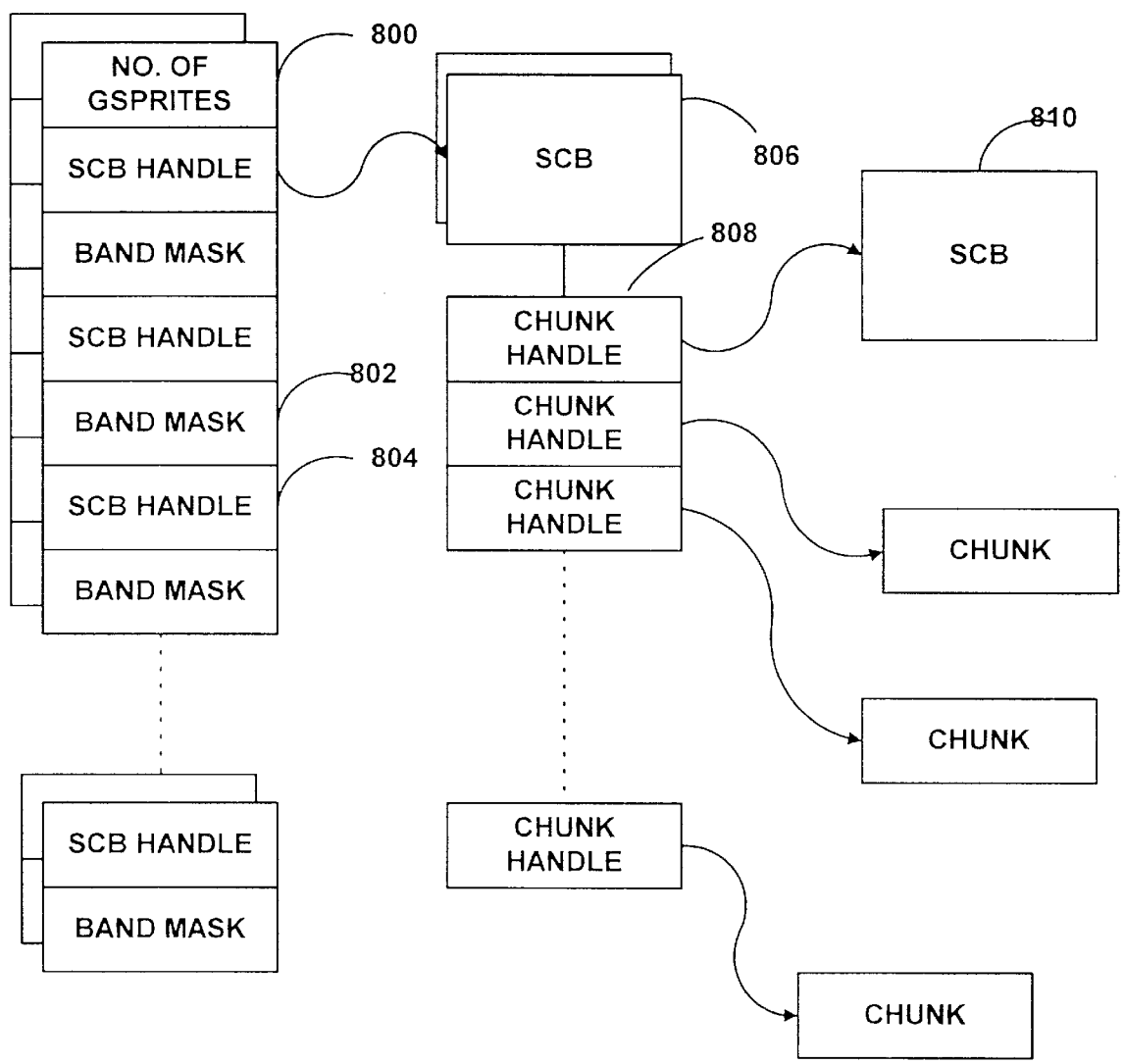
FIG. 24 is a block diagram of gsprite data structures in an embodiment.

The primary input to the gsprite engine 204 is the gsprite display list. FIG. 24 illustrates an example of the display list 800 and gsprite data structures. In this implementation, the display list 800 comprises an array of gsprite control block addresses called SCB (sprite control block) handles 804, each of which is followed by a band mask 802. The first word in the list 800 includes the number of gsprites in the list. A set bit in the band mask indicates that the gsprite is present in the band. While we provide a specific example here, the display list can be implemented in other ways. For example, the list can be comprised of separate lists for each band, where each band list enumerates gsprites that impinge upon that band. As noted above, the gsprites in the display list are sorted in depth order, and in this case, they are sorted in front to back order.

The gsprite control block (SCB) 806 includes information to scan the gsprite to output device coordinates. Rectangular gsprites map to a parallelogram in screen space under an affine transformation.

The edge equations of the gsprite have the form: $A_0x+B_0y+C_0=F_0$; $A_1x+B_1y+C_1=F_1$; $-A_0x-B_0y+C_2=F_2$; $-A_1x-B_1y+C_3=F_3$. The right hand side of these equations equals zero at the respective edges. The DSP 176 determines the value of the coefficients from the affine transformation for the gsprite. After the affine transformation, the shape of the gsprite is a parallelogram, and thus, only two sets of A and B coefficients need to be stored. The C terms are not needed at all, since the gsprite engine just needs the F values at a start point, and also needs a description of how the F values change with steps in screen space X and Y, which is given by the A and B coefficients. To support the mapping of stored gsprite data to output device coordinates, the sign of the coefficient is set such that when the coordinates of a point inside the parallelogram are evaluated in the edge equation, the result is a positive number.

Specifically, the SCB includes $A_0$, $B_0$; $A_1$, $B_1$; $F_0$, $F_1$, $F_2$, $F_3$; the left most point xs, ys; the rightmost point xf, yf; the slope of left most point to the top of the gsprite, and the slope of the left most point to the bottom; and the width and height of the parallelogram.

The start point for the scan is the leftmost point of the parallelogram, and the scan moves left-to-right column-by-column in screen space. In order to clip the gsprite to each 32-scanline screen band the SCB also includes the dx/dy slopes from the start (leftmost) point to the top and bottom points of the gsprite, so that the leftmost point on a particular screen band can be determined.

The edge equations of the parallelogram have been normalized on the DSP 176 such that F=0 at one edge of the parallelogram and F=the gsprite width or height at the opposite edge. Thus the F values for edges 0 and 1 of the parallelogram can be used directly to look up a particular gsprite image sample S, T at a particular screen location X, Y. Since the mapping from a screen X, Y to a gsprite S, T will rarely land directly on a gsprite image sample, the gsprite engine interpolates the nearest 4 (or 16) gsprite image samples to find the output sample.

The SCB 806 includes the size of the original gsprite (horizontal and vertical stride), and the size and location of the subgsprite to scan (width, height, start S and T). It can also include flags describing how the image chunks were compressed and what pixel format is used in the chunks.

In this chunking architecture, the gsprite is divided into 32×32 pixel chunks. It is not necessary to divide gsprites into chunks for rendering. However, a chunking architecture has a number of advantages as set forth above. To support the chunking architecture, the SCB includes a two-dimensional array of pointers (chunk handles), which represent the address in shared memory for the first word of the compressed chunk. Chunk memory is managed in blocks of memory called Memory Allocation Units GUs). MAUs include a pointer to the next MAU, and MAUs that are no longer required are added to a linked list of free memory so that they can be used for other chunks.

When objects allocated to a gsprite are divided into chunks, the gsprite data structure is updated to include a reference to the chunks that include image data for the gsprite.

Gsprite data can be instanced from another gsprite. In the example shown in FIG. 20, one gsprite instances image data from another. Here, the first chunk handle (808) for the SCB points to the SCB 810 of another gsprite. In an alternative implementation, chunk handles only point to locations in memory where chunks are stored.

Figure 25:
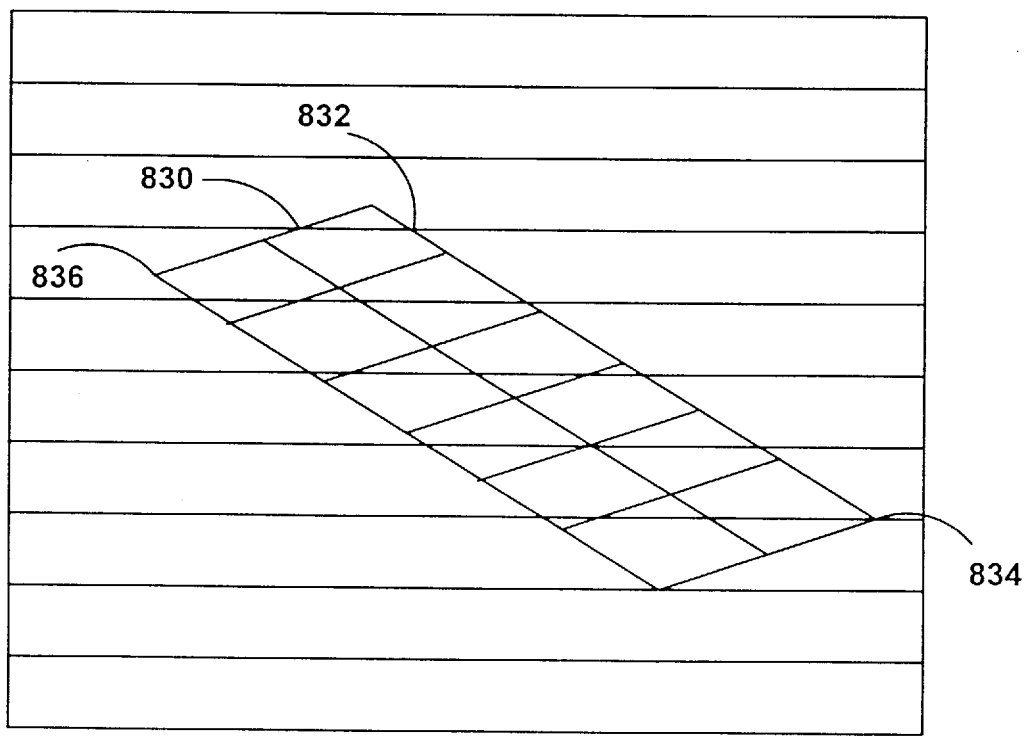
FIG. 25 is a diagram illustrating an example of a gsprite mapped to output device coordinates in an embodiment.

FIG. 25 is an example illustrating how a six chunk by two chunk gsprite might map onto horizontal bands on the display. FIG. 25 shows the start 836 and end 834 points used in scanning image data from gsprite space to physical output device space. We explain how gsprite image data is mapped to the output device space in more detail below.

After rendering and calculating affine transforms for gsprites in a frame, the image processor then performs display generation. As shown in FIG. 21B, the image processor transforms gsprites to physical output coordinates and composites the gsprites. After compositing pixel data, the image processor transfers it to the display.

In this embodiment, the gsprite engine reads in the display list and maps the gsprite image to output device coordinates. As the gsprite engine transforms the gsprite data, it sends pixel data to a compositing buffer for display. The compositing buffer is preferably double buffered so that composited pixel data can be transferred from one buffer while pixel data is being composited in the other buffer.

More specifically, the gsprite engine reads gsprite AYUV format image data out of shared memory, decompresses, transforms, and filters it, converts it to ARGB format, and sends it to compositing buffer at video rates (e.g. 75 Hz). The compositing buffer composites the decompressed ARGB pixels into a 1344×32 frame buffers for display.

Figure 26:
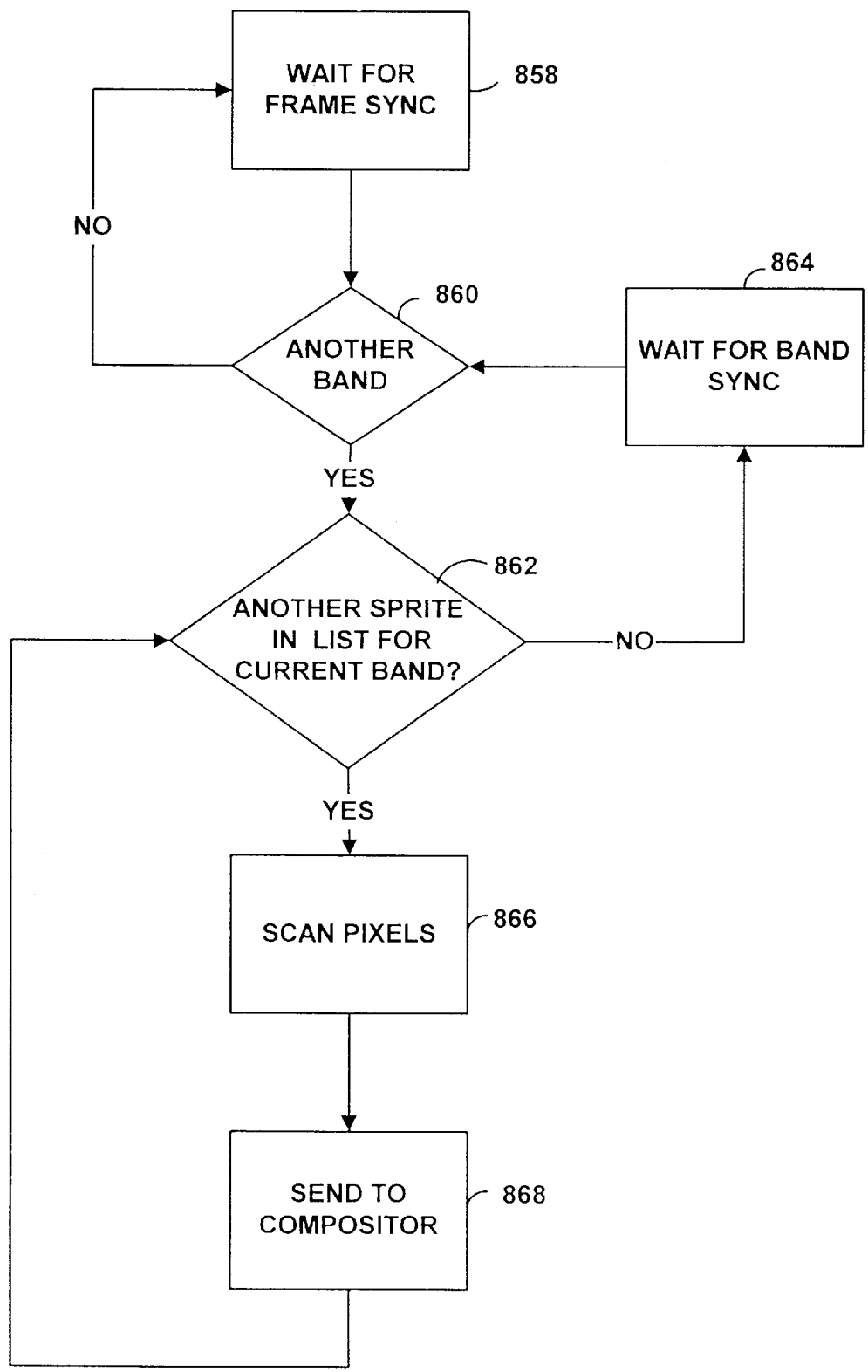
FIG. 26 is a flow diagram illustrating one aspect of display generation in an embodiment.

FIG. 26 is a flow diagram illustrating how the gsprite engine processes image data. Upon receipt of a frame sync signal (858), the gsprite engine loops through each band (860) for a frame and scans each gsprite in a band (862). After scanning the gsprites for a band, it then moves to the next band (860). The gsprite engine repeats the scanning process for each of the bands in the view space.

Since, in a real time application, the gsprite engine must complete the scan within a time dictated by the frame rate, it is possible that the gsprite engine will not be able to process every gsprite in every band. To help prevent this case, the gsprite engine reports back to the host each frame the free processing time for each band. Using this information, the image preprocessor can aggregate objects as necessary to prevent overloading of any particular band.

In scanning the pixels from gsprite space, the gsprite engine converts the pixel data to the output device coordinates (866). Any of a number of conventional scanning techniques can be used to scan the gsprite to output device coordinates. Either backward or forward mapping can be used. The gsprite engine uses a backward mapping approach in this embodiment.

Using the edge equation data in the SCB, the gsprite engine determines the location for starting the scan on each band by clipping the gsprite to the band. For example, FIG. 25 shows how the edges of the gsprite cross into the third band (830, 832). The intersection points are the start and stop points for the scan of the gsprite in this particular band. One approach to scanning is to scan in a zigzag pattern from the starting point. The starting point in a band can be found by taking the nearest pixel in output device coordinates to the intersection point. Once the starting point is computed, the gsprite engine steps up in increments until it steps outside the gsprite or out of the band. It then steps to the right one column and steps down until it either steps outside the gsprite or out of the band. At each step, it interpolates from pixel data in gsprite space to find a pixel value for a pixel location. As it computes this pixel value at each location, it sends the pixel data to the compositing buffers for compositing.

Figure 27:
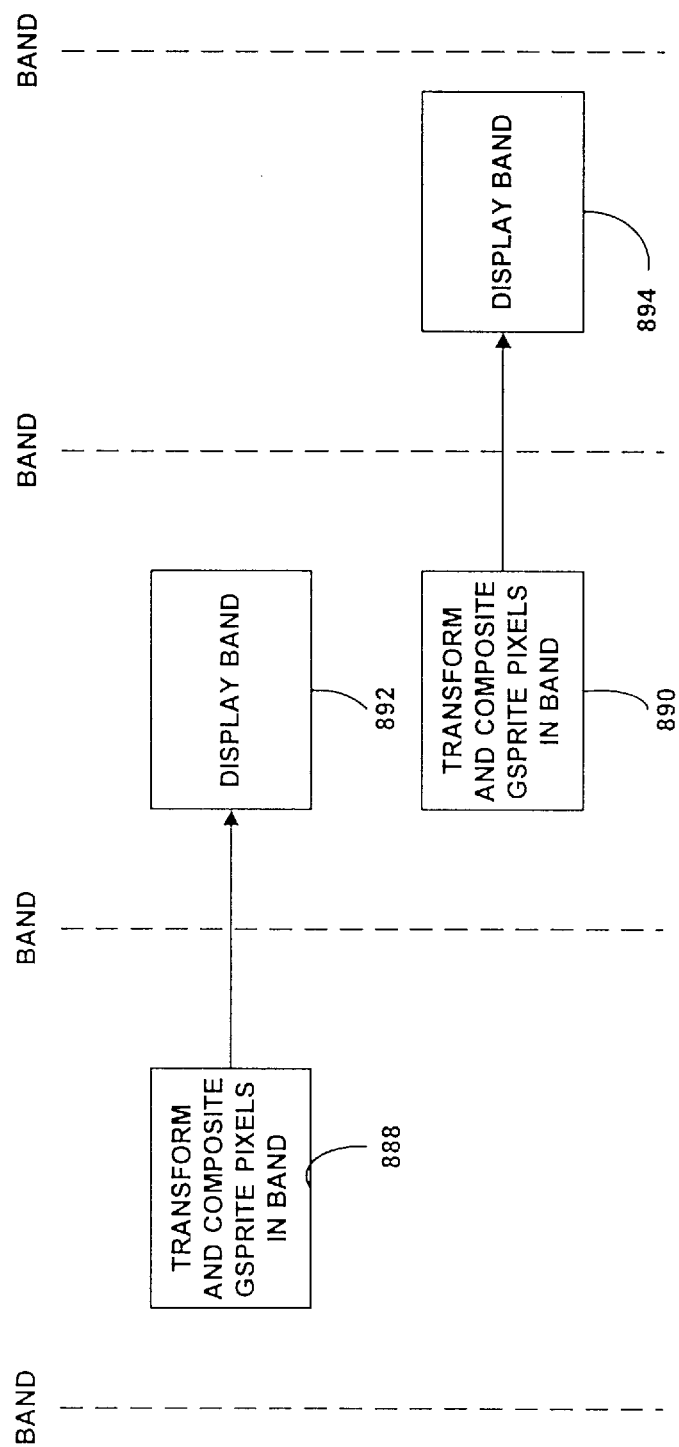
FIG. 27 is a flow diagram illustrating display generation of FIG. 26 in terms of band periods.

FIG. 27 is a block diagram illustrating how the gsprite engine and compositing buffers process bands of image data. In this diagram, the term "band" refers to the amount of time (band period) allotted to process a band of pixel data. This time can be derived, in part, from the frame rate and the number of bands in the display device. As shown in FIG. 27, the gsprite engine 204 fills the compositing buffers 210 for a band 888, and this composited image data is then scanned out to the display 892. Using double buffering, these steps can be overlapped for succeeding bands. While the gsprite engine 204 fills a compositing buffer for one band 890, the compositing buffer transfers composited image data for another band to the DAC 212, 892. In the next band period, the band that was just composited is then displayed 894. This process repeats for bands in the display. Because of this double-buffering, the process of transforming and compositing of pixels can occur simultaneously with the process of displaying a band.

Gsprites may be composited in real time to generate the image which is displayed on the output device. The gsprite pixel data generated from the gsprite addressing and imaging processing engine is passed to a compositing buffer. The compositing buffer has two 32 scanline buffers, one used for compositing into and one used for generating the video data for display. The two buffers ping-pong back and forth so that as one scanline region is being displayed, the next is being composited.

The gsprite engine passes the primary color data and alpha data to the compositing buffer for each pixel to be composited. A 32 scanline alpha buffer is associated with the scanline buffer that is being used for compositing. Since the gsprites are processed in front to back order, the alpha buffer can be used to accumulate opacity for each pixel, allowing proper anti-aliasing and transparency.

The scanline color buffer is initialized to 0.0 (all bits reset), while the alpha buffer is initialized to 1.0 (all bits set). For each pixel, the color that is loaded into the scanline buffer is calculating color(new)=color(dst)+color(src) *alpha(src) *alpha(dst). The alpha value that is stored in the alpha buffer is calculated by alpha(new)=alpha(dst) * (1 minus alpha (src)). Preferably, the color look up table (LUT) is 256×10 bits: the extra bits (10 vs. 8) can be used to provided more accurate gamma correction.

Tiling

As outlined above, the image processor (FIG. 1) performs scan-conversion, hidden surface removal, antialiasing, translucency computation, texturing, and shading. In this section we describe scan conversion, hidden surface removal, antialiasing and translucency computation in detail.

Figure 4B:
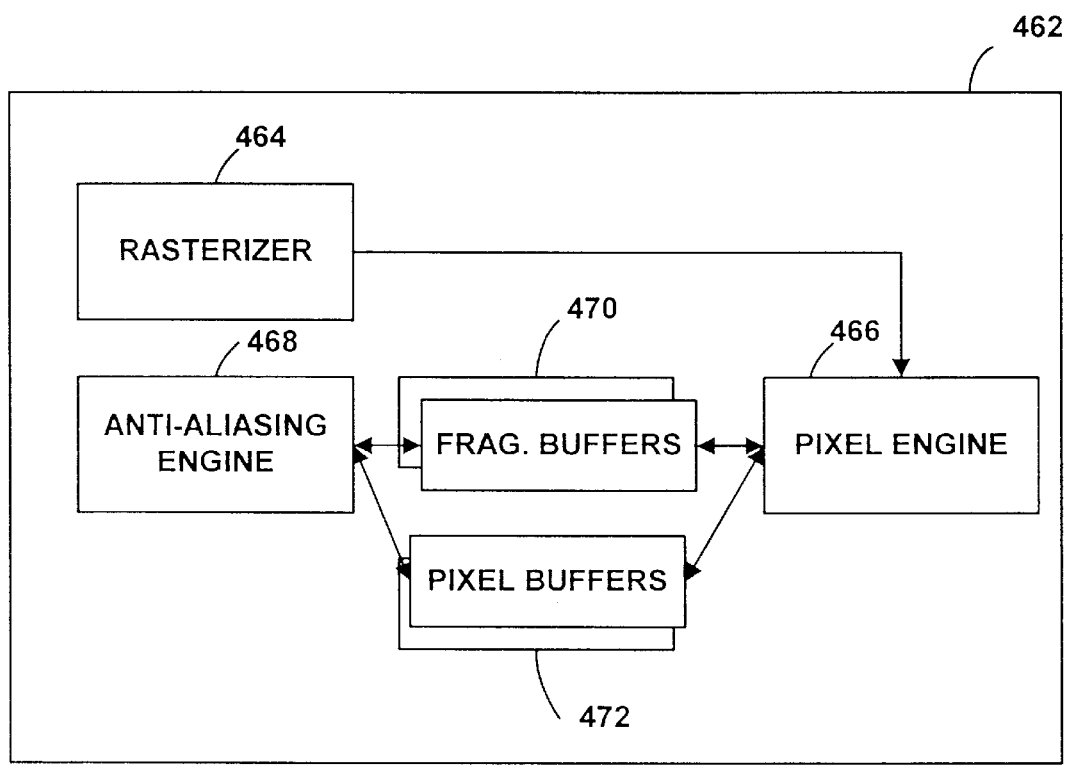
FIG. 4B is a block diagram illustrating portions of an image processor for rendering geometric primitives in an embodiment.

FIG. 4B is a block diagram illustrating portions of the image processor 462 for producing rendered image data from geometric primitives. The image processor includes a rasterizer 464, a pixel engine 466, an anti-aliasing engine 468, and a rasterization buffer, which includes pixel buffers 470, and a fragment buffer 472 in this embodiment. The "rasterizer" refers to the part of the image processor that determines pixel values from the geometric primitives, i.e. polygons. The rasterizer 464 reads primitive data and produces pixel data associated with a pixel location. This pixel data includes color, alpha, and depth (distance from the viewpoint). When a pixel is not entirely covered by a polygon, the rasterizer generates pixel fragment data.

As it scan converts a polygon, the rasterizer passes pixel data to the pixel engine for processing. The pixel engine 468 reads the pixel data from the rasterizer and determines which pixel data to store in the pixel and fragment buffers. The pixel buffers 472 are two-dimensional arrays, where the elements in the arrays correspond to pixel locations and include memory for storing color, alpha and depth data. The fragment buffer 470 stores fragment data to represent partial coverage of a pixel.

The pixel engine 466 performs hidden surface removal using depth values generated by the rasterizer and also maintains pixel fragments and translucent pixels for anti-aliasing and translucency processing. For a given pixel location, the pixel engine retains the nearest fully covered opaque pixel, if any. In this context, "fully covered" means that the pixel is entirely covered by a polygon that is being scan converted in the rasterizer. The pixel engine also retains pixels with translucency (alpha less than 1) and pixel fragments in front of the nearest opaque pixel. The pixel engine stores the nearest opaque pixel for a pixel location in the pixel buffer, and stores in the fragment buffer any fragments or translucent pixels at this pixel location that are in front of the nearest opaque pixel.

After the pixel engine generates pixel data, the anti-aliasing engine 468 resolves the pixel data in the pixel and fragment buffers. The design of the image processor illustrated in FIG. 4B supports double buffering of pixel data and single buffering of fragment data. The pixel engine generates pixel data in one of the pixel buffers, and adds fragment information into the fragment buffer while the anti-aliasing engine resolves the pixel data from the other pixel buffer and fragment data from the fragment buffer. As each fragment is resolved, the fragment entry is added to the fragment free list for use by new pixel data.

Having provided an overview of the process of generating and resolving pixel data, we now describe an embodiment in more detail. Below we describe an embodiment with reference to the tiler, shown generally in FIG. 4 and illustrated in more detail in FIGS. 9A–9C. We provide more detail regarding the tiler, including the components pertaining to scan conversion and antialiasing, as well as the components referring to textures. We will describe components used in multi-pass rendering, shading, and textures now, and will elaborate on these concepts later in our description.

The components of FIG. 4B can implemented on the tiler. The tiler reads primitive data and rendering instructions from the shared memory system 216 (FIG. 4A), produces rendered image data, and stores compressed image data in shared memory. As described above, the basic 3-D graphics primitives in the system are triangles. Triangle rendering provides numerous simplifications in hardware used for graphics generation since the triangle is always planar and convex. However, alternatively n-sided polygons can also be used.

Above we explained the components of the tiler 200. Here we describe the data flow through the tiler in more detail.

Since the tiler receives inputs from the DSP, we begin with a recap of functions of the DSP 176 (FIG. 4). As described above, the DSP 176 can perform front end geometry and lighting calculations required for 3-D graphics. The DSP 176 calculates model and viewing transformations, clipping, lighting, etc. Rendering commands are stored in main memory buffers and DMAed (Direct Memory Accessed) to the image processing board over a PCI bus. The rendering commands are then buffered in the shared memory 216 (FIG. 4A) until needed by the DSP. The rendering commands are read by the tiler 200 (FIG. 4A) when it is ready to perform image processing operations.

Figure 28A:
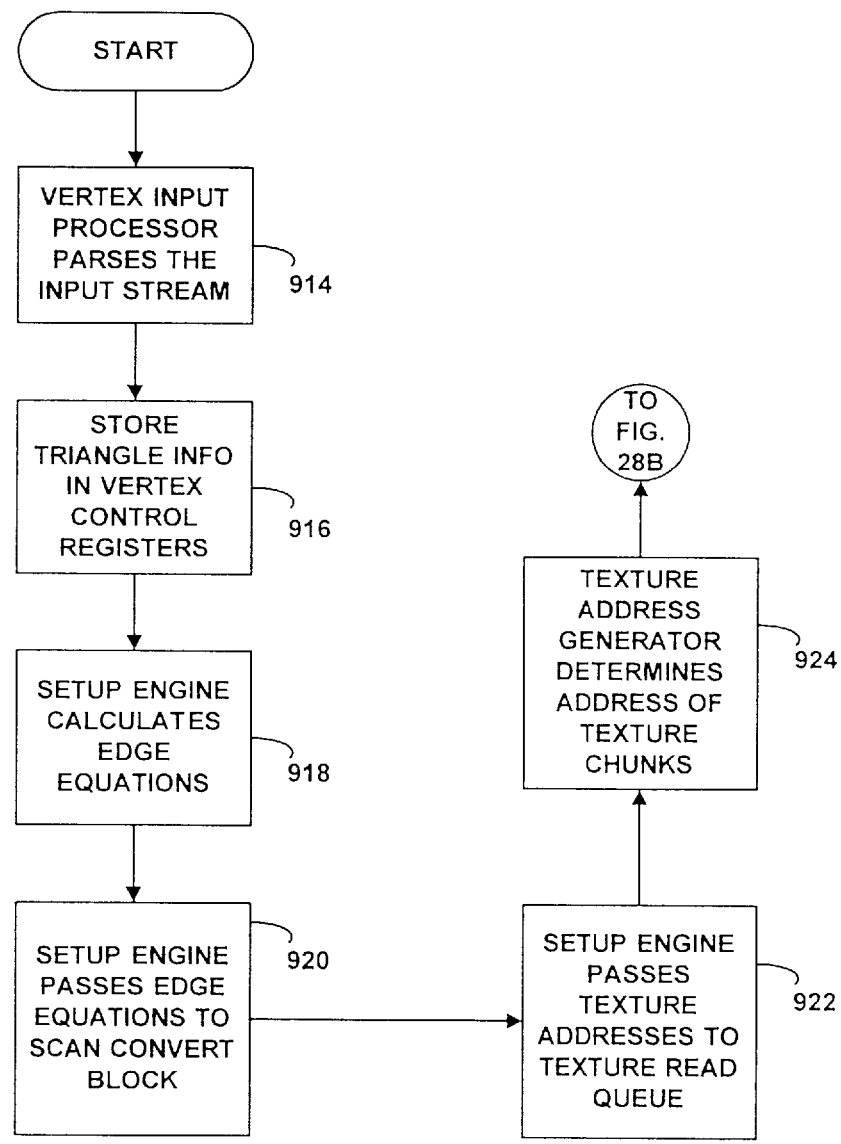
FIG. 28A–F are a flow diagrams illustrating aspects of pixel and fragment generation in three alternative embodiments.
Figure 28B:
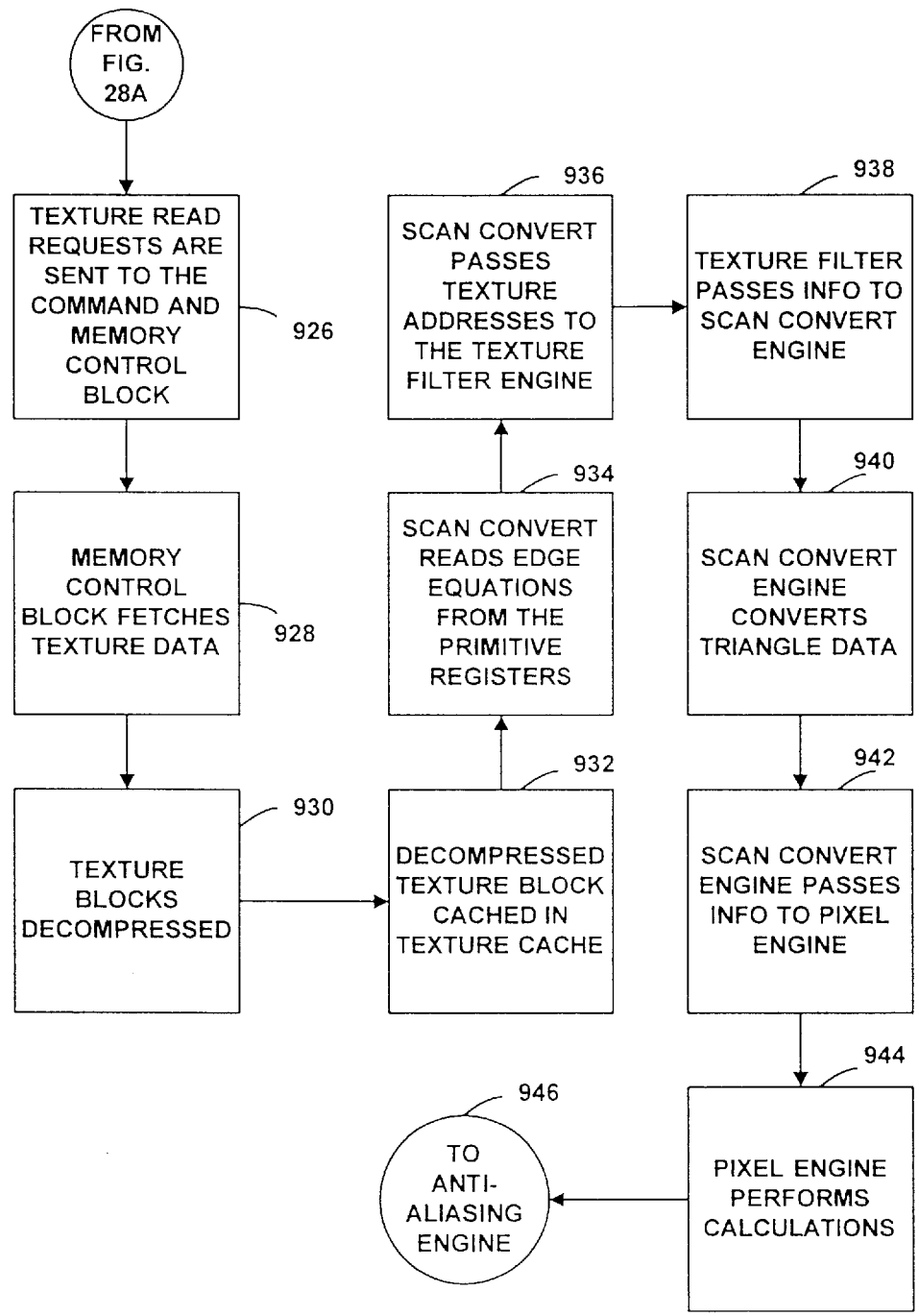

As is shown in the flowchart in FIGS. 28A and 28B, the setup block processes primitive rendering instructions read from the shared memory. The vertex input processor parses the input stream (914) (FIG. 28A), and stores the information necessary for primitive triangle processing in the vertex control registers (916).

The two vertex control registers store six vertices, three for each triangle in each register. The two vertex control registers allow for double buffering of triangle information to assure that the setup engine always has triangle information to process.

The setup engine then calculates the linear equations (918) which determine the edge, color, and texture coordinate interpolation across the surface of the triangle. These linear equations are used to determine which texture blocks will be required to render the triangle. The edge equations are also passed to the scan convert block (920) and are stored in the primitive registers within the scan convert block until required by the scan convert engine. The primitive registers are capable of storing multiple sets of edge equations.

The setup engine also passes texture addresses to the texture read queue (922), which buffers requests for texture chunks. The texture address generator then determines the address in memory of the requested texture chunks (924) and sends the texture read requests to the command and memory control block (926) (FIG. 28B), which will fetch the texture data (928) used by the scan convert block.

Texture data is stored in the shared memory (216) (FIG. 4A) in a compressed image format which may be the same format as the image data. The compression format is performed on individual 8×8 pixel blocks. The 8×8 blocks are grouped together in 32×32 blocks for memory management purposes to reduce memory management overhead.

As texture blocks are needed, they are fetched into the tiler, decompressed by the decompression engine (930), and cached in an on-chip texture cache (932). A total of 32 8×8 pixel blocks can be cached, although each block stores only one color component. The texture data is cached in an R G B and Alpha format.

The scan convert engine then reads the edge equations from the primitive registers (934) to scan convert the triangle edge information. The scan convert engine includes interpolators for walking the edges of the triangles, interpolating colors, depths, translucency, etc.

The scan convert engine passes texture addresses to the texture filter engine (936). The texture filter engine calculates texture data for the polygons that are being rendered. The texture filter engine computes a filter kernel based on the Z-slope and orientation of the triangle, and on the s and t coordinates. The texture cache attached to the texture filter engine store texture data for sixteen 8×8 pixel blocks. The texture cache is also in communication with the decompression engine which will decompress texture data (which is stored in a compressed format) for use by the texture filter engine.

When the texture filtering is completed, the texture filter engine passes the information back to the scan convert engine (938), so it can be used by the scan convert engine for further processing. Along with texture processing, the scan convert engine scan converts the triangle edge data (940) and the individual pixel addresses along with color and depth information are passed to the pixel engine for processing (942).

Figure 28C:
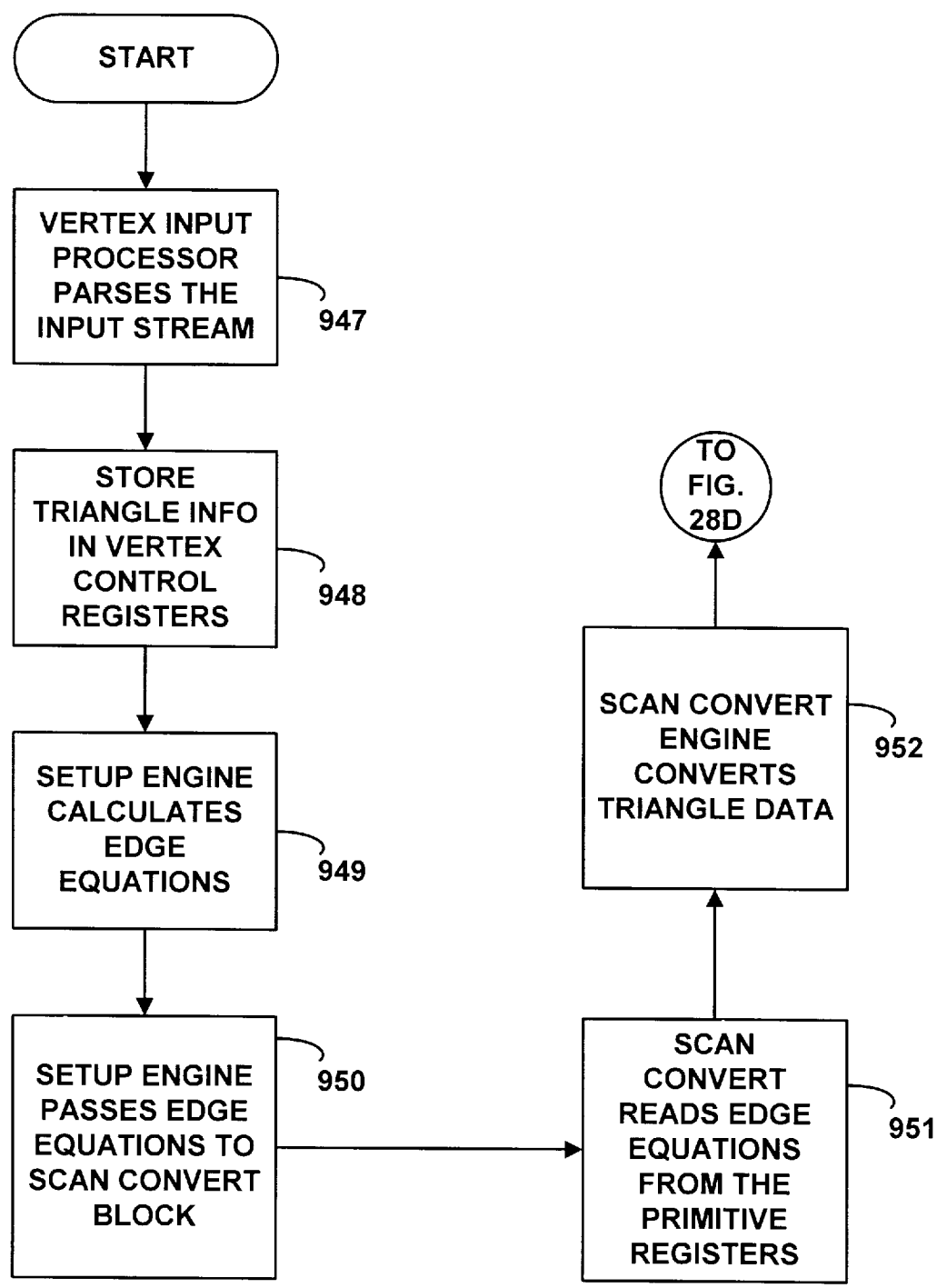
Figure 28D:
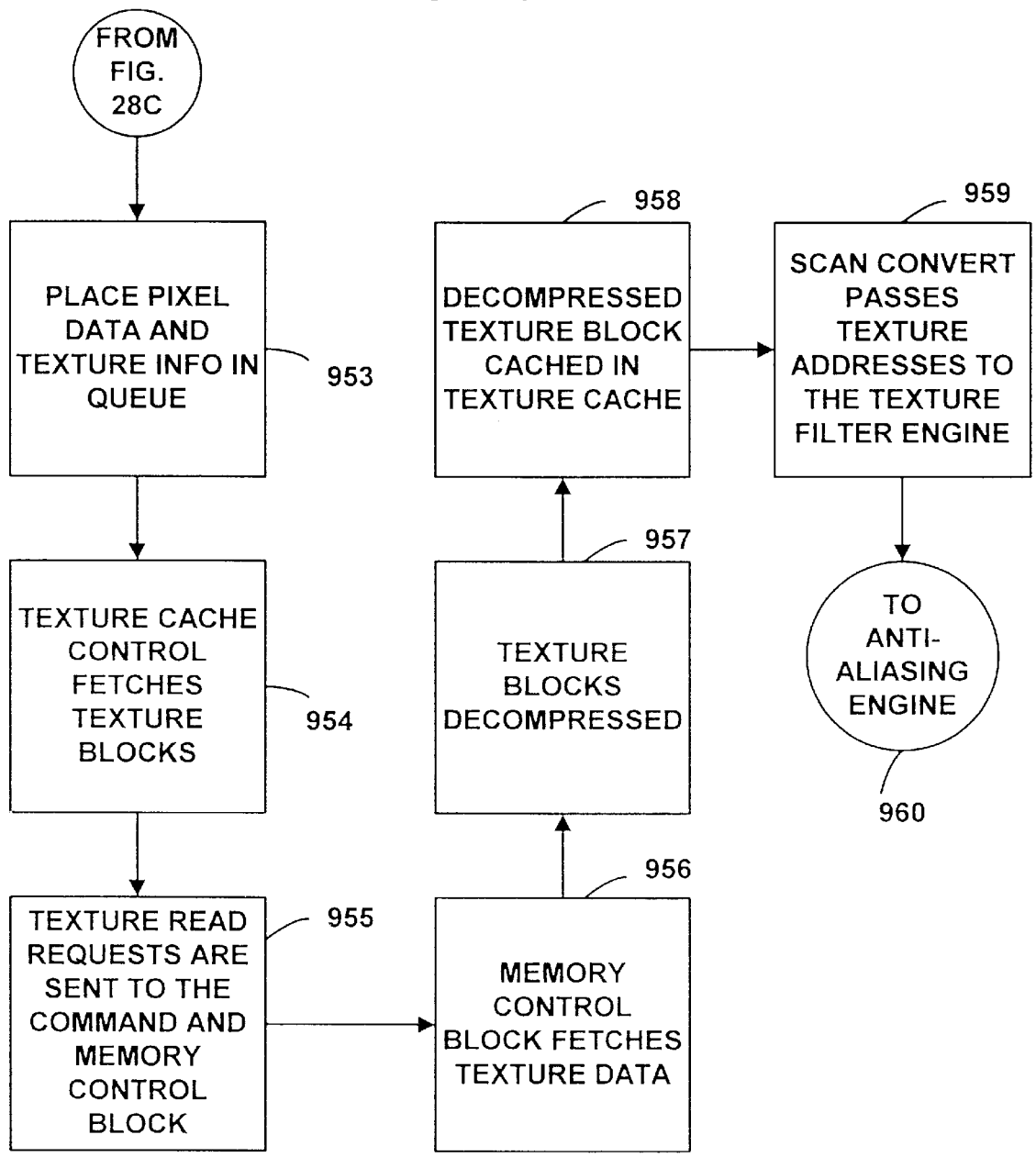
Figure 28E:
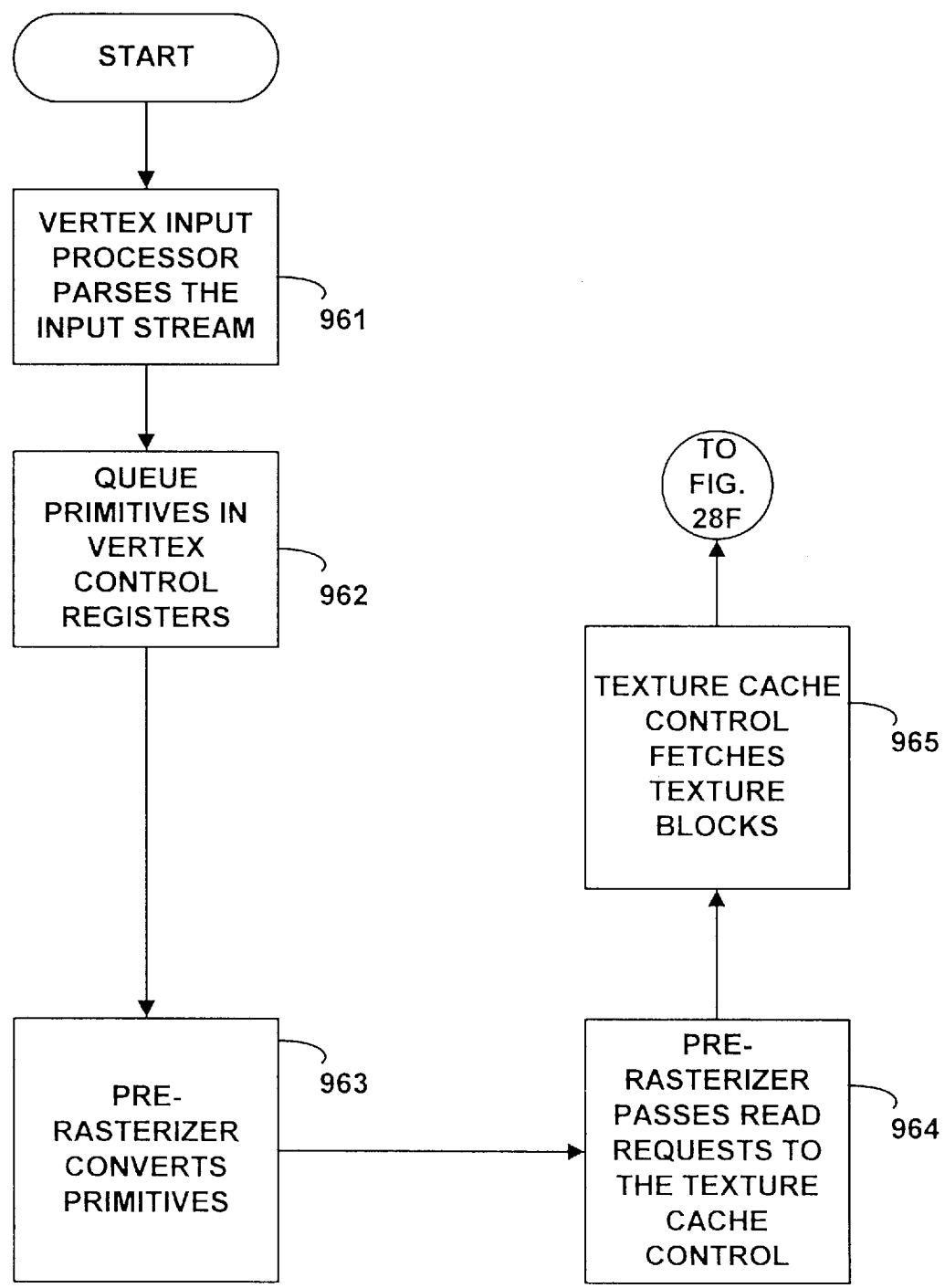
Figure 28F:
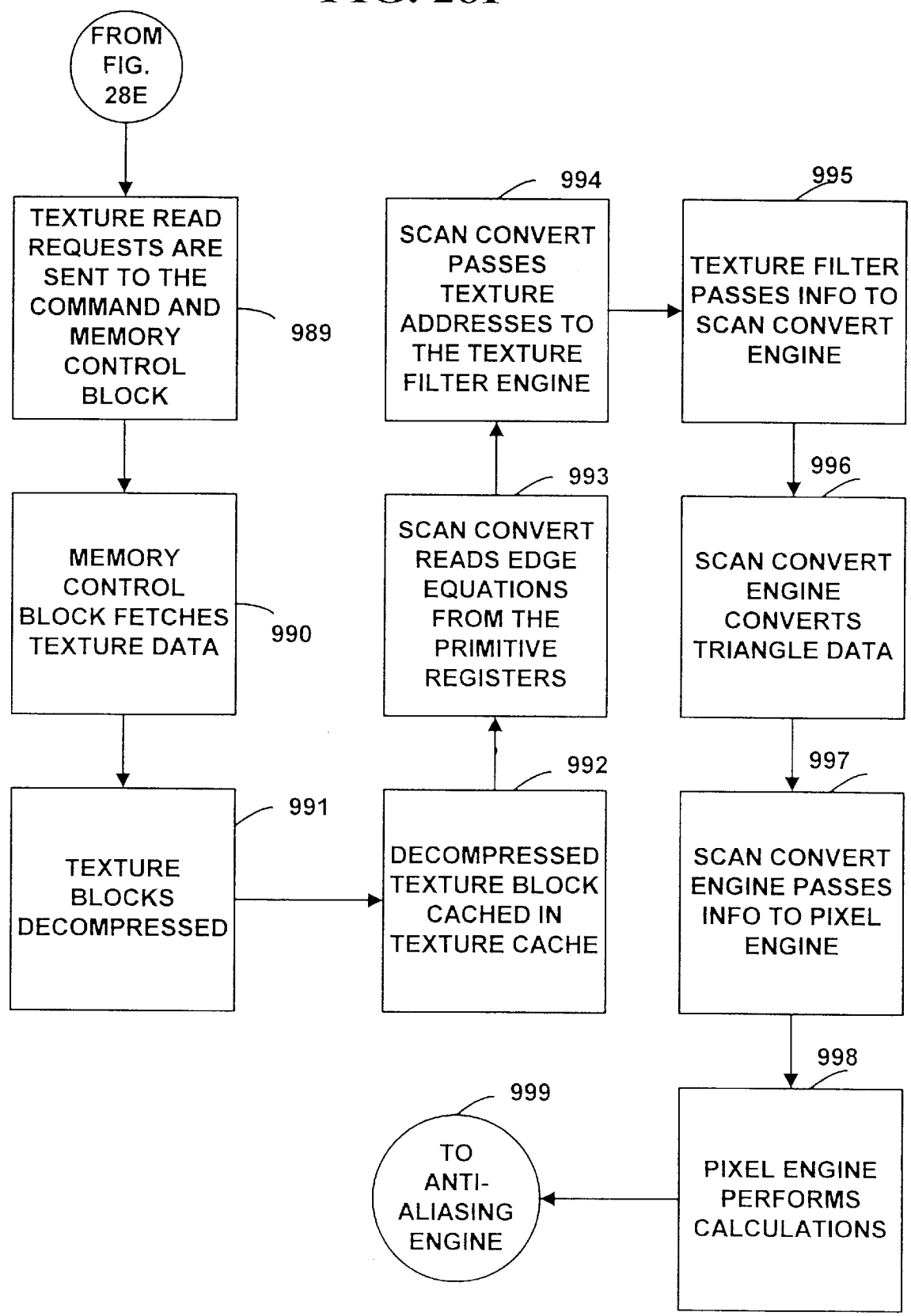

The method illustrated in FIGS. 28A and 28B varies for the alternative methods described in connection with FIGS. 10 and 11. FIGS. 28C and 28D illustrate a method for accessing image data corresponding to FIG. 10 and 9B. Similarly, FIGS. 28E and 28F illustrate a method for accessing image data corresponding to FIG. 11 and 9C.

Referring first to FIGS. 28C and 28D, this implementation of the method begins in the set-up block 381 in FIG. 9B. The vertex input processor 384 processes the input data stream (947). Next, the vertex control registers 386 buffer triangle data from the input data stream (948). The set-up engine 388 then calculates the edge equations (949) and passes them to the scan convert block 395 (950).

The scan convert block 395 reads edge equations stored in the primitive registers (951) and scan converts triangle data (952). The scan convert engine 398 then writes pixel data including the pixel address, color and alpha data, and coverage data to an entry in the texture reference data queue 399 (953) (FIG. 28D). In the case of texture mapping operations, this entry also includes texture reference data, namely, the coordinates of the texture centerpoint. The entry may also include texture filter data such as level detail or anisotropic filter control data.

From the texture reference data, the texture cache control 391 determines which texture blocks to fetch and causes the appropriate texture block or blocks to be fetched from memory (954).

The texture address cache control 391 sends texture read requests to the command and memory control block 380 (955). The texture read queue 393 buffers read requests for texture blocks to the shared memory system. The memory control 380 fetches the texture data from shared memory, and if it is compressed, places the compressed block or blocks in the compressed cache 416 (956). The decompression engine 404 decompresses compressed image data and places it in the texture cache 402 (957, 958). As described above in connection with FIG. 10, the replacement of blocks in the texture cache proceeds according to a cache replacement algorithm.

To carry out texture mapping or other pixel operations requiring image data in the texture cache, the texture filter engine 401 reads texture addresses from the texture reference data queue 399 (959). The texture filter engine 401 accesses the image data in the texture cache 402, computes the contribution from texture, and combines this contribution with the color and possibly alpha data from the texture reference data queue 399.

The texture filter engine 401 passes pixel data to the pixel engine 406, which then performs hidden surface removal and controls storage of the pixel data to a rasterization buffer.

FIGS. 28E and 28F illustrate a method for accessing image data blocks from memory corresponding to the approach in FIG. 11. In this alternative implementation, the method begins by queuing primitives in the set-up block 383. The vertex input processor 384 parses the input data stream and queues triangle data in the vertex control registers 387 (961, 962). When image data blocks need to be accessed from memory, as in the case of a texture mapping operation, the pre-rasterizer 389 scan converts primitives queued in the vertex control registers 386 to generate read requests for texture data blocks in shared memory (963).

As the pre-rasterizer scans a primitive queued in the set-up block, it passes texture read requests to the texture cache control 391 (964). The texture cache control 391 determines the appropriate texture blocks (965) and transfers read requests to the command and memory control block 380 (989) (FIG. 28F) via the texture read queue 393. The memory control block fetches the requested texture data, and if it is compressed, stores it in the compressed cache 416 (990). The decompression engine decompresses texture blocks in the compressed cache 416 and writes the decompressed image data to the texture cache 402 (991, 992). The texture cache control manages the flow of texture blocks from the compressed cache 416, through the decompression engine 404, and into the texture cache 402

The scan convert block 397 reads the geometric primitives queued in the set-up block. The scan convert block 397 performs pixel generation operations as soon as requested texture data is available in the texture cache 402. In the process of performing these pixel operations, the scan convert engine 398 reads edge equations from the primitive registers (993) and passes texture addresses to the texture filter engine 403 (994). The texture filter engine accesses the appropriate image data stored in the texture cache 402 and then returns filtered data to the scan convert block 397 (995). The scan convert block 397 converts the triangle data and computes output pixel data from converted triangle data and the filtered data (996). It then passes this output pixel data to the pixel engine 406.

The pixel engine 406 performs pixel level calculations including hidden surface removal and blending operations. To perform hidden surface removal, the pixel engine 406 compares depth values for incoming pixels (fully covered pixels or pixel fragments) with pixels at corresponding locations in the pixel or fragment buffers. For shadowing operations, the pixel engine provides a Z-value to the texture filter engine 400 where it is compared with Z-values in a shadow Z map (stored in the texture cache). After performing the pixel level calculations, the pixel engine stores the appropriate data in the pixel or fragment buffers.

The tiler implements a high quality anti-aliasing algorithm for dealing with non-opaque pixels. The pixel buffer stores the pixel data for the front-most non-transparent pixel for pixel locations in a chunk. The fragment buffer stores pixel fragments for translucent pixels and for partially covered pixels closer to the viewpoint than the pixels in the pixel buffer for corresponding pixel locations. More than one fragment for a pixel location can be stored using a fragment list structure. In a process referred to as resolving, the anti-aliasing engine processes the fragment lists to compute color and alpha values for pixel locations.

To reduce the number of fragments that are generated, the pixel engine implements a method for merging pixel fragments which compares the fragment that is being generated with fragment(s) currently stored in the fragment buffer. If the new and previous fragment's attributes (color and depth) are similar to within a preset tolerance, the fragments are combined on the fly and no additional fragment is generated.

If a combined fragment is found to be fully covered (with a full coverage mask and opaque alpha), then the fragment is written into the color buffer and that fragment location is freed up to use for subsequent polygons within the current chunk.

Once all the polygons for the chunk are rendered, the pixel buffers are swapped. While the anti-aliasing engine resolves the pixel data in the fragment buffer and one of the pixel buffers, the pixel engine writes pixel data for the next chunk in the other pixel buffer and the remaining free locations in the fragment buffer. In general, pixel resolution comprises computing a single color (and possibly alpha) value for a pixel location based on the pixel data in the pixel and fragment buffers corresponding to the location. We provide additional detail addressing these issues below.

In the implementations of the tiler shown in FIGS. 9A–9C the pixel engine and anti-aliasing engine have access to a single fragment buffer and a pair of pixel buffers. The two 32×32 pixel buffers are provided for double buffering between the pixel engine and the anti-aliasing engine. The pixel buffer entry includes the following data:

| R | G | B | α | Z | P |
|---|---|---|---|---|---| where R, G, B are the red, green, and blue color components respectively, α is the alpha component which represents the translucency of the pixel, and Z is the Z component which represents the depth of the pixel from the eye point. The x,y address is fixed and implicit in the pixel buffer addressing. Eight bits are used per color component (i.e. Red, Green, and Blue), eight bits are used for the α component, and twenty-six bits are used to store the Z-value, stencil value, and a priority value. Out of this 26 bits, up to 24 can be used as Z values, up to 3 can be used as stencil planes and up to three can be used as priority values. As described above with reference to FIG. 9, the buffer also includes a 9 bit fragment buffer pointer.

The priority value is fixed per primitive and is used to help resolve objects which are coplanar, such as roads on top of terrain, by using priority relationships which are used by the tiling engine to margin the incoming pixel Z-value, as compared to the stored Z-value, during the Z compare operation.

The fragment buffer is used to store information about pixel fragments for polygons whose edges cross a given pixel or for polygons with translucency. Each entry in the fragment buffer provides color, α, Z and coverage data associated with the surface.

Multiple fragment buffer entries can be associated with a single pixel (via a linked list mechanism) for cases in which multiple polygons have partial coverage for the same pixel location.. The fragment buffer is dual ported so that it can be operated on by the anti-aliasing engine and the pixel engine in parallel. In one possible implementation the fragment buffer is a one-dimensional array of fragment records and includes a total of 512 fragment record entries. The memory management of the fragment buffer is performed using a linked list structure. Each fragment buffer entry includes the following data:

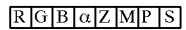

where R, G, B are the red, green, and blue color components respectively, α is the alpha value which represents the translucency of the pixel, and Z is the Z-value which represents the depth of the pixel from the eye point, M is a 4×4 pixel coverage bitmask for each pixel which is partially covered, P is a pointer to the next fragment buffer entry, and S is used to represent a fragment stencil. Eight bits are used per color component (i.e. Red, Green, and Blue), eight bits are used for the α component, twenty-six bits are used to store the Z-value plus stencil and priority, and nine bits are used for the fragment pointer P.

The pixel coverage mask is computed by determining a coverage mask value for each edge and bitwise ANDing them together. The computation of the coverage mask is a two step process. The first step is to determine how many of the subpixel bits in the coverage mask are to be turned on, and the second step is to determine which specific bits are to be enabled.

The first step uses the area of the pixel which is covered by the edge to determine how many of the coverage mask bits are to be switched on. This area is computed by a table lookup indexed by the edge slope and distance from the pixel center. The second step uses the edge slope to determine the order in which the sample bits are to be switched on. The set of bit orders is stored in a pre-computed tabled called the 'Coverage Order' table. Each coverage order table entry consists of a specific ordering of the sample bits which is correct for a range of slope values. The edge slope is tested against the set of slope ranges, and the index associated with the range containing this slope value is used as the index into the coverage order table.

A method for computing the coverage mask is described in Schilling, A. "A New Simple and Efficient Anti-Aliasing with Subpixel Masks", Computer Graphics, Vol. 25, No. 4, July 1991, pp. 133–141.

After the image processor generates fragment data for a pixel location, it then sorts and resolves this fragment data to compute color at that location. As described above, the image processor generates and maintain fragments for partially covered pixels. A pixel is partially covered by a polygon if one or more of the polygon's edges cross the pixel, or if the polygon has translucency. Maintaining fragment data to perform both antialiasing and translucency computations can require a significant amount of memory. As the number of rendered polygons increases, the amount of memory to store pixel data and fragments also increases.

In addition to the increased memory requirements, the amount of processing required to resolve fragments can be significant as well. In a Z-buffer approach, fragment data is depth sorted. In general, the primitive data is not sorted in depth order as it arrives for rendering. Since primitive data arrives in arbitrary depth order, the image processor has to sort the fragment data after generating it. The sorted data is then processed to determine the color and possibly the alpha at a pixel location. At each pixel location, several fragments can contribute to the color. If alpha is also computed the number of fragments and the complexity of processing increases as well.

For the reasons highlighted above, the memory and processing requirements to support advanced antialiasing and translucency can be substantial. There is a conflict between supporting sophisticated antialiasing and translucency computations, on one hand, and reducing memory requirements on the other. To reduce the cost of the system, the use of memory should be minimized, yet advanced antialiasing and translucency features usually require more memory. It is even more difficult to support these advanced features in a real time system while still minimizing memory requirements.

In one embodiment, our system renders primitives one chunk at a time, which reduces memory and allows for fragment resolution in a post processing step. While pixel data is generated for one chunk, pixel data of another chunk can be resolved. A number of benefits impacting fragment sorting and pixel resolution follow from the chunking concept. Memory requirements are significantly reduced because much of the data generated during the rasterizing process does not have to be retained after the image processor has resolved the pixels in a chunk. The image processor only needs to retain the resolved color portion after resolving a chunk.

Another advantage to rendering chunks is that the pixel and fragment memory can be implemented to reduce the overhead of memory accesses. Typical graphics systems use external memories to implement color, depth and fragment buffers. It is very difficult to organize this external memory to satisfy the rigorous bandwidth requirements of real time image processing. The pixel and fragment memory needed to support rendering of a chunk, such as a 32×32 pixel region, does not have to be located in external memory. Instead, it can be implemented on the same hardware that performs rasterizing and antialiasing functions. For example, in the implementation described above, the fragment and pixel buffers can be implemented on a single chip.

The use of on-chip memories simplifies the bandwidth problems associated with external memory. On-chip memories enable efficient use of multiple memory banks. For example, one bank can be used for the pixel buffer, and another bank can be used for fragment records.

Another advantage of on-chip memory is that it is less expensive and easier to implement multi-port memories.

The performance of the pixel and fragment buffers can be enhanced through the use of multi-port memories, which allow simultaneous reads and/or writes to achieve one clock per pixel processing rate. Since the fragment buffer is much smaller when chunks are rendered separately, it can be implemented on chip. Both the smaller size of the memory and its presence on-chip make it feasible and cost effective to use multi-port memory. External multi-port memories on the other hand, are expensive due to the higher per bit cost and connections between chips.

Another important advantage related to chunking is that pixels for one portion of a frame can be generated while pixels for another portion are resolved. Thus, instead of generating pixels for an entire frame and then resolving those pixels, our approach can overlap the processes of generating and resolving pixels, reducing system transport delay.

In one embodiment of our system, the image processor resolves fragments in a post processing step. While the pixel engine generates pixel data for part of an image, the anti-aliasing engine resolves fragments for another part of an image. As noted above, the pixel data is double buffered: the pixel engine can access one buffer while the anti-aliasing engine accesses the other. After the pixel engine has generated pixels for a chunk, the tiler performs a buffer swap. The pixel engine then generates pixels for the next chunk, and the anti-aliasing engine resolves the pixels for the previous chunk.

Although it could also be double buffered, in the preferred embodiment, the fragment buffer is dual ported so that the pixel engine and anti-aliasing engine can access it simultaneously. The pixel engine can then write fragment data to the fragment buffer through one port while the anti-aliasing engine accesses fragment data through another port.

In this embodiment, the double buffered and dual-ported memory systems enable the image processor to overlap pixel data generation and pixel resolution. There are a number of alternative ways to implement a double buffering scheme as well.

The image processor sorts the fragment data in depth order before completing the resolve process. In general, the image processor can sort pixel data as it generates pixels, and after it has generated pixels for a portion of an image to be rendered. For instance, the pixel engine can perform an insertion sort as it writes fragment data to the fragment buffer. In addition, the pixel engine can sort fragment data after it has completed generating pixel data for all or part of an image. The pixel engine can also sort fragments in cases where it rejects incoming pixel data. Since the pixel engine does not have to write to the fragment buffer when the incoming pixel data is rejected, it can then perform a sort of fragments before the next incoming pixel arrives. We refer to this latter approach as "background sorting" of fragments.

An insertion sort refers to depth sorting an incoming fragment with other fragments in the fragment buffer. In a real time system, an insertion sort may not be preferred because it can potentially slow down the process of generating pixel data. Searching the fragment buffer to find the proper insertion point for an incoming fragment can cause undesirable overhead. Additionally, in hardware implementations, it requires additional hardware and complicates the design of the pixel engine.

As an alternative to an insertion sort, fragments can be sorted after the image processor has completed pixel generation for a portion of an image. Some systems render an entire frame of image data at once. In such systems, sorting fragments for every pixel location in the view space can require substantial processing time and add undesirable delay, especially for a real time system. The amount of time required to perform the sorting can vary depending on the number of fragments per pixel, and depending on the degree to which insertion sorting is already performed. The sorting operation, therefore, can hold up other pixel operations from occurring, thereby decreasing performance.

By rendering a portion of the view space at a time, the fragment sorting for one part of an image can occur while a next portion is being rasterized. In essence, the anti-aliasing engine can perform fragment sorting in a post-processing step. In one embodiment, the anti-aliasing engine sorts fragments for one chunk as fragments for the next chunk are being generated.

Even in cases where pixel generation and resolution are overlapped in this manner, it still may be advantageous to perform some sorting of fragments for part of an image as the pixel engine generates pixels for that part of the image. Background sorting of pixel fragments reduces the overhead of sorting fragments after the pixel engine completes generating pixels for a set of primitives.

In one embodiment, background sorting is performed concurrently with pixel operations being performed on the pixels to reduce, and in some cases eliminate the latency required for sorting of fragments. The design takes advantage of the fact that many of the pixels are not partially covered, and therefore do not make use of the fragment buffer. The background sorting uses this spare bandwidth to perform a sort of a set of fragments in the fragment buffer.

Figure 29:
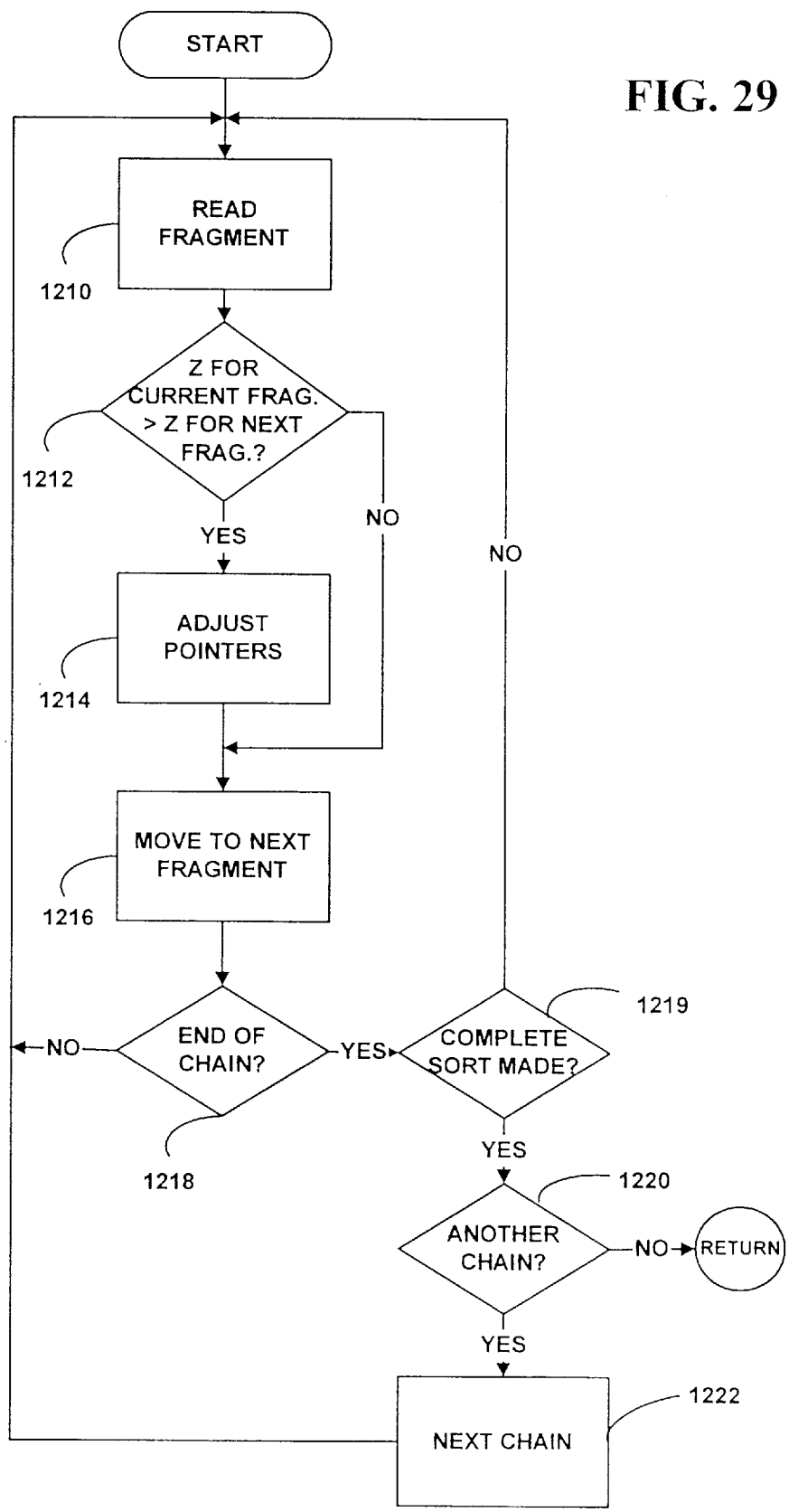
FIG. 29 is a flow diagram illustrating background sorting of fragments in an embodiment.

One way to implement background sorting is to perform a bubble sort. The pixel engine performs a bubble sort of the fragments, by walking each chain of fragments (1210) and comparing the Z-values between two adjacent fragments. FIG. 29 is a flow diagram illustrating this approach.

If the current fragment has a larger Z (is further away) than the next fragment it points to in the fragment chain (1212), the two are swapped in order by readjusting their pointers (1214) accordingly. If the Z-values are already in sorted order, the sort logic continues marching down the chain comparing the previous next fragment with the new next fragment (1216). The sort logic continues walking the chain (1218) until it reaches the end of the current chain. If the sort logic has completely sorted the chain (1219), then the logic moves to the next chain. If not, the logic makes another pass through the chain. The sort logic continues passing through the chain until all of the fragments are in order for the current chain. The sort logic then moves to a next chain, if another exists and needs sorting (1220, 1222).

If a new fragment should come in that has the same address as one of the ones currently being sorted, the pipeline is stalled until the two fragments have been written. This is a rare case, and therefore is unlikely to hinder performance in a system employing background sorting.

An optimization can be employed whereby an extra n x 1 bit RAM is used, where n is the total number of fragments allowed per chunked region. Whenever a new fragment is added to a fragment chain, the extra bit is set for the index to the first (foremost) fragment in the chain. This bit indicates a potentially unsorted fragment. When the fragment sort hardware gets ready to move to a new fragment chain, it clears the bit for that chain and proceeds to sort it. If in the meantime, a new fragment comes in that chain, then there is a chance that the fragment is unsorted again. Since the new fragment resets the new fragment bit, it means the sort operation will have to be performed again on the fragment chain. However, using this bit to tag the fragment chain that has received a new fragment eliminates the problem inherent in sorting a buffer that is being changed without the knowledge of the sort logic. The extra bit also prevents the background sort from spending time attempting to sort buffers that have already been sorted, are not the first in a chain, or which have not been allocated yet.

If there are less total fragments available than pixels, it maybe less costly in gates to use an individual RAM since there are fewer bits, and the sort is done based on the total number of fragments, not the total number of pixels.

A hardware implementation of the sort logic includes comparators for comparing Z information, data routing multiplexers for routing the pointers (used for swapping pointers in the sort process), a 1 bit x n RAM, and the logic for setting/clearing the bit in the RAM based on the offset. It also includes a state machine that controls the compare, routing, and fragment visited, as well as the sort process. This state machine is responsible for shutting down the incoming pipeline if the new fragment needs the same fragment as is currently being sorted. The fragment buffer and fragment index RAM should be multi-ported so the sort logic can read or write independent of pixel generation operations performed in the pixel engine. Alternatively, the fragment buffer is double buffered.

This implementation can be extended to alternative approaches using fewer ports on the RAM. This approach may require greater control for identifying when an incoming pixel is not a fragment so the same ports can be shared between incoming pixels and the sort logic.

After sorting, the image processor resolves the fragments for a pixel location to determine the color for that pixel location. If alpha is not considered, the image processor computes color accumulation based on the color and coverage data for fragments in a depth sorted list for a pixel location. If alpha is considered in addition to coverage data, the image processor computes color accumulation based on color, coverage, and alpha of the fragments in a depth sorted list for a pixel location.

In general, the image processor can resolve fragments for pixel locations corresponding to the entire view space or for only part of the view space at a time. In the embodiment described above, the image processor resolves pixel locations in a portion of the view space called a chunk. Fragment resolution occurs after fragments have been generated and sorted.

Fragment resolution is the process during which all of the fragments for a pixel are combined to compute a single color and alpha value. This single color and alpha are written into the color buffer (and then compressed and stored to a gsprite).

Computing the resolved color includes accumulating a correctly scaled color contribution from each layer while computing and maintaining coverage information with which to scale subsequent layers. This accumulation can be performed in front-to-back, or in back-to-front depth order. In a front-to-back approach, as opposed to back-to-front, spatial coverage data can be used to determine coverage for succeeding layers. Unlike coverage, alpha data applies equally to the entire pixel area.

For front to back, the equations for computing color and alpha for sorted fragment records are:

Alpha initialized to maximum value (inverse alpha). Color initialized to 0.

Anew=Aold−(Aold * Ain);

Cnew=Cold+(Cin * (Aold * Ain));

For back to front, the equations for computing color and alpha for sorted fragment records are:

Alpha and Color initialized to 0.

Anew=Ain+((I−Ain) * Aold);

Cnew=(Cin * Ain)+((1−Ain) * Cold);

For a hardware implementation, front to back is preferable because the resolve process is less hardware intensive.

A pseudocode example of accumulating fragments with depth, color, and coverage only (no alpha), is set-forth below:

```
NUM_CVG_BITS is the number of bits in the coverage mask
MAX_ALPHA is the maximum alpha value
for (each fragmented pixel location) {
    ColorAccum = 0;
    CoverageAccum = 0;
    while (fragment list is not empty) {
        scan fragment list and extract closest fragment (coverage, color);
        ColorScale = CountSetBits(coverage &
~(CoverageAccum))/NUM_CVG_BITS;
        ColorAccum += ColorScale * color;
        CoverageAccum |= coverage
    }
    ColorAccum is pixel color
}
```

Accumulating fragments with depth, color, coverage, and alpha requires that an alpha value be computed and maintained for each subsample. This is due to the combination of coverage masks and alpha values for each fragment. It is generally the case that the accumulated alpha at any layer during accumulation is a function of all of the alpha values of previous layers. With coverage masks, each subsample can potentially have a different set of 'previous' alpha values, since a layer for which the coverage bit is clear does not contribute to that subsample.

One approach to resolving fragments with both alpha and coverage is to compute color for each subpixel in a layer separately, and then add the contribution from each subpixel location to determine the total color contribution. The alpha scale for each subpixel is determined from the alpha at that layer in addition to the alpha accumulated from other layers. This alpha scale is then multiplied by the color for the subpixel to determine the color contribution of the subpixel. The color for a layer is then determined by summing the color contributions from the subpixels.

One example of accumulating color and alpha for subpixels separately is:

```
for (each fragmented pixel location) {
    ColorAccum = 0;
    AlphaAccum[NUM_CVG_BITS] =
{ MAX_ALPHA, MAX_ALPHA, . . . ,
MAX_ALPHA };
    while (fragment list is not empty) {
        scan fragment list and extract closest fragment
(coverage, color, alpha);
        for (i=0; i<NUM_CVG_BITS; i++) {
            //    if this bit is set in coverage mask
            if(coverage >> I) & 0x1 {
                //    compute alpha scale value -
contribution for this color
                AlphaScale = (alpha * AlphaAccum[i]);
                //   add color scaled by alpha
                ColorAccum +=
(color*AlphaScale)*(1/NUM_CVG_BITS));
                //   compute accumulated alpha for
the subsample
                //   AlphaAccum =
AlphaAccum*(MAX_ALPHA-
```

-continued

```
alpha) =
                         //   AlphaAccum - AlphaAccum*alpha
                         AlphaAccum[i] -= AlphaScale;
                    }
               }
          }
          ColorAccum is pixel color
}
```

An example using 4 sub-pixel locations will help illustrate fragment resolution. In this example, we consider three fragments, each having a coverage mask, alpha and color value. The initial state is illustrated in table below. In this example, we accumulate color and alpha using a front to back approach. The initial alpha is set to 1, meaning full transparency. The data for each layer is as follows: fragment 0, alpha=0.5, coverage mask (cm)=0011, and color =$C_0$; fragment 1, alpha-0.3, cm=1000, color=$C_1$; fragment 2, alpha=0.8, cm=0101, color=$C_2$. The data for each fragment is provided in tables below.

With the alpha values initialized to one, the alpha coverage array is shown below.

| 1 | 1 |
| 1 | 1 |

To compute color, the color values for each subpixel location are multiplied by the new alpha and the alpha from the coverage array. The result for the subpixel locations is then divided by four (one divided by the number of subpixel locations). Finally, the contribution from all of the subpixel locations is summed to find the accumulated color.

| coverage mask | color | alpha for new frag. | alpha from coverage array alpha | subpixel contribution |
| --- | --- | --- | --- | --- |
| 1 | $C_0$ | 0.5 | 1 | ¼ |
| 1 | $C_0$ | 0.5 | 1 | ¼ |
| 0 | $C_0$ | 0.5 | 1 | ¼ |
| 0 | $C_0$ | 0.5 | 1 | ¼ |

Using the formula, Alpha'=Alpha * (Max_alpha—new_alpha), the image processor computes the new alpha separately for each pixel location and stores it in the alpha coverage array in the table below.

| 0.5 | 0.5 |
| 1 | 1 |

The contribution of fragment 1 is set forth in the table below.

| coverage mask | color | alpha for new frag. | alpha from coverage array alpha | subpixel contribution |
| --- | --- | --- | --- | --- |
| 0 | $C_1$ | 0.3 | 0.5 | ¼ |
| 0 | $C_1$ | 0.3 | 0.5 | ¼ |
| 0 | $C_1$ | 0.3 | 1 | ¼ |
| 1 | $C_1$ | 0.3 | 1 | ¼ |

The new alpha coverage array is as follows:

| 0.5 | 0.5 |
| 0.7 | 1 |

The contribution of fragment 2 is set forth in the table below.

| coverage mask | color | alpha for new frag. | alpha from coverage array alpha | subpixel contribution |
| --- | --- | --- | --- | --- |
| 1 | $C_2$ | 0.8 | 0.5 | ¼ |
| 0 | $C_2$ | 0.8 | 0.5 | ¼ |
| 1 | $C_2$ | 0.8 | 1 | ¼ |
| 0 | $C_2$ | 0.8 | 0.7 | ¼ |

The alpha coverage array for the fragments after fragment 2 is as follows:

| 0.5 | 0.1 |
| 0.7 | 0.2 |

This method requires 2* NUM_CVG_BITS multiplies (2*16=48 in the 4×4 case) per fragment for the computation of alpha and the color contribution. Note that the (I/NUM_CVG_BITS) scaling can be done with a shift if the number of bits in the coverage mask is a 2**n size (which is typically the case).

FIG. 30 is a schematic diagram illustrating a hardware implementation of the approach described above for a pixel divided in 4×4 subpixel regions (1224). The resolve hardware includes a set of 16 identical processing and storage units called alpha and color accumulators (ACA) (1226), each ACA dedicated to one subpixel region of the pixel. During processing of the fragment list for each pixel location, the coverage masks of each fragment are used as a processing mask for the resolve hardware. The ACA performs a multiply for the alpha scale, color accumulation, and alpha accumulation. The (I/NUM_CVG_BITS) scaling is performed with a shift as set forth above. Once all fragments have been processed for a given pixel location, the output section combines the color and alpha values for all of the 16 subpixels in a hierarchical fashion (1228). The processors in the output combine the two incoming values and divide by 2. With hardware pipelining, the pixel resolve process uses only a single hardware clock per fragment entry.

An alternative technique reduces hardware requirements by treating subpixels having the same accumulated alpha similarly at each layer. This technique is based on the observation that the state in which subsamples have unique accumulated alpha values occurs gradually. Initially, all of the subsample alphas are set to zero (transparent). The first fragment accumulation can add at most one unique alpha value, resulting in one group of subsamples retaining the initial alpha value and the other group having the same new alpha value. The second fragment accumulation can result in no more than four unique alpha values. Overall, the number of unique subsample alpha values possible after 'n' fragment accumulations is 2n (or, more accurately, MIN(2n, NUM_CVG_BITS)).

This alternate technique uses this characteristic to reduce the number of accumulations required by only performing the color scale and accumulation for each unique alpha value within the subsamples rather than for every subsample. With this technique, at most one accumulate needs to occur for the first fragment, two for the second fragment, four for the third fragment, and so on, up to the number of subsamples in the pixel (e.g., with a 4×4 subsample array the worst case is 16 accumulations per fragment).

The foundation of the technique is to maintain the set of unique alpha values and their associated coverage masks during fragment accumulation, the intent of which is to perform a minimum number of color accumulations.

The alpha and coverage masks are stored in NUM_CVG_BITS element arrays of which some subset of these entries is actually valid (or 'in-use') at any time. The 'in-use' entries are those which hold the current set of unique alpha values. The in-use entries are identified by a NUM_CVG_BITS bit mask where a set bit indicates that the array element at that bit index is in-use. A convention is used in which the first set bit in the coverage mask of a {unique alpha, coverage mask} pair defines which array element that pair is stored in. Consider the following example of how the array is initialized and updated with the accumulation of three fragments (using 4 subsamples):

Initial state (X implies a 'don't care' value):

0b0001 // in-use mask
{1., 0b1111}//alpha, coverage pairs
{X, 0bXXXX}
{X, 0bXXXX}
{X, 0bXXXX}
Accumulate fragment {0.5/* alpha */, 0b0011/* coverage mask */}
{0b0011}//in-use mask
{0.5, 0b0011}// alpha, coverage pairs
{X, 0bXXXX}
{1., 0b1100}
{X, 0bXXXX}
Accumulate fragment {0.3, 0b1000}
0b0011 // in-use mask
{0.5, 0b0011}// alpha, coverage pairs
{X, 0bXXXX}
{1., 0b0100}
{0.7, 0b1000}
Accumulate fragment {0.8, 0b0101}
0b1111 // in-use mask
{0.1, 0b0001}//alpha, coverage pairs
{0.5, 0b0010}
{0.2, 0b0100}
{0.7, 0b1000}

The initial alpha coverage array is set forth below:

| x | 1 |
| x | x |

The in use mask is 0001, which specifies the location where the array mask is stored. The corresponding array mask is as follows:

| xxxx | 1111 |
| xxxx | xxxx |

After fragment 0, the alpha coverage mask appears as follows.

| x | 0.5 |
| x | 1 |

The in use mask is 0101, and the array mask is as follows:

| xxxx | 0011 |
| xxxx | 1100 |

For elements in the in use mask that are set, the array mask is ANDed with the coverage mask for the new fragment to determine whether there is a change in alpha value. If there is a new alpha, the new value for the array mask is computed by: array mask AND NOT coverage mask. If there is a new value for the array mask, it is stored in the appropriate location.

After fragment 1, the alpha coverage mask appears as follows.

| x | 0.5 |
| 0.7 | 1 |

The in-use mask is 1101, and the array mask is as follows:

| xxxx | 0011 |
| 1000 | 0100 |

After fragment 2, the alpha coverage mask appears as follows.

| 0.5 | 0.1 |
| 0.7 | 0.2 |

The in-use mask is 1111, and the array mask is as follows:

| 0010 | 0001 |
| 1000 | 0100 |

The number of unique alpha values at any time is equal to the number of set bits in the in-use mask. The complete solution includes two steps. The first step is performing the necessary color accumulations, where one accumulation is required per 'in-use' entry in the coverage/alpha array. The second step is to update the coverage/alpha array with the new fragment's values.

A complete implementation of this technique (for 4×4 subsamples) is as follows.

```
for (each fragmented pixel location) {
//      initial state (per pixel)
    InUseMask = 0x0001;
    CoverageArrayMask[16] = { 0xffff, 0, . . . , 0 };
```

-continued

```
        CoverageArrayAlpha[16] = { MAX_ALPHA, MAX_ALPHA, ... ,
MAX_ALPHA };
        ColorAccum = 0;
        while (fragment list is not empty) {
                scan fragment list and extract closest fragment (coverage, color, alpha);
                // accumulate this fragment's color into ColorAccum for each in-use
element
                InUseMaskScratch = InUseMask;
                while (InUseMaskScratch != 0x0000) {
                        //      find first set bit in scratch in-use mask
                        Index = FindFirstSetBit(InUseMaskScratch);
                        //      clear this bit in scratch mask
                        InUseMaskScratch &= ~(0x1 <<Index);
                        //      read old (or current) alpha for this entry - this is used
                        //      in updating the non-covered area (which may be newly
'in-use')
                        AlphaOld = CoverageArrayAlpha[Index];
                        //      alpha scale factor - used for scaling color for
accumulation and
                        //      to compute alpha for subsequent layers
                        AlphaScale = AlphaOld * alpha;
                        //      compute alpha for next layer - use this for updating
alpha array
                        //      AlphaNext = AlphaOld*(MAX_ALPHA-alpha) =
AlphaOld-AlphaOld*alpha
                        AlphaNext = AlphaOld - AlphaScale,
                        //      compute mask for overlapped coverage - this is the
portion of this
                        //      array entry which is covered by the new fragment, so
accumulate the
                        //      color and update the array with new alpha value
                        AccumCvgMask = coverage & CoverageArrayMask[Index];
                        if(AccumCvgMask != 0x0000) {
                                //      accumulate the color
                                nCoverageBits = CountSetBits(AccumCvgMask);
                                ColorAccum += color*(AlphaScale *
nCoverageBits/NUM_CVG_BITS));
                                //update alpha for covered portion (this may result in a
'new'
                                //      in-use element or just overwrite the old one)
                                Index2 = FindFirstSetBit(AccumCvgMask);
                                InUseMask |= (0x1 <<Index2);
                                CoverageArrayMask[Index2] = AccumCvgMask;
                                CoverageArrayAlpha[Index2] = AlphaNext;
                        }
                        //      compute the mask for the non-covered area - this is the
portion
                        //      of this array entry which is unobscured by the new
fragment, so
                        //      just update the coverage (the alpha stays the same)
                        UpdateCvgMask = ~coverage & CoverageArrayMask[Index];
                        if(UpdateCvgMask!= 0x0000) {
                                Index2 = FindFirstSetBit(UpdateCvgMask);
                                InUseMask |= (0x1 <<Index2),
                                //      update for the non-covered area - this may result
in a 'new'
                                //      in-use element or just overwrite the old one (thus
copy the
                                //      alpha value in case it is new ... )
                                CoverageArrayMask[Index2] = UpdateCvgMask;
                                CoverageArrayAlpha[Index2] = AlphaOld;
                        }
                }
        }
        ColorAccum is pixel color
}
```

The core arithmetic operation is the color accumulation, which requires a total of three multiplies per unique alpha value:

ColorAccum+=color*(alpha*AlphaOld*(nCoverageBits/NUM_CVG_BITS));

Note that the third multiply may be somewhat simplified by the number of subsamples. For 16 subsamples, the third multiply involves 0.4 fixed point value, thus this multiplier can be a 8×4 (where the other multipliers are likely to be 8×8). Also note that, for 2**n sized coverage masks, the division shown above is merely a shift This technique requires a worst case total of:

$$\sum_{n=1}^{NumFrags} MIN(2^n, 16)$$

accumulations. The typical case can be much less than this because the worst case occurs only when a new fragment's coverage has both set and unset values in each 'in-use' array element.

One useful optimization is to track coverage mask locations which have fully opaque alpha value. This is useful in the case in which fragments are being generated due to partial geometric coverage and not due to non-opaque transparency values. These fragments will normally have a fully opaque transparency value. Implementing this optimization is done by maintaining an additional mask value, the OpaqueAlphaMask. The OpaqueAlphaMask is set by O-Ring in coverage masks of fragments for which the alpha is fully opaque (this is done after accumulating the fragment's contribution). This mask is then used to disregard bits in the masks of subsequent fragments, since there can be no further color contribution to the corresponding subsamples.

Another possible optimization is to consolidate locations with identical alpha values, but this is significantly more expensive to implement, and the occurrence of identical alpha values which are not either 0 or MAX_ALPHA is not likely.

The example and pseudocode given above use a front-to-back depth sorting. It is equally possible to perform the same computations in a back-to-front depth sorting. Also, the computations given above use color components which have not been premultiplied by the alpha component. The same technique applies to pre-multiplied color components, with slightly different arithmetic computations (and identical control flow).

We have described various aspects of an image processing system, its architecture, and associated methods with references to several embodiments. While we have described several embodiments in detail, we do not intend to limit our invention to these specific embodiments. For example, our novel architecture can be applied to a variety of hardware implementations, including but not limited to: computer systems ranging from hand held devices to workstations, game platforms, set-top boxes, graphics processing hardware, graphics processing software, and video editing devices. Variation of our systems and methods can be implemented in hardware or software or a combination of both.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. In a system for generating images in a view space at a computational rate, a method of generating images comprising:

assigning objects in a view volume for a current image to at least two gsprites;

independently rendering the objects to the at least two gsprites;

storing the at least two gsprites;

deriving a 2D geometric transform from characteristic points of a 3D object to simulate geometric motion of the 3D object over time;

applying the 2D geometric transform to a gsprite representing a rendering of the 3D object to simulate the geometric motion of the 3D object;

compositing the at least two gsprites, including the transformed gsprite, to generate the current image at the computational rate; and repeating the above steps to generate subsequent images for subsequent computational periods.

2. The method of claim 1 wherein the objects are 3-D objects.

3. The method of claim 1 wherein the at least two gsprites are m by n image regions occupying a portion of the view space, where m and n are integers.

4. The method of claim 1 wherein the independently rendering step comprises rendering the at least two gsprites in series including:

rendering a first group of geometric primitives assigned to a first gsprite, and then after rendering the first group, rendering a second group of geometric primitives assigned to a second gsprite.

5. The method of claim 1 wherein the rendering step comprises rendering the at least two gsprites in parallel.

6. The method of claim 1 further including:

transferring the current image to a physical output device for display at a video refresh rate.

7. The method of claim 6 wherein the computational rate is substantially similar to the video refresh rate.

8. The method of claim 1 further including:

rendering a first 3-D object to a first gsprite;

computing an affine transform to simulate the motion of the first 3-D object; and performing an affine transformation on the first gsprite using the affine transform.

9. The method of claim 1 further including:

computing an affine transform matrix using characteristic points of a first object rendered to a first gsprite;

determining whether an affine transformation of the first gsprite using the affine transformation matrix is within a predefined error tolerance;

if the affine transformation is within the predefined error tolerance, then performing an affine transformation on the first gsprite to simulate motion of the first object.

10. A method according to claim 1 including the steps of:

comparing characteristic points for a first object in a first computational period with characteristic points for the object in a second computational period; and re-rendering the first object when changes in the characteristic points are not within a predefined tolerance.

11. A method according to claim 1 in which the rendering step comprises the step of updating gsprites rendered in previous computational periods at varying rates.

12. A method according to claim 1 further including the step of computing a priority list for re-rendering objects in subsequent computational periods.

13. The method of claim 12 wherein priority for re-rendering the objects is computed at least in part by determining accuracy in approximating motion of a first object with an affine transformation of a first gsprite representing the first object.

14. The method of claim 12 wherein the priority for re-rendering is computed at least in part by using a predefined update rate for one or more of the objects.

15. The method of claim 12 wherein the priority of re-rendering is computed by:

computing an affine transform matrix to approximate motion of a first object;

performing the affine transformation on characteristic points of the first object for a previous image to find transformed characteristic points;

the comparing the transformed characteristic points with characteristic points for the current image to find an error value;

comparing the error value with a predefined tolerance to find an accuracy value; and prioritizing objects for rendering based on the accuracy value.

16. The method of claim 1 including the step of:

selectively rendering objects to gsprites at various resolutions, a low resolution gsprite being expanded to cover a portion of the view space allocated for the display of the low resolution gsprite.

17. The method of claim 1 including the step of compositing gsprites of varying resolutions in a common graphics pipeline.

18. The method of claim 1 in which inputs for a subsequent image are used to compute an affine transform for a gsprite in the current image.

19. The method claim 1 comprising the steps of:

receiving inputs for a first image during a first view space period;

computing an affine transform during a next or second view space period, and transforming gsprites during a succeeding or third view space period;

wherein inputs for a subsequent image are received during the second view space period, such inputs for the subsequent image being used in the second period for computing the affine transform for the first image.

20. The method of claim 1 comprising the steps of:

assigning an object temporally spaced from the view volume for the current image to a first gsprite of the at least two gsprites;

independently rendering the object temporally spaced from the view volume to the first gsprite;

storing the first gsprite; and compositing the first gsprite with other gsprites to generate one of the subsequent images.

21. In a graphics rendering system for generating a series of images for a view space displayed at a refresh rate, a method for generating a current image for a view space, the method comprising:

storing gsprites displayed in one or more previous images of the series of images;

determining whether to update one or more of tie stored gsprites for the current image;

updating at least a first gsprite of the stored gsprites by rendering a first object to the first gsprite based on inputs to the graphics rendering system describing the location of the first object in a scene represented in the current image;

deriving a 2D geometric transform from characteristic points of a 3D object to simulate geometric motion of the 3D object over time, applying the 2D geometric transform to a gsprite representing a rendering of the 3D object to simulate the geometric motion of the 3D object; and compositing the first gsprite with at least a sub-set of the stored gsprites and at least a portion of the transformed gsprite for display as the current image.

22. The method of claim 21 further including:

updating the first gsprite based on a predefined update rate.

23. The method of claim 21 further including the steps of:

deriving an affine transform from characteristic points representing a second object at a first time corresponding to the current image and a second time corresponding to a previous image of the series of images;

performing an affine transformation on a second gsprite of the gsprites representing the second object using the affine transform; and compositing the second gsprite with at least a sub-set of the stored gsprites for display as the current image.

24. The method of claim 21 further including:

simulating change in position of a second object between the current and a previous image by performing an affine transformation on one of the stored gsprites representing the second object.

25. The method of claim 21 further including:

deriving an affine transform from characteristic points representing a second object at a first time corresponding to the current image and a second time corresponding to a previous image of the series of images; and performing an affine transformation on the characteristic points representing the second object at the second time using the affine transform to find transformed characteristic points;

comparing the characteristic points representing the second object at the first time with the transformed characteristic points; and determining whether to update one of the stored gsprites representing the second object based on the comparing step.

26. The method of claim 25 wherein the comparing step includes comparing the characteristic points representing the second object at the first time with the transformed characteristic points to compute an error value;

repeating the deriving, performing, and comparing steps for other objects and corresponding gsprites of the stored gsprites; and prioritizing the objects for re-rendering based on the error values computed in the comparing steps.

27. The method of claim 21 further including the steps of:

receiving inputs to the graphics rendering system describing a position of a second object for a subsequent image to the current image;

using the inputs to compute an affine transform; and performing an affine transformation on a second gsprite of the stored gsprites representing the second object; and compositing the second gsprite with at least a sub-set of the stored gsprites for display as the current image.

28. An image processing system for generating a display image using gsprites, the system comprising:

gsprite memory;

an image pre-processor receiving input describing location of objects and a viewpoint, for determining which of the objects intersect with a view volume, for assigning objects intersecting with the view volume to gsprites, and for computing affine transforms used to transform the gsprites by deriving an affine transform from a change in position of characteristic points of a 3D object to simulate geometric motion of the 3D object over time; and an image processor coupled to the image pre-processor for rendering the objects to respective gsprites, for storing the gsprites to the gsprite memory, for reading the gsprites from the gsprite memory and transforming the gsprites to physical output device coordinates according to the affine transforms, and for compositing the rendered gsprites for display on the physical output device.

29. The system of claim 28 wherein the image preprocessor comprises a programmed processor in a computer system.

30. The system of claim 28 wherein the image preprocessor comprises a programmed digital signal processor.

31. The system of claim 28 wherein the image preprocessor comprises a programmed processor in a computer system and a programmed digital signal processor coupled to the programmed processor.

32. The system of claim 28 wherein the image processor includes a tiler for rendering the objects to the gsprites and storing the gsprites in the gsprite memory.

33. The system of claim 28 wherein the image processor includes a gsprite engine for reading the gsprites from the gsprite memory and for transforming the gsprites to the physical output device coordinates.

34. The system of claim 33 wherein the image processor includes a compositing buffer coupled to the gsprite engine for compositing the gsprites for display on the physical output device.

35. A computer-readable medium on which is stored a computer program for processing gsprites, said computer program comprising instructions, which when executed by a computer, perform the steps of:
   computing an affine transform from characteristic points for an object at first and second view space periods;
   performing an affine transformation on the characteristic points for the object at the first view space period to find transformed characteristic points; and
   comparing the transformed characteristic points with the characteristic points at the second view space period to determine accuracy of the affine transform.

36. In a graphics rendering system for rendering objects in a scene to generate frames of images at a frame refresh rate, a method of generating images comprising:
   assigning the objects in a view volume for a current image to separate gsprites;
   independently rendering the objects to the gsprites;
   deriving an affine transform from characteristic points of at least one 3D object to simulate geometric motion of the 3D object over time;
   storing the gsprites in memory;
   retrieving the gsprites from memory according to a display list;
   transforming the gsprites to physical output device coordinates, including applying the affine transform to a gsprite representing a rendering of the at least one 3D object;
   compositing the gsprites to generate the current image at the frame refresh rate; and
   repeating the above steps to generate subsequent images for subsequent frame periods.

37. The image processing system of claim 28 wherein the image preprocessor comprises a computer executing an operating system.

38. The image processing system of claim 37 wherein the image preprocessor comprises the computer executing the operating system and graphic support software.

* * * * *

UNITED STATES PATENT AND TRADEMARK OFFICE
CERTIFICATE OF CORRECTION

PATENT NO. : 5,867,166
DATED : February 2, 1999
INVENTOR(S) : Myhrvold et al.

It is certified that error appears in the above-identified patent and that said Letters Patent is hereby corrected as shown below:

Title page,
ABSTRACT,
First and second lines, please change "a images" to -- images --.

Column 17,
Line 46, "(NMU)" should read -- (MMU) --.

Column 39,
Line 23, "(context node.Value)" should read -- (context[attr], node.Value) --.
Line 26, "ProcessGeomo" should read -- ProcessGeom() --.

Column 42,
Line 42, "xf;" should read -- xf, --.
Line 45, "xf;" should read -- xf, --.

Column 44,
Line 21, "ROB" should read -- RGB --.

Column 45,
Line 16, "(index0)" should read -- (index=0) --.

Column 47,
Line 4, "for" should read -- (for --.
Line 4, "for" should read -- (for --.
Line 34, "x-0" should read -- x=0 --.

Column 49,
Line 1, a sentence is missing, please insert the sentence -- 1) For a given sprite, form a table of mip chunk level offsets by: --

Column 52,
Line 36, "to" should read -- $t_0$ --.

Column 53,
Line 2, "$\bar{x}^1(t) = V(t)\mathrm{T}x^1(t)$" should read -- $\bar{x}(t) = V(t)x^i(t)$ --.
Line 8, "$[\bar{x}^1(t_0)]S(t) = \bar{x}^1(t)$" should read -- $[\bar{x}^1(t_0)1]S(t) = \bar{x}^1(t)$ --.

Line 30, "$xy^1$" should read -- $x^0y^1$ --.

UNITED STATES PATENT AND TRADEMARK OFFICE
CERTIFICATE OF CORRECTION

PATENT NO.   : 5,867,166
DATED        : February 2, 1999
INVENTOR(S)  : Myhrvold et al.

Page 2 of 3

It is certified that error appears in the above-identified patent and that said Letters Patent is hereby corrected as shown below:

Column 54,
Lines 5-14, please replace the equation $$\begin{bmatrix} \sum_i \tilde{x}^i \tilde{x}^i & \sum_i \tilde{x}^i \tilde{y}^i & \sum_i \tilde{x}^i \\ \sum_i \tilde{x}^i \tilde{y}^i & \sum_i \tilde{y}^i \tilde{y}^i & \sum_i \tilde{y}^i \\ \sum_i \tilde{x}^i & \sum_i \tilde{y}^i & 1 \end{bmatrix} \begin{bmatrix} a & c \\ b & d \\ Px & Py \end{bmatrix} = \begin{bmatrix} \sum_i \tilde{x}^i \tilde{x}^i & \sum_i \tilde{x}^i \tilde{y}^i \\ \sum_i \tilde{y}^i \tilde{x}^i & \sum_i \tilde{y}^i \tilde{y}^i \\ \sum_i \tilde{x}^i & \sum_i \tilde{x}^i \end{bmatrix}$$

" with the following equation:

$$[\tilde{X}\ 1]^T [\tilde{X}\ 1] S = [\tilde{X}\ 1]^T X$$

$$\begin{bmatrix} \sum_i \tilde{x}^i \tilde{x}^i & \sum_i \tilde{x}^i \tilde{y}^i & \sum_i \tilde{x}^i \\ \sum_i \tilde{x}^i \tilde{y}^i & \sum_i \tilde{y}^i \tilde{y}^i & \sum_i \tilde{y}^i \\ \sum_i \tilde{x}^i & \sum_i \tilde{y}^i & 1 \end{bmatrix} \begin{bmatrix} a & c \\ b & d \\ p_x & p_y \end{bmatrix} = \begin{bmatrix} \sum_i \tilde{x}^i \underline{\tilde{x}^i} & \sum_i \tilde{x}^i \underline{\tilde{y}^i} \\ \sum_i \tilde{y}^i \underline{\tilde{x}^i} & \sum_i \tilde{y}^i \underline{\tilde{y}^i} \\ \sum_i x^i & \sum_i \underline{y^i} \end{bmatrix}$$

Line 17, "they" should read -- the y --.
Line 29, "to" should read -- $t_0$ --.
Line 34, "to" should read -- $t_0$ --.

Column 55,
Line 35, " $I\lambda = I_{a\lambda} k_a O_{d\lambda} + f_{alt} I_{p\lambda}[k_d O_{d\lambda}(N \bullet L) + k_S O_{S\lambda}(R \bullet V)^n]$ " should read -- $I\lambda = I_{a\lambda} k_a O_{d\lambda} + f_{att} I_{a\lambda}[k_d O_{d\lambda}(N \bullet L) + k_S O_{S\lambda}(R \bullet V)^n]$ --.
Line 36, "$I_\lambda$" should read -- $I_{a\lambda}$ --.
Line 40, "$f_{alt}$" should read -- $f_{att}$ --.
Line 47, "$k_a$" should read -- $k_S$ --.

Column 60,
Line 52, "GUs)." should read -- (MAUs). --.

Column 72,
Line 3, "((I-Ain)" should read -- ((1-Ain) --.

Column 73,
Line 46, "Max___alpha——new___alpha" should read -- Max_alpha - new_alpha --.

Column 74,
Line 27, "(I/Num" should read -- (1/Num --.
Line 41, "(I/Num" should read -- (1/Num --.

Column 75,
Line 32, "{0b0011}" should read -- 0b0101 --.
Line 39, "0b0011" should read -- 0b1101 --.

UNITED STATES PATENT AND TRADEMARK OFFICE
CERTIFICATE OF CORRECTION

PATENT NO. : 5,867,166
DATED : February 2, 1999
INVENTOR(S) : Myhrvold et al.

It is certified that error appears in the above-identified patent and that said Letters Patent is hereby corrected as shown below:

Column 81,
Line 1, "the comparing the" should read -- comparing the --.
Line 19, "method claim" should read -- method of claim --.
Line 45, "tie stored" should read -- the stored --.
Line 55, "time," should read -- time; --.

Signed and Sealed this

Ninth Day of July, 2002

*Attest:*

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO.   : 5,867,166
DATED        : February 2, 1999
INVENTOR(S)  : Myhrvold et al.

It is certified that error appears in the above-identified patent and that said Letters Patent is hereby corrected as shown below:

<u>Column 53,</u>

Line 2, " $\bar{x}^1(t) = V(t)x^1(t)$ " should read -- $\bar{x}^i(t) = V(t)x^i(t)$ --.

Signed and Sealed this

Eighteenth Day of March, 2003

JAMES E. ROGAN
*Director of the United States Patent and Trademark Office*